US011575940B2

(12) United States Patent
Zhang et al.

(10) Patent No.: US 11,575,940 B2
(45) Date of Patent: Feb. 7, 2023

(54) CONTEXT MODELING OF REDUCED SECONDARY TRANSFORMS IN VIDEO

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/400,464

(22) Filed: Aug. 12, 2021

(65) Prior Publication Data

US 2022/0295099 A1  Sep. 15, 2022

Related U.S. Application Data

(63) Continuation of application No. PCT/CN2020/089582, filed on May 11, 2020.

(30) Foreign Application Priority Data

May 10, 2019  (WO) ................ PCT/CN2019/086420

(51) Int. Cl.
*H04N 19/61* (2014.01)
*H04N 19/176* (2014.01)
(Continued)

(52) U.S. Cl.
CPC ............. *H04N 19/70* (2014.11); *H04N 19/11* (2014.11); *H04N 19/12* (2014.11);
(Continued)

(58) Field of Classification Search
CPC ...... H04N 19/176; H04N 19/61; H04N 19/70; H04N 19/157; H04N 19/11
See application file for complete search history.

(56) References Cited

U.S. PATENT DOCUMENTS 10,666,976 B2  5/2020  Huang et al.
11,039,139 B2  6/2021  Zhao et al.
(Continued)

FOREIGN PATENT DOCUMENTS

AU  2015249109 A1  8/2021
CN  102474270 A  5/2012
(Continued)

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11, 15th Metting, Gothenburg, SE, Jul. 3-12, 2019, document JVET-O2001, 2019.
(Continued)

*Primary Examiner* — Farhan Mahmud
(74) *Attorney, Agent, or Firm* — Perkins Coie LLP

(57) ABSTRACT

A video processing method is provided to include: performing a conversion between a current video block of a video and a coded representation of the video, wherein the performing of the conversion includes configuring, based on a characteristic of the current video block of a video, a context model for coding a bin or bypass coding the bin of a bin string corresponding to an index of a secondary transform tool, wherein the index indicates an applicability of the secondary transform tool and/or a kernel information of the secondary transform tool, and wherein the secondary transform tool includes applying, during encoding, a forward secondary transform to an output of a forward primary transform applied to a residual of a video block prior to quantization, or wherein the secondary transform tool
(Continued)

includes applying, during decoding, an inverse secondary transform to an output of dequantization to the video block before applying an inverse primary transform.

20 Claims, 24 Drawing Sheets

(51) Int. Cl.
  *H04N 19/186*  (2014.01)
  *H04N 19/46*  (2014.01)
  *H04N 19/70*  (2014.01)
  *H04N 19/11*  (2014.01)
  *H04N 19/12*  (2014.01)
  *H04N 19/124*  (2014.01)

(52) U.S. Cl.
  CPC ......... *H04N 19/124* (2014.11); *H04N 19/176* (2014.11); *H04N 19/186* (2014.11); *H04N 19/46* (2014.11); *H04N 19/61* (2014.11)

(56) References Cited

U.S. PATENT DOCUMENTS

| | | | |
|---|---|---|---|
| 2011/0235705 A1 | 9/2011 | Hanna | |
| 2012/0082391 A1 | 4/2012 | Fernandes | |
| 2012/0320972 A1 | 12/2012 | Ma et al. | |
| 2013/0259128 A1* | 10/2013 | Song | H04N 19/50 375/240.12 |
| 2014/0098861 A1 | 4/2014 | Yu et al. | |
| 2014/0178040 A1 | 6/2014 | Shimada et al. | |
| 2014/0254661 A1 | 9/2014 | Saxena et al. | |
| 2014/0376626 A1* | 12/2014 | Lee | H04N 19/91 375/240.12 |
| 2015/0249828 A1 | 9/2015 | Rosewarne et al. | |
| 2016/0088310 A1 | 3/2016 | Lin | |
| 2016/0205404 A1 | 7/2016 | Zhu et al. | |
| 2016/0234525 A1 | 8/2016 | Lee et al. | |
| 2017/0034530 A1 | 2/2017 | Cherepanov et al. | |
| 2017/0094313 A1* | 3/2017 | Zhao | H04N 19/122 |
| 2017/0295380 A1 | 10/2017 | Huang et al. | |
| 2017/0324643 A1 | 11/2017 | Seregin et al. | |
| 2018/0020218 A1 | 1/2018 | Zhao et al. | |
| 2018/0103252 A1 | 4/2018 | Hsieh et al. | |
| 2018/0288439 A1 | 10/2018 | Hsu et al. | |
| 2018/0302631 A1 | 10/2018 | Chiang et al. | |
| 2018/0324417 A1 | 11/2018 | Karczewicz et al. | |
| 2018/0332284 A1* | 11/2018 | Liu | H04N 19/139 |
| 2018/0332289 A1 | 11/2018 | Huang | |
| 2018/0367814 A1* | 12/2018 | Seregin | H04N 19/157 |
| 2019/0149822 A1 | 5/2019 | Kim et al. | |
| 2019/0149823 A1 | 5/2019 | Lim et al. | |
| 2019/0149829 A1 | 5/2019 | Maaninen | |
| 2019/0166370 A1 | 5/2019 | Xiu et al. | |
| 2019/0356915 A1 | 11/2019 | Jang et al. | |
| 2020/0084447 A1 | 3/2020 | Zhao et al. | |
| 2020/0092555 A1 | 3/2020 | Zhao et al. | |
| 2020/0244995 A1* | 7/2020 | Hsiang | H04N 19/176 |
| 2020/0260096 A1 | 8/2020 | Ikai et al. | |
| 2020/0288172 A1 | 9/2020 | Huang et al. | |
| 2020/0322617 A1 | 10/2020 | Zhao et al. | |
| 2020/0322620 A1 | 10/2020 | Zhao et al. | |
| 2020/0322623 A1 | 10/2020 | Chiang et al. | |
| 2020/0359019 A1* | 11/2020 | Koo | H04N 19/60 |
| 2020/0413049 A1 | 12/2020 | Biatek et al. | |
| 2021/0014534 A1 | 1/2021 | Koo et al. | |
| 2021/0021818 A1 | 1/2021 | Lee et al. | |
| 2021/0051328 A1 | 2/2021 | Sharman et al. | |
| 2021/0076043 A1 | 3/2021 | Zhang et al. | |
| 2021/0084314 A1 | 3/2021 | Salehifar et al. | |
| 2021/0120240 A1 | 4/2021 | Bross et al. | |
| 2021/0289221 A1* | 9/2021 | Misra | H04N 19/157 |
| 2021/0297672 A1 | 9/2021 | Deng et al. | |
| 2021/0314618 A1 | 10/2021 | Pfaff et al. | |
| 2021/0314619 A1 | 10/2021 | Jung et al. | |
| 2021/0337235 A1* | 10/2021 | Choi | H04N 19/42 |
| 2021/0360240 A1* | 11/2021 | Lee | H04N 19/46 |
| 2021/0360247 A1 | 11/2021 | Koo et al. | |
| 2021/0385499 A1 | 12/2021 | Zhang et al. | |
| 2021/0385500 A1 | 12/2021 | Zhang et al. | |
| 2021/0392327 A1 | 12/2021 | Zhang et al. | |
| 2022/0086449 A1 | 3/2022 | Koo et al. | |
| 2022/0094986 A1 | 3/2022 | Zhang et al. | |
| 2022/0109846 A1 | 4/2022 | Lim et al. | |
| 2022/0150498 A1 | 5/2022 | Zhang et al. | |
| 2022/0150502 A1 | 5/2022 | Zhang et al. | |
| 2022/0159259 A1 | 5/2022 | Fan et al. | |
| 2022/0174274 A1 | 6/2022 | Jang | |

FOREIGN PATENT DOCUMENTS

| | | | |
|---|---|---|---|
| CN | 103139565 | A | 6/2013 |
| CN | 109076225 | A | 12/2013 |
| CN | 103636205 | A | 3/2014 |
| CN | 104067622 | A | 9/2014 |
| CN | 104412591 | A | 3/2015 |
| CN | 104488266 | A | 4/2015 |
| CN | 105791867 | A | 7/2016 |
| CN | 107211144 | A | 9/2017 |
| CN | 103141596 | A | 6/2018 |
| CN | 108141585 | A | 6/2018 |
| CN | 108141597 | A | 6/2018 |
| CN | 108322745 | A | 7/2018 |
| CN | 108322756 | A | 7/2018 |
| CN | 109076221 | A | 12/2018 |
| CN | 109076222 | A | 12/2018 |
| CN | 109076223 | A | 12/2018 |
| CN | 109076230 | A | 12/2018 |
| CN | 109076242 | A | 12/2018 |
| CN | 109076243 | A | 12/2018 |
| CN | 109196869 | A | 1/2019 |
| CN | 109417636 | A | 3/2019 |
| CN | 109644269 | A | 4/2019 |
| CN | 109644276 | A | 4/2019 |
| CN | 109716772 | A | 5/2019 |
| WO | 2012122278 | A1 | 9/2012 |
| WO | 2017191782 | A1 | 11/2017 |
| WO | 2017195555 | A1 | 11/2017 |
| WO | 2018128323 | A1 | 7/2018 |
| WO | 2018132710 | A1 | 7/2018 |
| WO | 2018166429 | A1 | 9/2018 |
| WO | 2019117634 | A1 | 6/2019 |
| WO | 2020160401 | A1 | 8/2020 |
| WO | 2021110018 | A1 | 6/2021 |

OTHER PUBLICATIONS

Bross et al. "Versatile Video Coding (Draft 7)," Joint Video Experts Team (JVET) of ITU-T SG 16 WP 3 and ISO/IEC JTC 1/SC 29/WG 11, 16th Meeting, Geneva, CH, Oct. 1-11, 2019, document JVET-P2001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Choi et al. "Non-CE3: Simplified Intra Mode Candidates for ISP," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0230, 2019.

De-Luxan-Hernandez et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11, 13th Meeeting, Marrakech, MA, Jan. 9-18, 2019, document JVET-M0102, 2019.

"Information Technology—High Efficiency Coding and Media Delivery in Heterogeneous Environments—Part 2: High Efficiency Video Coding" Apr. 20, 2018, ISO/DIS 23008, 4th Edition.

Karczewicz et al. "CE8-Related: Quantized Residual BDPCM," Joint Video Experts Team (JVET) of ITU-T SG 16 WP 3 and

(56) References Cited

OTHER PUBLICATIONS

ISO/IEC JTC 1/SC 29/WG 11, 14th Meeting, Geneva, CH, Mar. 19-27, 2019, document JVET-N0413, 2019.
Koo et al. "CE6-2.1: Reduced Secondary Transform (RST)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0133, 2018.
Koo et al. "CE6-5.1: Reduced Secondary Transform (RST)," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0292, 2019.
Koo et al. "CE6: Reduced Secondary Transform (RST) (CE6-3.1)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0193, 2019.
Pfaff et al. "CE3: Affine Linear Weighted Intra Prediciton (CE3-4.1, CE3-4.2)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0217, 2019.
Nalci et al. "Non-CE6: An Improved Context Modeling for LFNST," Joint Video Experts Team (JVET) of ITU-T SG 16 WP 3 and ISO/IEC JTC 1/SC 29/WG 11, 15th Meeting,Gothenburg, SE, Jul. 3-12, 2019, document JVET-O0373, 2019.
Rath et al. "CE3-Related: DM-Dependent Chroma Intra Prediction Modes," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0100, 2019.
Salehifar et al. "CE 6.2.6: Reduced Secondary Transform (RST)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0099, 2018.
Siekmann et al. "CE6-Related: Simplification of the Reduced Secondary Transform," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0555, 2019.
Zhang et al."Non-CE6: On LFNST Transform Set Selection for a CCLM Coded Block," Joint Video Experts Team (JVET) of ITU-T SG 16 WP 3 and ISO/IEC JTC 1/SC 29/WG 11, 15th Metting, Gothenburg, SE, Jul. 3-12, 2019, document JVET-O0219, 2019.
Zhao et al. "TU-Level Non-Separable Secondary Transform," Joint Video Exploration Team (JVET) of ITU-T SG 16 WP 3 and ISO/IEC JTC 1/SC 29/WG 11, 2nd Meeting, San Diego, USA, Feb. 20-26, 2016, document JVET-B0059, 2016.
International Search Report and Written Opinion from International Patent Application No. PCT/CN2020/089579 dated Aug. 11, 2020 (10 pages).
International Search Report and Written Opinion from International Patent Application No. PCT/CN2020/089580 dated Aug. 11, 2020 (9 pages).
International Search Report and Written Opinion from International Patent Application No. PCT/CN2020/089581 dated Aug. 10, 2020 (10 pages).
International Search Report and Written Opinion from International Patent Application No. PCT/CN2020/089582 dated Jun. 30, 2020 (9 pages).
International Search Report and Written Opinion from International Patent Application No. PCT/CN2020/089583 dated Jul. 29, 2020 (10 pages).
International Search Report and Written Opinion from International Patent Application No. PCT/CN2020/094854 dated Sep. 23, 2020 (12 pages).
International Search Report and Written Opinion from International Patent Application No. PCT/CN2020/106551 dated Oct. 10, 2020 (9 pages).
International Search Report and Written Opinion from International Patent Application No. PCT/CN2020/106561 dated Oct. 26, 2020 (11 pages).
International Search Report and Written Opinion from International Patent Application No. PCT/CN2020/109476 dated Nov. 20, 2020 (12 pages).

Non Final Office Action from U.S. Appl. No. 17/400,397 dated Dec. 2, 2021.
Non Final Office Action from U.S. Appl. No. 17/411,170 dated Jan. 12, 2022.
Non Final Office Action from U.S. Appl. No. 17/540,089 dated Feb. 1, 2022.
Albrecht et al. "Description of SDR, HDR, and 360° video Coding Technology Proposal by Fraunhofer HHI," Joint Video Experts Team (JVET) of ITU-T SG 16 WP 3 and ISO/IEC JTC 1/SC 29/WG 11 10th Meeting: San Diego, US, Apr. 10-20, 2018, document JVET-J0014, 2018.
Extended European Search Report from European Patent Application No. 20804851.2 dated Apr. 7, 2022 (10 pages.).
Final Office Action from U.S. Appl. No. 17/400,512 dated Apr. 6, 2022.
Final Office Action from U.S. Appl. No. 17/400,397 dated Apr. 11, 2022.
Ex Parte Quayle Action from U.S. Appl. No. 17/585,718 dated Apr. 20, 2022.
Non Final Office Action from U.S. Appl. No. 17/585,788 dated May 24, 2022.
Non Final Office Action from U.S. Appl. No. 17/585,741 dated Jun. 9, 2022.
Eglimez et al. "CE6-Related: Secondary Transforms Coupled with a Simplified Primary Transformation," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0405, 2018. (cited in EP20805202.7 Partial Supp ESR dated Aug. 18, 2022).
Koo et al., "Description of SDR Video Coding Technology Proposal by LG Electronics," Joint Video Experts Team (JVET) of ITU-T SG 16 WP 3 and ISO/IEC JTC 1/SC 29/WG 11 10th Meeting: San Diego, CA, Apr. 10-20, 2018, document JVET-J0017, 2018, (cited in EP20818775.7 EESR dated Jun. 23, 2022).
Rosewarne et al. "CE6-Related: RST Binarizsation," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0105, 2019. (cited in CN202080035008.5 OA1 dated Aug. 3, 2022).
Wieckowski et al. "NextSoftware: An Alternative Implementation the Joint Exploration Model (JEM)," Joint Video Exploration Team (JVET) of ITU-T SG 16 WP 3 and ISO/IEC JTC 1/SC 29/WG 118th Meeting: Macao, CN, Oct. 18-25, 2017, document JVET-H0084, 2017. (cited in EP20805202.7 Partial Supp ESR dated Aug. 18, 2022).
Zhao et al. "CE6: Coupled Primary and Secondary Transform (Test 6.3.2)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0288, 2018. (cited in EP20805202.7 Partial Supp ESR dated Aug. 18, 2022).
Partial Supplementary European Search Report from European Patent Application No. 20805202.7 dated Aug. 18, 2022 (15 pages.).
Extended European Search Report from European Patent Application No. 20818775.7 dated Jun. 23, 2022 (16 pages.).
Examination Report from Indian Patent Application No. 202127049597 dated Jul. 11, 2022 (7 pages).
Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11, 14th Meeting: Geneva, CH Mar. 19-27, 2019, document JVET-N1002,2019. (cited in EP20851000.8 EESR dated Aug. 30, 2022).
Helle et al. "CE3: Non-Liniear Weighted Intra Prediction," Joint Video Experts Team (JVET) of ITU-T SG 16 WP 3 and ISO/IEC JTC 1/SC 29/WG 11 12th Meeting, Macao, CN, Oct. 3-12, 2018, document JVET-L0199, 2018. (cited in EP20851000.8 EESR dated Aug. 30, 2022).
Extended European Search Report from European Patent Application No. 20851000.8 dated Aug. 30, 2022 (12 pages).

\* cited by examiner

CONTEXT MODELING OF REDUCED SECONDARY TRANSFORMS IN VIDEO

CROSS REFERENCE TO RELATED APPLICATIONS

This application is a continuation of International Patent Application No. PCT/CN2020/089582, filed on May 11, 2020, which claims the priority to and benefit of International Patent Application No. PCT/CN2019/086420, filed on May 10, 2019. All the aforementioned patent applications are hereby incorporated by reference in their entireties.

TECHNICAL FIELD

This patent document relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to context modeling for residual coding in video processing. The described methods may be applied to both the existing video coding standards (e.g., High Efficiency Video Coding (HEVC)) and future video coding standards or video codecs.

In one representative aspect, the disclosed technology may be used to provide a method for video processing. This method includes: performing a conversation between a current video block of a video and a coded representation of the video, wherein the conversion comprises: selecting, for the current video block of a video, a transform set or a transform matrix to be used in an application of a secondary transform tool to the current video block based on a characteristic of the current video block; and applying the selected transform set or transform matrix to the current video block, and wherein, using the secondary transform tool: during encoding, a forward secondary transform is applied to an output of a forward primary transform applied to a residual of the current video block prior to quantization, or during decoding, an inverse secondary transform is applied to an output of dequantization of the current video block before applying an inverse primary transform.

In one representative aspect, the disclosed technology may be used to provide a method for video processing. This method includes: performing a conversion between a current video block of a video and a coded representation of the video, wherein the conversion comprises applying a secondary transform tool to a sub-region of the current video block that is not a top-left part of the current video block, and wherein, using the secondary transform tool: during encoding, a forward secondary transform is applied to an output of a forward primary transform applied to a residual of the sub-region of the current video block prior to quantization, or during decoding, an inverse secondary transform is applied to an output of dequantization of the sub-region of the current video block before applying an inverse primary transform.

In one representative aspect, the disclosed technology may be used to provide a method for video processing. This method includes: determining, for a conversion between a current video block of a current picture of a video and a coded representation of the video, an applicability of a secondary transform tool for the current video block due to a rule that is related to an intra prediction direction being used for coding the current video block, a use of a coding tool, and/or a color component of the video that the current video block is from; and performing the conversion based on the determining.

In another representative aspect, the disclosed technology may be used to provide a method for video processing. This method includes: performing a conversion between a current video block of a video and a coded representation of the video, wherein the coded representation conforms to a format rule that specifies a last non-zero coefficient in a residual of the current video block and controls whether or how side information about a secondary transform tool is included in the coded representation, and wherein the secondary transform tool includes applying, during encoding, a forward secondary transform to an output of a forward primary transform applied to a residual of a video block prior to quantization, or applying, during decoding, an inverse secondary transform to an output of dequantization of the video block before applying an inverse primary transform.

In one representative aspect, the disclosed technology may be used to provide a method for video processing. This method includes: performing a conversion between a current video block of a video and a coded representation of the video, wherein the coded representation conforms to a format rule that specifies one or more coefficients in a residual of a portion of the current video block and controls whether or how side information about a secondary transform tool is included in the coded representation, and wherein the secondary transform tool includes applying, during encoding, a forward secondary transform to an output of a forward primary transform applied to a residual of a video block prior to quantization, or applying, during decoding, an inverse secondary transform to an output of dequantization to the video block before applying an inverse primary transform.

In one representative aspect, the disclosed technology may be used to provide a method for video processing. This method includes: performing a conversion between a current video block of a video and a coded representation of the video, wherein the performing of the conversion includes determining an applicability of a secondary transform tool to the current video block based on a presence of a non-zero coefficient in one or more coding groups of the current video block, and wherein the secondary transform tool includes applying, during encoding, a forward secondary transform to an output of a forward primary transform applied to a residual of a video block prior to quantization, or applying, during decoding, an inverse secondary transform to an output of dequantization of the video block before applying an inverse primary transform.

In one representative aspect, the disclosed technology may be used to provide a method for video processing. This method includes: performing a conversion between a current video block of a video and a coded representation of the current video block, wherein the coded representation conforms to a format rule specifying that a syntax element corresponding to side information of a secondary transform tool for the current video block is signaled in the coded representation before transform related information, wherein the secondary transform tool includes applying, during encoding, a forward secondary transform to an output of a forward primary transform applied to a residual of a video block prior to quantization, or applying, during decoding, an inverse secondary transform to an output of dequantization of the video block before applying an inverse primary transform.

In one representative aspect, the disclosed technology may be used to provide a method for video processing. This method includes: performing a conversion between a current video block of a video and a coded representation of the video, wherein the coded representation conforms to a format rule specifying that a syntax element corresponding to side information of a secondary transform tool for the current video block is signaled in the coded representation before residual coding information, wherein the secondary transform tool includes applying, during encoding, a forward secondary transform to an output of a forward primary transform applied to a residual of a video block prior to quantization, or applying, during decoding, an inverse secondary transform to an output of dequantization to the video block before applying an inverse primary transform.

In one representative aspect, the disclosed technology may be used to provide a method for video processing. This method includes: performing a conversion between a current video block of a video and a coded representation of the video, wherein the performing of the conversion includes coding a residual of the current video block according to a rule based on information related to the secondary transform tool, wherein the secondary transform tool includes applying, during encoding, a forward secondary transform to an output of a forward primary transform applied to a residual of a video block prior to quantization, or applying, during decoding, an inverse secondary transform to an output of dequantization to the video block before applying an inverse primary transform.

In one representative aspect, the disclosed technology may be used to provide a method for video processing. This method includes: performing a conversion between a current video block of a video and a coded representation of the video, wherein the performing of the conversion includes applying, to one or more portions of the current video block, an arithmetic coding using different context modeling methods according to a rule.

In another representative aspect, the disclosed technology may be used to provide a method for video processing. This method includes performing a conversion between a current video block of a video and a coded representation of the video, wherein the performing of the conversion includes configuring, based on a characteristic of the current video block of a video, a context model for coding a bin or bypass coding the bin of a bin string corresponding to an index of a secondary transform tool, wherein the index indicates an applicability of the secondary transform tool and/or a kernel information of the secondary transform tool, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

In one representative aspect, the disclosed technology may be used to provide a method for video processing. This method includes: performing a conversion between a current video block of a video and a coded representation of the current video block, wherein the performing of the conversion includes determining, based on a dimension of the current video block, whether a syntax element is included in the coded representation, wherein the syntax element corresponds to side information of a secondary transform tool which comprises at least one of indication of applying the secondary transform and an index of the transform kernels used in a secondary transform process, and wherein, using the secondary transform, an inverse secondary transform is used for decoding the coded representation and applied to an output of dequantization of the current video block before applying an inverse primary transform.

In one representative aspect, the disclosed technology may be used to provide a method for video processing. This method includes: performing a conversion between a current video block of a video and a coded representation of the current video block, wherein the performing of the conversion includes determining, based on a dimension of the current video block, whether a syntax element is included in the coded representation of the current video block, wherein the syntax element corresponds to side information of a secondary transform which comprises at least one of indication of applying the secondary transform and an index of the transform kernels used in a secondary transform process, and wherein, using the secondary transform, a forward secondary transform that is used for encoding the current video block and applied to an output of a primary transform of the current video block before applying quantization process.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

2 Video Coding Introduction

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) [3][4]. In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Coding Flow of a Typical Video Codec

Figure 1:
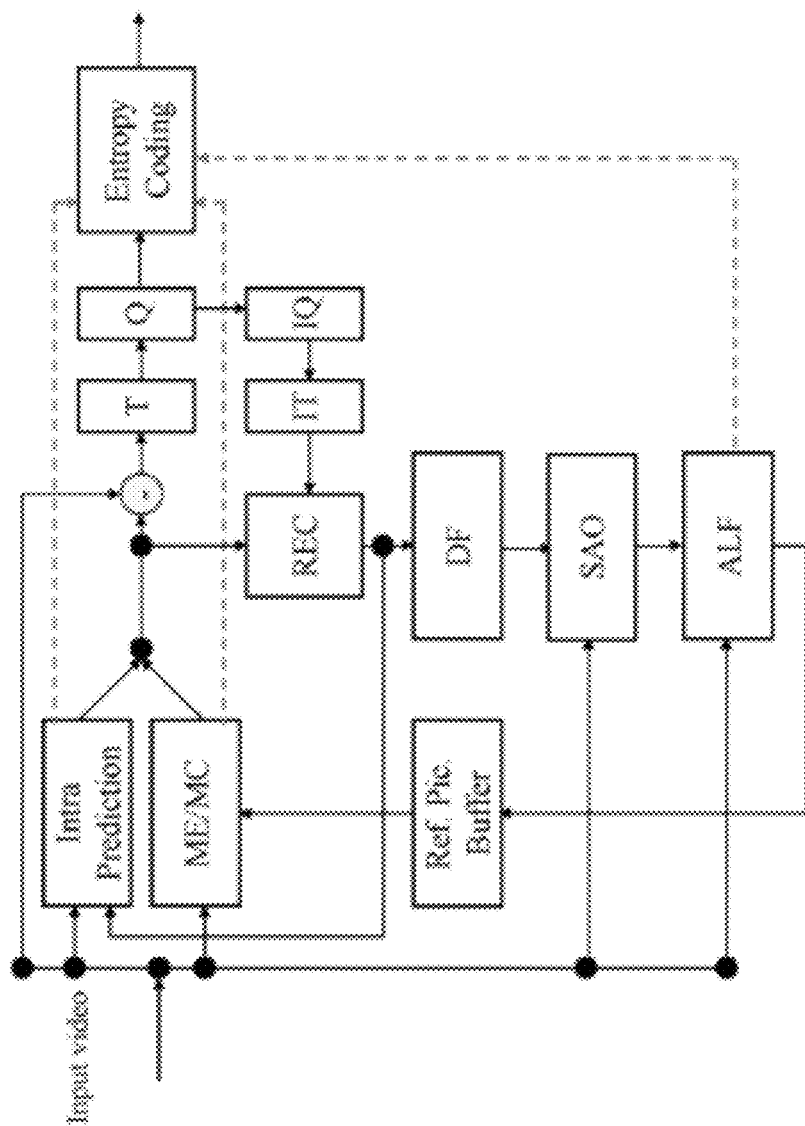
FIG. 1 shows a block diagram of an example encoder.

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2 Intra Coding in VVC 2.2.1 Intra Mode Coding with 67 Intra Prediction Modes

To capture the arbitrary edge directions presented in natural video, the number of directional intra modes is extended from 33, as used in HEVC, to 65. The additional directional modes are depicted as dotted arrows in FIG. 2, and the planar and DC modes remain the same. These denser directional intra prediction modes apply for all block sizes and for both luma and chroma intra predictions.

Figure 2:
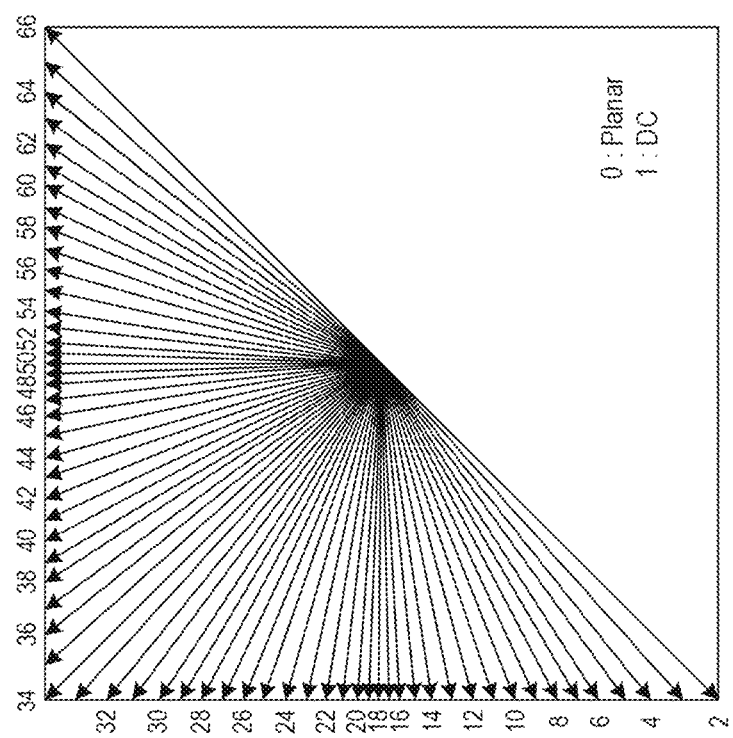
FIG. 2 shows an example of 67 intra prediction modes.
Figure 3:
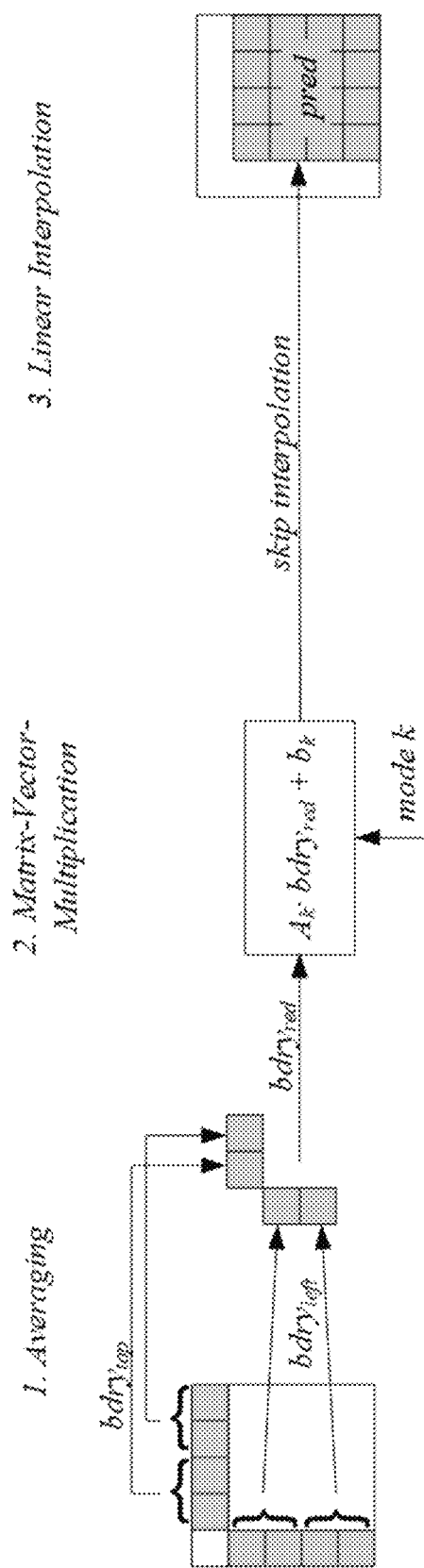
FIG. 3 shows an example of ALWIP for 4×4 blocks.
Figure 4:
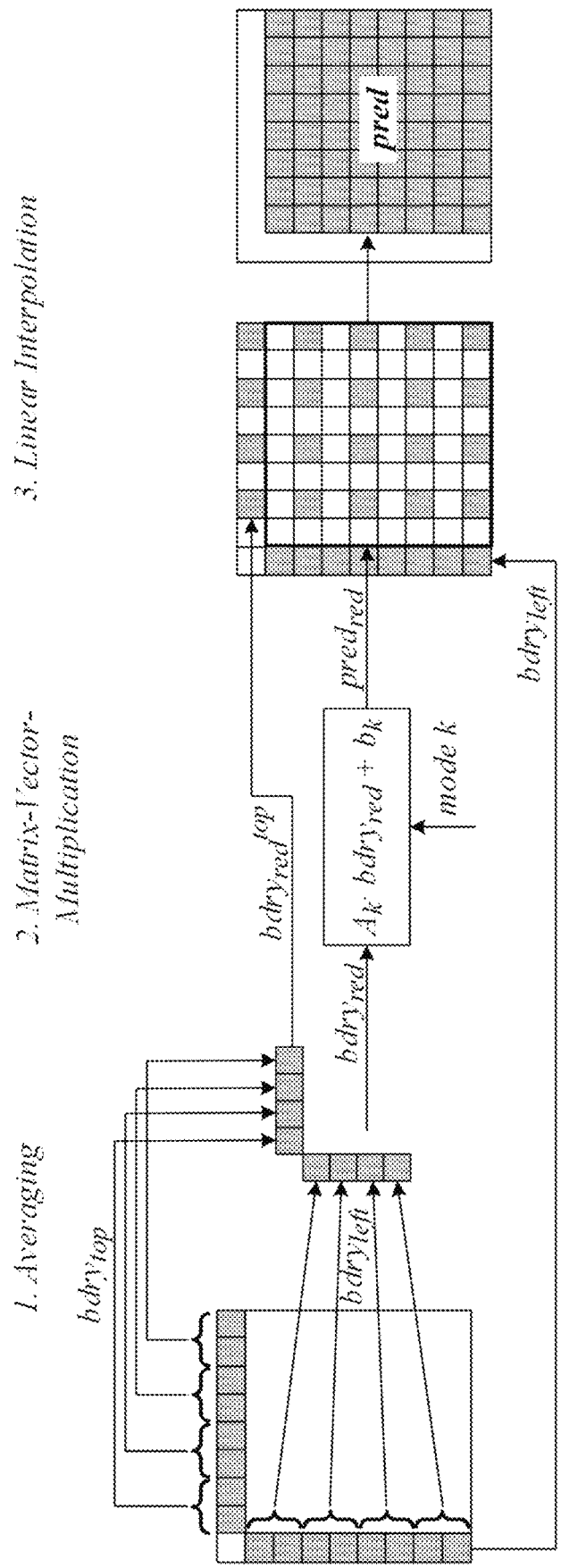
FIG. 4 shows an example of ALWIP for 8×8 blocks.
Figure 5:
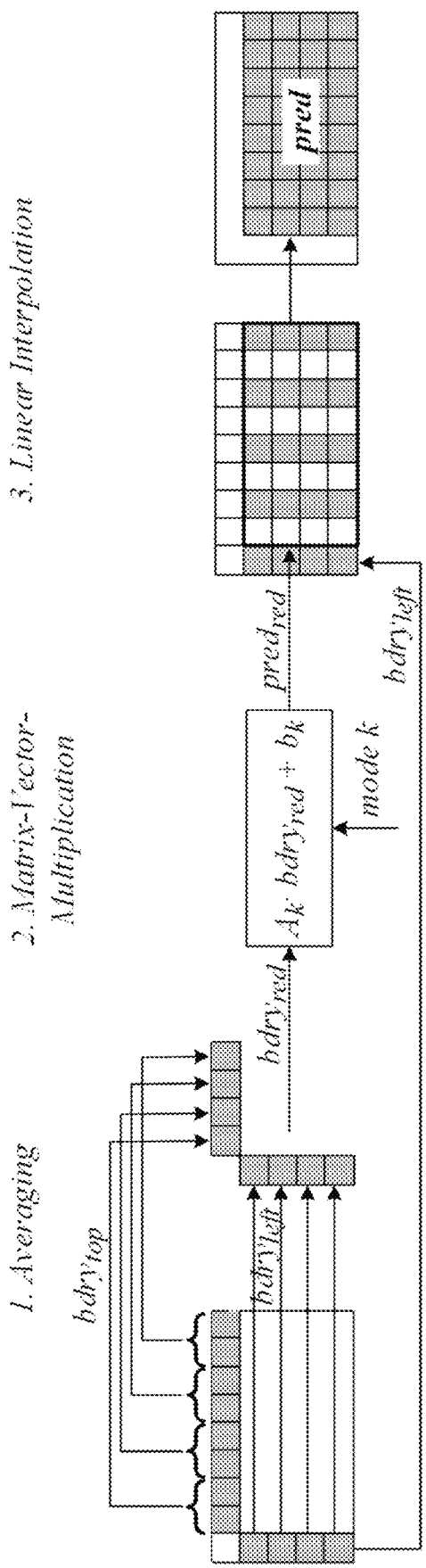
FIG. 5 shows an example of ALWIP for 8×4 blocks.
Figure 6:
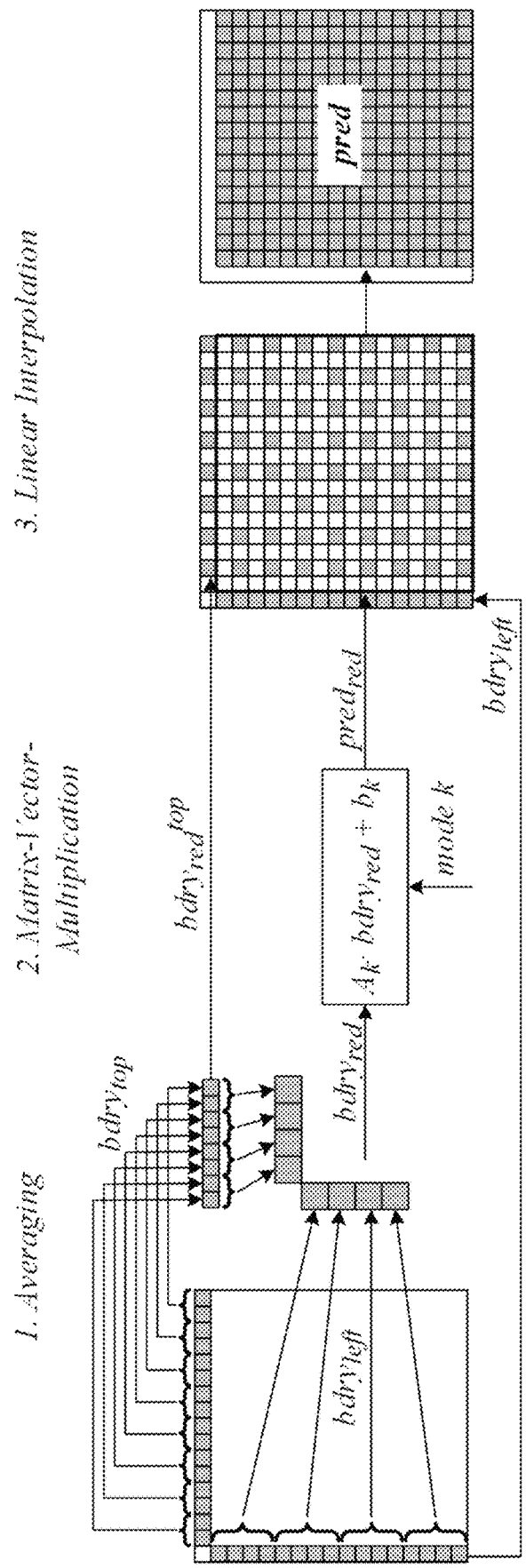
FIG. 6 shows an example of ALWIP for 16×16 blocks.

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

In addition to the 67 intra prediction modes, wide-angle intra prediction for non-square blocks (WAIP) and position dependent intra prediction combination (PDPC) methods are further enabled for certain blocks. PDPC is applied to the following intra modes without signalling: planar, DC, horizontal, vertical, bottom-left angular mode and its eight adjacent angular modes, and top-right angular mode and its eight adjacent angular modes.

2.2.2 Affine Linear Weighted Intra Prediction (ALWIP or Matrix-Based Intra Prediction)

Affine linear weighted intra prediction (ALWIP, a.k.a. Matrix based intra prediction (MIP)) is proposed in JVET-N0217.

2.2.2.1 Generation of the Reduced Prediction Signal by Matrix Vector Multiplication The neighboring reference samples are firstly down-sampled via averaging to generate the reduced reference signal $bdry_{red}$. Then, the reduced prediction signal $pred_{red}$ is computed by calculating a matrix vector product and adding an offset:

$$pred_{red} = A \cdot bdry_{red} + b$$

Here, A is a matrix that has $W_{red} \cdot H_{red}$ rows and 4 columns if W=H=4 and 8 columns in all other cases. b is a vector of size $W_{red} \cdot H_{red}$.

2.2.2.2 Illustration of the Entire ALWIP Process

The entire process of averaging, matrix vector multiplication and linear interpolation is illustrated for different shapes in FIGS. 3-6. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.

2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical positions.

Finally, for W×4 blocks with W>8, let A_kbe the matrix that arises by leaving out every row that corresponds to an odd entry along the horizontal axis of the downsampled block. Thus, the output size is 32 and again, only horizontal interpolation remains to be performed.

The transposed cases are treated accordingly.

2.2.2.3 Syntax and Semantics 7.3.6.5 Coding Unit Syntax

| coding_unit( x0, y0, cbWidth, cbHeight, treeType ) { | Descriptor |
|---|---|
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0] = = 0 && tile_group_type ! = I ) | |
|       pred_mode_flag | ae(v) |
|     if( ( ( tile_group_type = = I && cu_skip_flag[ x0 ][ y0 ] = = 0 ) \|\| | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( abs( Log2( cbWidth ) − Log2( cbHeight) ) <= 2) | |
|           intra_lwip_flag[ x0 ][ y0 ] | ae(v) |
|         if( intra_lwip_flag[ x0 ][ y0 ] ) { | |
|           intra_lwip_mpm_flag[ x0 ][ y0 ] | ae(v) |
|           if( intra_lwip_mpm_flag[ x0 ][ y0 ] ) | |
|             intra_lwip_mpm_idx[ x0 ][ y0 ] | ae(v) |
|           else | |
|             intra_lwip_mpm_remainder[ x0 ][ y0 ] | ae(v) |
|         } else { | |
|           if( ( y0 % CtbSizeY ) > 0) | |
|             intra_luma_ref_idx[ x0 ][ y0 ] | ae(v) |
|           if (intra_luma_ref_idx[ x0 ][ y0 ] = = 0 && | |
|             ( cbWidth <= MaxTbSizeY \|\| cbHeight <= MaxTbSizeY) && | |
|             ( cbWidth * cbHeight > MinTbSizeY * MinTbSizeY )) | |
|             intra_subpartitions_mode_flag[ x0 ][ y0 ] | ae(v) |
|           if( intra_subpartitions_mode_flag[ x0 ][ y0 ] = = 1 && | |
|             cbWidth <= MaxTbSizeY && cbHeight <= MaxTbSizeY ) | |
|             intra_subpartitions_split_flag[ x0 ][ y0 ] | ae(v) |
|           if( intra_luma_ref_idx[ x0 ][ y0 ] = = 0 && | |
|             intra_subpartitions_mode_flag[ x0 ][ y0 ] = = 0) | |

-continued

```
coding_unit( x0, y0, cbWidth, cbHeight, treeType ) {                                    Descriptor
            intra_luma_mpm_flag[ x0 ][ y0 ]                                             ae(v)
          if( intra_luma_mpm_flag[ x0 ][ y0 ] )
            intra_luma_mpm_idx[ x0 ][ y0 ]                                              ae(v)
          else
            intra_luma_mpm_remainder[ x0 ][ y0 ]                                        ae(v)
        }
      }
      if( treeType = = SINGLE_TREE | | treeType = = DUAL_TREE_CHROMA )
        intra_chroma_pred_mode[ x0 ][ y0 ]                                              ae(v)
      }
    } else if( treeType != DUAL_TREE_CHROMA ) { /* MODE_INTER or MODE_
    IBC */
    ...
    }
}
```

2.2.3 Multiple Reference Line (MRL)

Figure 7:
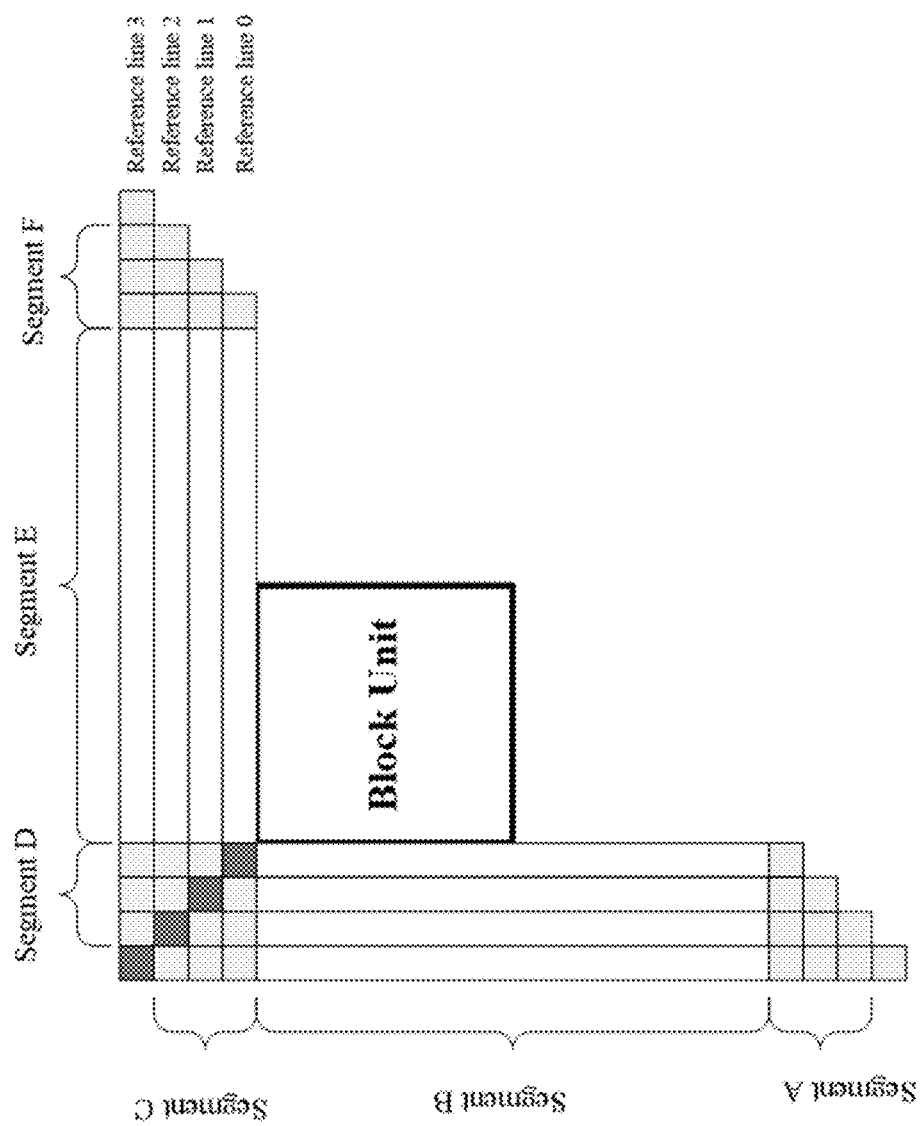
FIG. 7 shows an example of four reference lines neighboring a prediction block.

Multiple reference line (MRL) intra prediction uses more reference lines for intra prediction. In FIG. 7, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line index, which is greater than 0, only include additional reference line modes in MPM list and only signal MPM index without remaining mode. The reference line index is signaled before intra prediction modes, and Planar and DC modes are excluded from intra prediction modes in case a nonzero reference line index is signaled.

MRL is disabled for the first line of blocks inside a CTU to prevent using extended reference samples outside the current CTU line. Also, PDPC is disabled when additional line is used.

2.2.4 Intra Sub-Block Partitioning (ISP)

Figure 8:
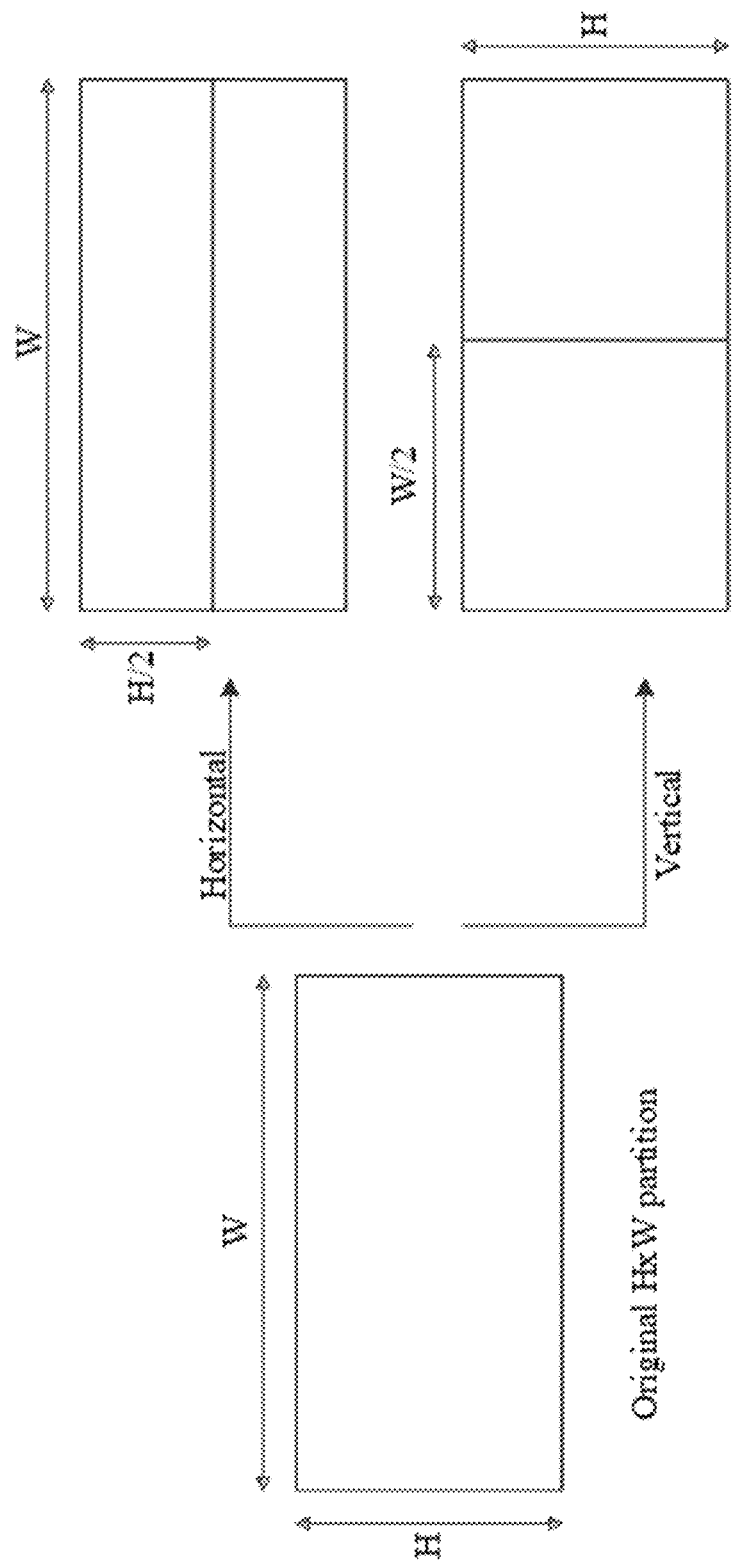
FIG. 8 shows an example of divisions of 4×8 and 8×4 blocks.
Figure 9:
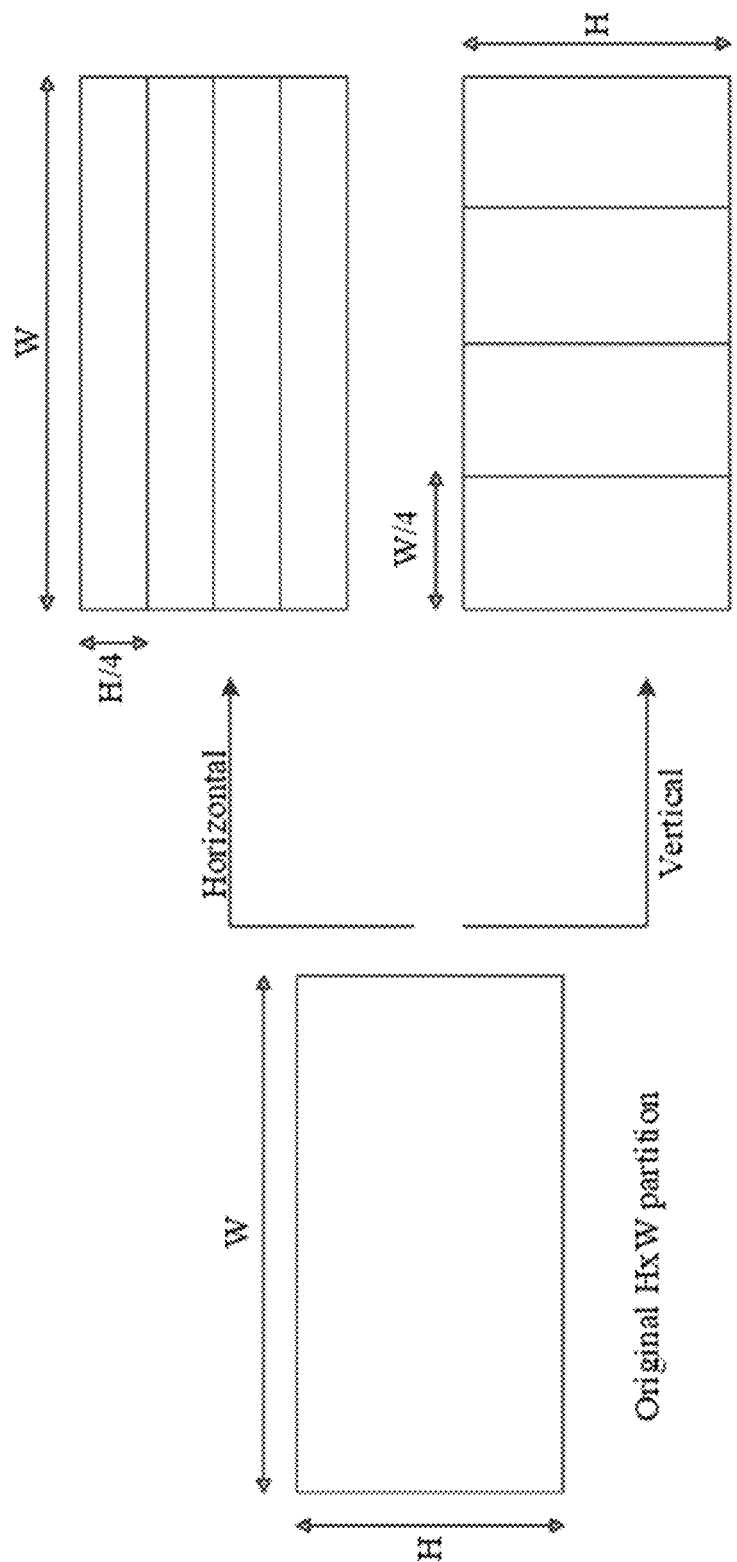
FIG. 9 shows an example of divisions all blocks except 4×8, 8×4 and 4×4.

In JVET-M0102, ISP is proposed, which divides luma intra-predicted blocks vertically or horizontally into 2 or 4 sub-partitions depending on the block size dimensions, as shown in Table 1. FIG. 8 and FIG. 9 show examples of the two possibilities. All sub-partitions fulfill the condition of having at least 16 samples. For block sizes, 4×N or N×4 (with N>8), if allowed, the 1×N or N×1 sub-partition may exist.

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

TABLE 1

Number of sub-partitions depending on the block size
(denoted maximum transform size by maxTB Size)

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTBSize and H <= maxTBSize | 4 |
| Horizontal | If not above cases and H > maxTBSize | 4 |
| Vertical | If not above cases and H > maxTBSize | 4 |

TABLE 2

Specification of trTypeHor and trTypeVer depending on predModeIntra

| predModeIntra | trTypeHor | trTypeVer |
|---|---|---|
| INTRA_PLANAR, INTRA_ANGULAR31, | ( nTbW >= 4 && nTbW <= 16 ) ? | ( nTbH >= 4 && nTbH <= 16 ) ? |
| INTRA_ANGULAR32, | DST-VII: | DST-VII:DCT-II |
| INTRA_ANGULAR34, | DCT-II | |
| INTRA_ANGULAR36, | | |
| INTRA_ANGULAR37 | | |
| INTRA_ANGULAR33, INTRA_ANGULAR35 | DCT-II | DCT-II |
| INTRA_ANGULAR2, INTRA_ANGULAR4, . . ., INTRA_ANGULAR28, | ( nTbW >= 4 && nTbW <= 16) ? DST-VII: | DCT-II |
| INTRA_ANGULAR30, INTRA_ANGULAR39, INTRA_ANGULAR41, . . ., INTRA_ANGULAR63, INTRA_ANGULAR65 | DCT-II | |
| INTRA_ANGULAR3, INTRA_ANGULAR5, . . ., INTRA_ANGULAR27, INTRA_ANGULAR29, INTRA_ANGULAR38, INTRA_ANGULAR40, . . ., INTRA_ANGULAR64, INTRA_ANGULAR66 | DCT-II | ( nTbH >= 4 && nTbH <= 16) ? DST-VII:DCT-II |

2.2.4.1 Syntax and Semantics
7.3.7.5 Coding Unit Syntax

| coding_unit( x0, y0, cbWidth, cbHeight, treeType ) { | Descriptor |
|---|---|
|   if( slice_type !=I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|     if( ( ( slice_type = = I && cu_skip_flag[ x0 ][ y0 ] = =0) \|\| | |
|       ( slice_type != I && CuPredMode[ x0][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0 % CtbSizeY ) > 0) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY \|\| cbHeight <= MaxTbSizeY) && | |
|           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|           cbWidth <= MaxTbSizeY && cbHeight <= MaxTbSizeY) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE_TREE \|\| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|   ... | |
|   } | |
| ... | |
| } | | intra_subpartitions_mode_flag[x0][y0] equal to 1 specifies that the current intra coding unit is partitioned into NumIntraSubPartitions[x0][y0] rectangular transform block subpartitions.

intra_subpartitions_mode_flag[x0][y0] equal to 0 specifies that the current intra coding unit is not partitioned into rectangular transform block subpartitions.

When intra_subpartitions_mode_flag[x0][y0] is not present, it is inferred to be equal to 0.

intra_subpartitions_split_flag[x0][y0] specifies whether the intra subpartitions split type is horizontal or vertical.

When intra_subpartitions_split_flag[x0][y0] is not present, it is inferred as follows:
  If cbHeight is greater than MaxTbSizeY, intra_subpartitions_split_flag[x0][y0] is inferred to be equal to 0.
  Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 7-9. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 7-9

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions an intra luma coding block is divided into. NumIntraSubPartitions is derived as follows:
  If IntraSubPartitionsSplitType is equal to ISP_NO_SPLIT, NumIntraSubPartitions is set equal to 1.
  Otherwise, if one of the following conditions is true, NumIntraSubPartitions is set equal to 2:
    cbWidth is equal to 4 and cbHeight is equal to 8,
    cbWidth is equal to 8 and cbHeight is equal to 4.
  Otherwise, NumIntraSubPartitions is set equal to 4.

2.3 Chroma Intra Mode Coding

For chroma intra mode coding, a total of 8 or 5 intra modes are allowed for chroma intra mode coding depending on whether cross-component linear model (CCLM) is enabled or not. Those modes include five traditional intra modes and three cross-component linear model modes. Chroma DM mode use the corresponding luma intra prediction mode. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 8-3

Specification of IntraPredModeC[ xCb ][ yCb ] depending on intra_chroma_pred_mode[ xCb ][ yCb ] and IntraPredModeY [ xCb + cbWidth/2 ][ yCb + cbHeight/2 ] when sps_cclm_enabled_flag is equal to 0

| intra_chroma_pred_mode [ xCb ][ yCb ] | IntraPredModeY [ xCb + cbWidth/2 ] [ yCb + cbHeight/2 ] | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 (DM) | 0 | 50 | 18 | 1 | X |

TABLE 8-3

Specification of IntraPredModeC[ xCb ][ yCb ] depending on intra_chroma_pred_mode[ xCb ][ yCb ] and IntraPredModeY [ xCb + cbWidth/2 ][ yCb + cbHeight/2 ] when sps_cclm_enabled_flag is equal to 1

| intra_chroma_pred_mode [ xCb ][ yCb ] | IntraPredModeY [ xCb + cbWidth/2 ] [ yCb + cbHeight/2 ] | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 (DM) | 0 | 50 | 18 | 1 | X |

2.4 Transform Coding in VVC
2.4.1 Multiple Transform Set (MTS) in VVC
2.4.1.1 Explicit Multiple Transform Set (MTS)

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. The Table 4 below shows the basis functions of the selected DST/DCT.

TABLE 4

Basis functions of transform matrices used in VVC

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signaled to indicate whether MTS is applied or not. Here, MTS is applied only for luma. The MTS CU level flag is signaled when the following conditions are satisfied.

Both width and height smaller than or equal to 32
CBF flag is equal to one

If MTS CU flag is equal to zero, then DCT2 is applied in both directions. However, if MTS CU flag is equal to one, then two other flags are additionally signaled to indicate the transform type for the horizontal and vertical directions, respectively. Transform and signaling mapping table as shown in Table 5. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 5

Mapping of decoded value of tu_mts_idx and corresponding transform matrices for the horizontal and vertical directions.

| Bin string of tu_mts_idx | tu_mts_idx | Intra/inter | |
|---|---|---|---|
| | | Horizontal | Vertical |
| 0 | 0 | DCT2 | |
| 1 0 | 1 | DST7 | DST7 |
| 1 1 0 | 2 | DCT8 | DST7 |

TABLE 5-continued

Mapping of decoded value of tu_mts_idx
and corresponding transform matrices
for the horizontal and vertical directions.

| Bin string of tu_mts_idx | tu_mts_idx | Intra/inter Horizontal | Vertical |
|---|---|---|---|
| 1 1 1 0 | 3 | DST7 | DCT8 |
| 1 1 1 1 | 4 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

In addition to the cases wherein different transforms are applied, VVC also supports a mode called transform skip (TS) which is like the concept of TS in the HEVC. TS is treated as a special case of MTS.

2.4.2 Reduced Secondary Transform (RST) Proposed in JVET-N0193

2.4.2.1 Non-Separable Secondary Transform (NSST) in JEM

Figure 10:
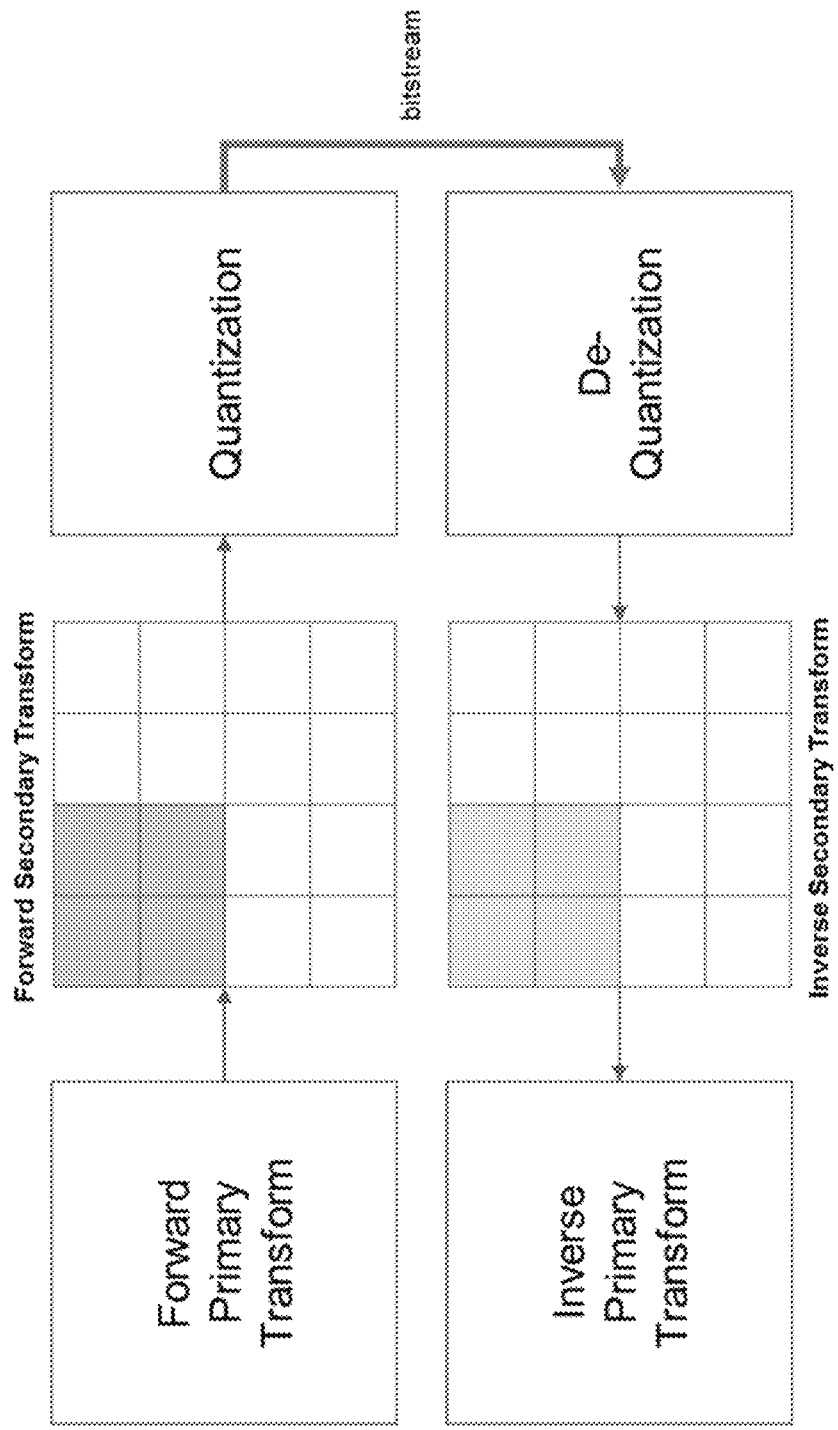
FIG. 10 shows an example of a secondary transform in JEM.

In JEM, secondary transform is applied between forward primary transform and quantization (at encoder) and between de-quantization and invert primary transform (at decoder side). As shown in FIG. 10, 4×4 (or 8×8) secondary transform is performed depends on block size. For example, 4×4 secondary transform is applied for small blocks (i.e., min (width, height) <8) and 8×8 secondary transform is applied for larger blocks (i.e., min (width, height) >4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00}\, X_{01}\, X_{02}\, X_{03}\, X_{10}\, X_{11}\, X_{12}\, X_{13}\, X_{20}\, X_{21}\, X_{22}\, X_{23}\, X_{30}\, X_{31}\, X_{32}\, X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform (NSST) candidate is further specified by the explicitly signalled secondary transform index. The index is signalled in a bit-stream once per Intra CU after transform coefficients.

2.4.2.2 Reduced Secondary Transform (RST) in JVET-N0193

Figure 11:
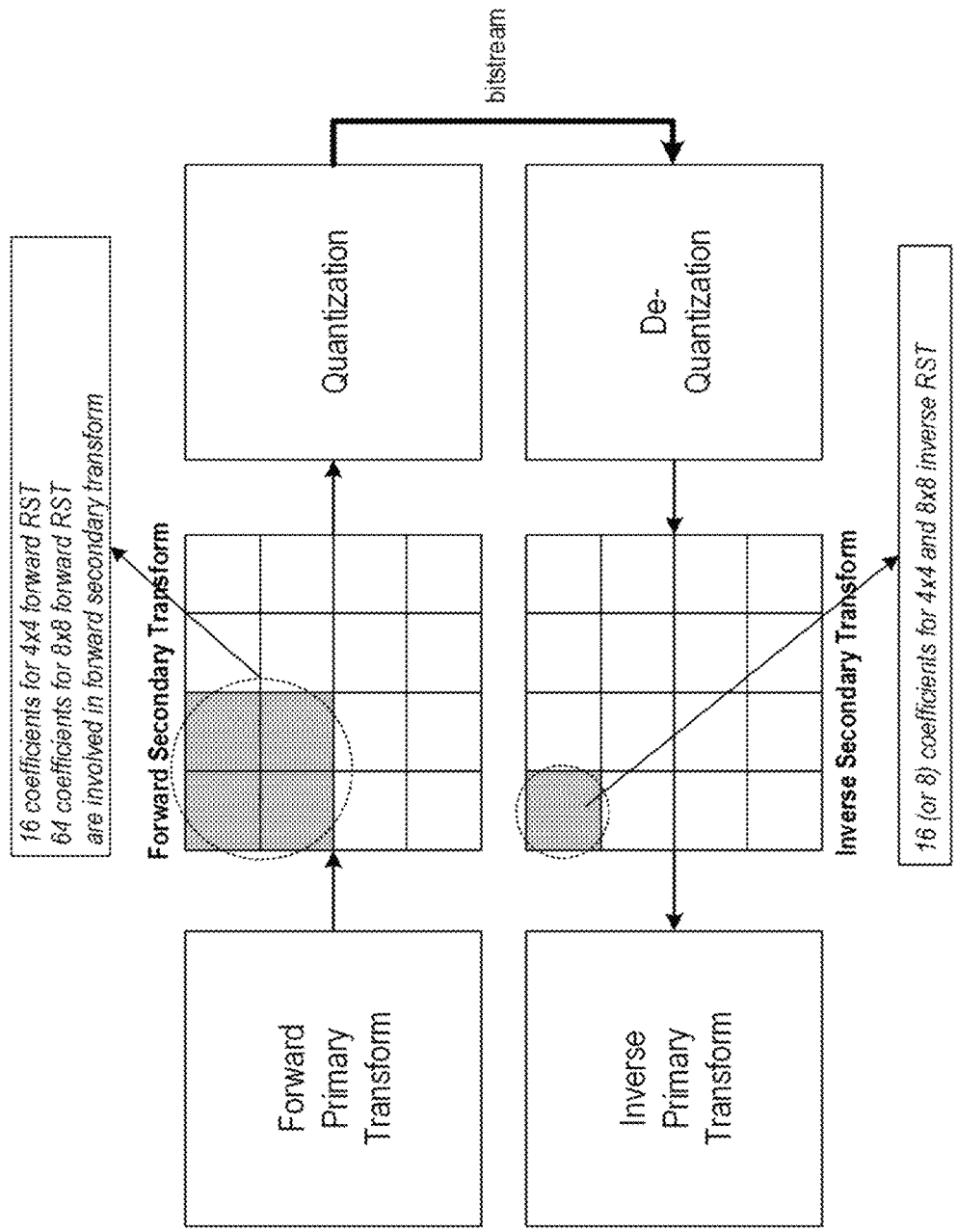
FIG. 11 shows an example of the proposed reduced secondary transform (RST).

The RST (a.k.a. Low Frequency Non-Separable Transform (LFNST)) was introduced in JVET-K0099 and 4 transform set (instead of 35 transform sets) mapping introduced in JVET-L0133. In this JVET-N0193, 16×64 (further reduced to 16×48) and 16×16 matrices are employed. For notational convenience, the 16×64 (reduced to 16×48) transform is denoted as RST8×8 and the 16×16 one as RST4×4. FIG. 11 shows an example of RST.

2.4.2.2.1 RST Computation

The main idea of a Reduced Transform (RT) is to map an N dimensional vector to an R dimensional vector in a different space, where R/N (R<N) is the reduction factor.

Figure 12:
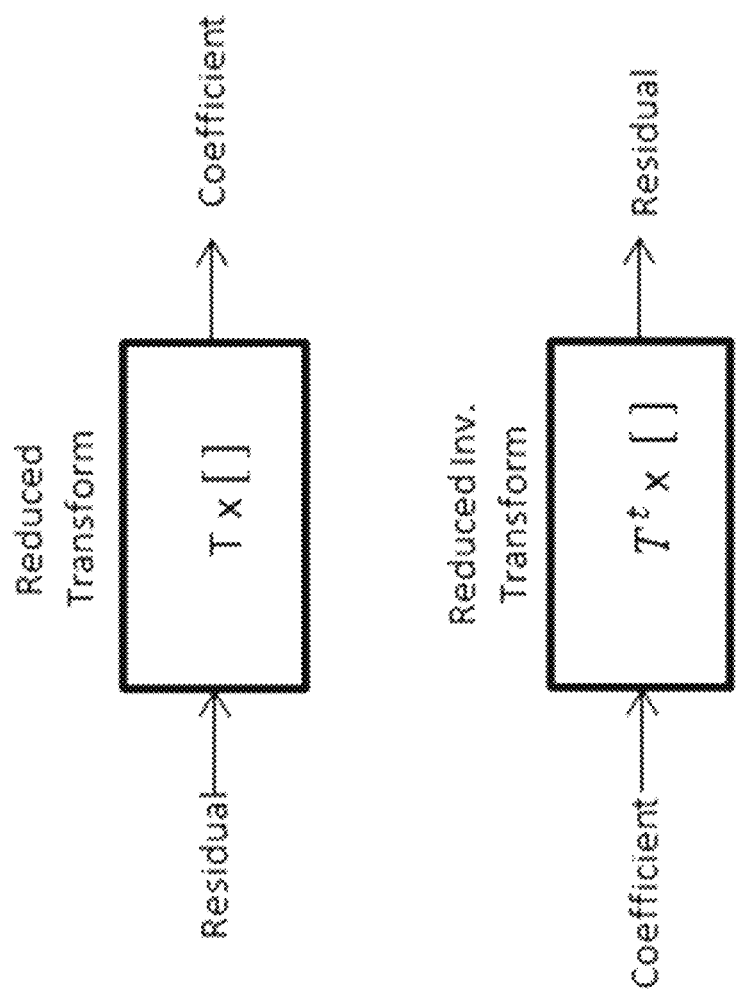
FIG. 12 shows examples of the forward and inverse reduced transforms.

The RT matrix is an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform. The forward and invert RT are depicted in FIG. 12.

In this contribution, the RST8×8 with a reduction factor of 4 (¼ size) is applied. Hence, instead of 64×64, which is conventional 8×8 non-separable transform matrix size, 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

An invert RST is conditionally applied when the following two conditions are satisfied:

Block size is greater than or equal to the given threshold (W>=4 && H>=4)

Transform skip mode flag is equal to zero

If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma.

2.4.2.2.2 Restriction of RST

When ISP mode is selected, RST is disabled, and RST index is not signaled, because performance improvement was marginal even if RST is applied to every feasible partition block. Furthermore, disabling RST for ISP-predicted residual could reduce encoding complexity.

2.4.2.2.3 RST Selection

A RST matrix is chosen from four transform sets, each of which consists of two transforms. Which transform set is applied is determined from intra prediction mode as the following:

(1) If one of three CCLM modes is indicated, transform set 0 is selected.
(2) Otherwise, transform set selection is performed according to the following table:

| The transform set selection table | |
|---|---|
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access the above table, denoted as IntraPredMode, have a range of [−14, 83], which is a transformed mode index used for wide angle intra prediction.

2.4.2.2.4 RST Matrices of Reduced Dimension

Figure 13:
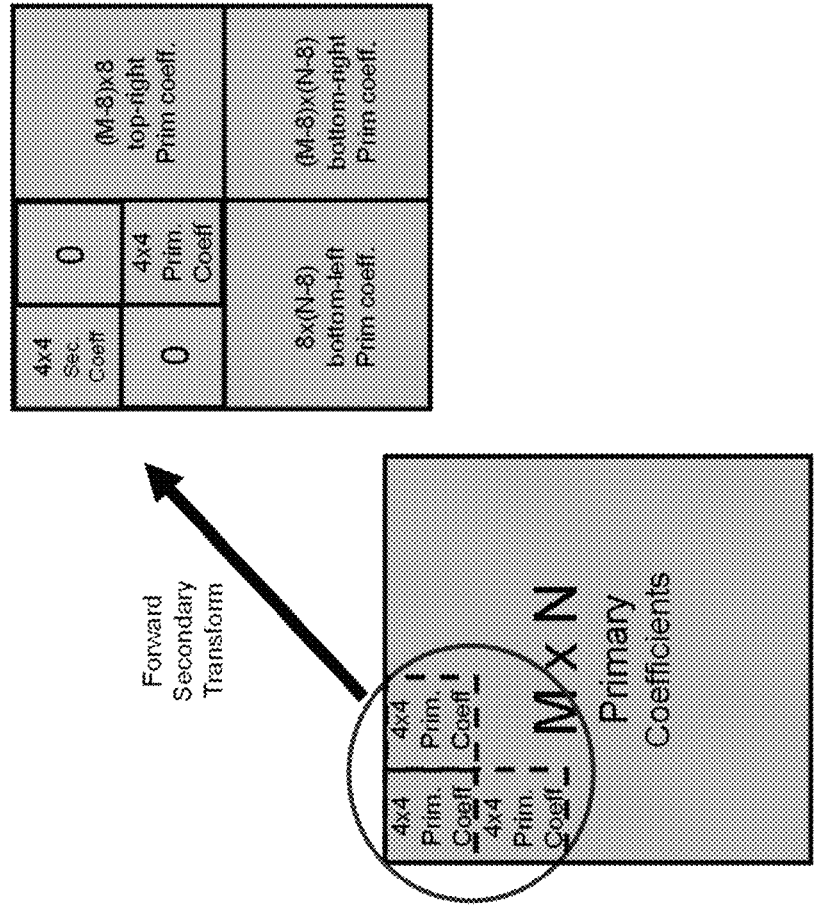
FIG. 13 shows an example of a forward RST 8×8 process with a 16×48 matrix.
Figure 13:
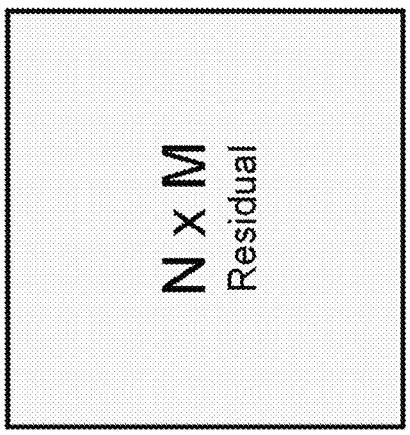

As a further simplification, 16×48 matrices are applied instead of 16×64 with the same transform set configuration, each of which takes 48 input data from three 4×4 blocks in a top-left 8×8 block excluding right-bottom 4×4 block (as shown in FIG. 13).

2.4.2.2.5 RST Signaling

The forward RST8×8 uses 16×48 matrices so that it produces non-zero coefficients only in the top-left 4×4 region within the first 3 4×4 region. In other words, if RST8×8 is applied, only the top-left 4×4 (due to RST8×8) and bottom right 4×4 region (due to primary transform) may have non-zero coefficients. As a result, RST index is not coded when any non-zero element is detected within the top-right 4×4 and bottom-left 4×4 block region (shown in FIG. 14, and referred to as "zero-out" regions) because it implies that RST was not applied. In such a case, RST index is inferred to be zero.

2.4.2.2.6 Zero-Out Region within One CG

Usually, before applying the invert RST on a 4×4 sub-block, any coefficient in the 4×4 sub-block may be non-zero. However, it is constrained that in some cases, some coefficients in the 4×4 sub-block must be zero before invert RST is applied on the sub-block.

Let nonZeroSize be a variable. It is required that any coefficient with the index no smaller than nonZeroSize when it is rearranged into a 1-D array before the invert RST must be zero.

When nonZeroSize is equal to 16, there is no zero-out constrain on the coefficients in the top-left 4×4 sub-block.

Figure 14:
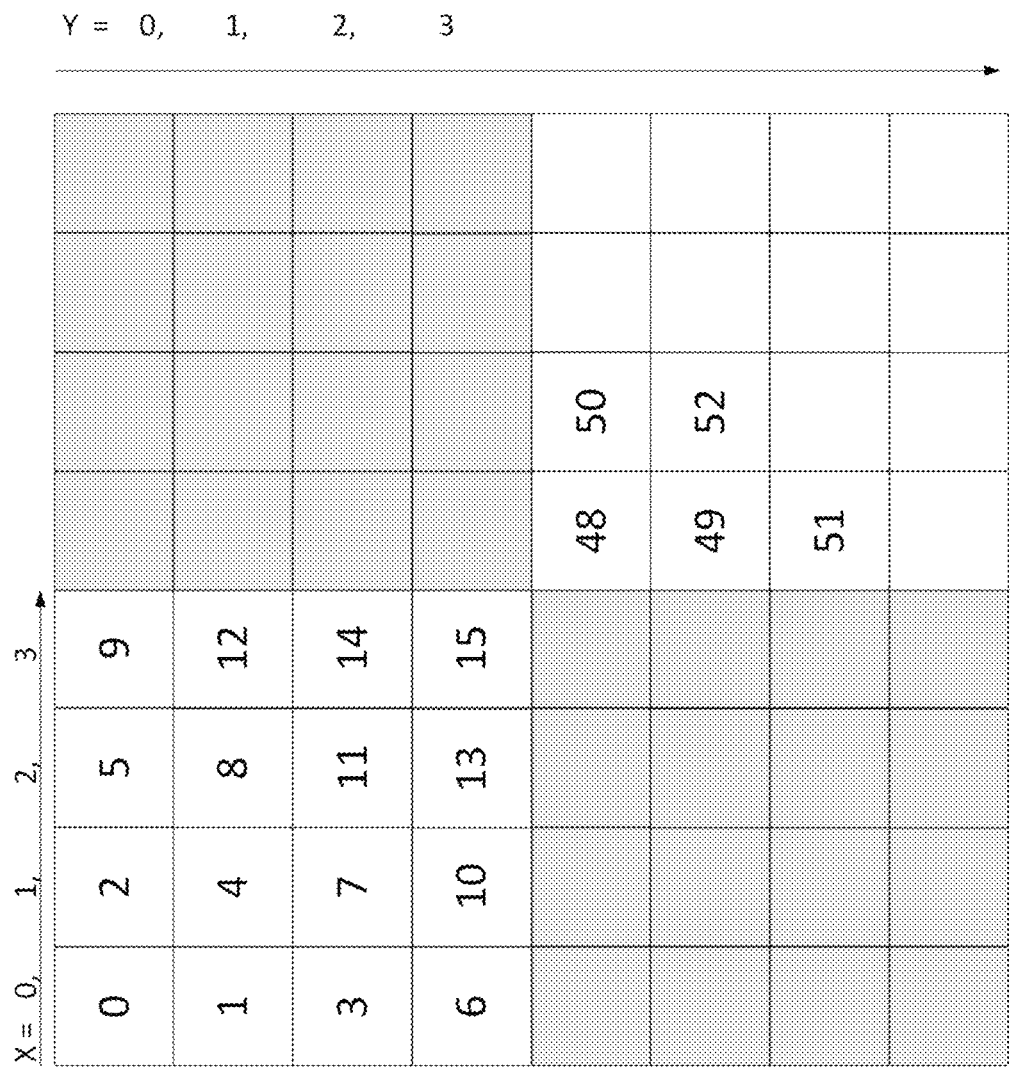
FIG. 14 shows an example of a zero-out region for an 8×8 matrix.
Figure 15:
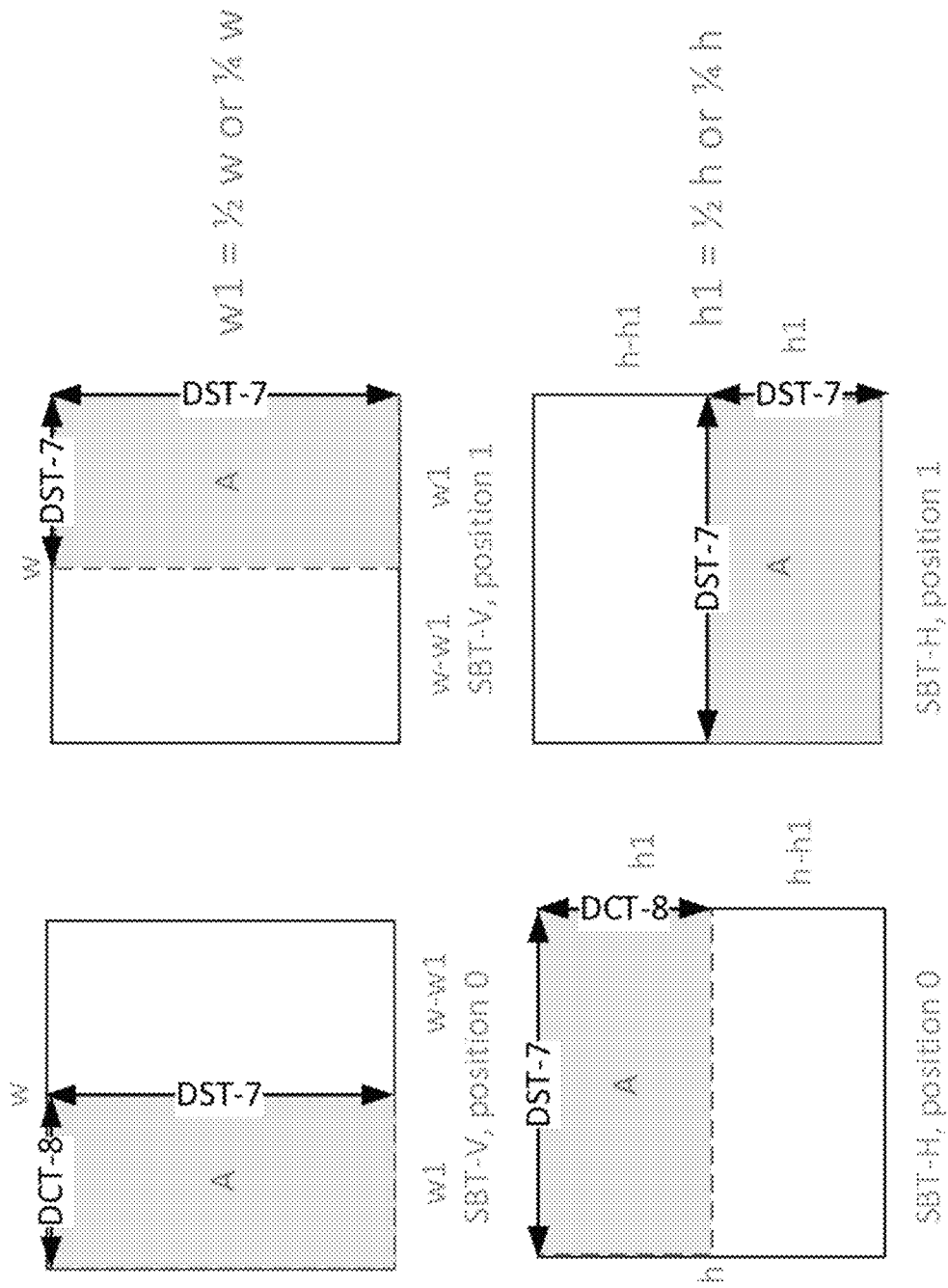
FIG. 15 shows an example of sub-block transform modes SBT-V and SBT-H.

In JVET-N0193, when the current block size is 4×4 or 8×8, nonZeroSize is set equal to 8 (that is, coefficients with the scanning index in the range [8, 15] as show in FIG. 14, shall be 0). For other block dimensions, nonZeroSize is set equal to 16.

2.4.2.2.7 Description of RST in Working Draft

7.3.2.3 Sequence Parameter Set RBSP Syntax

| | Descriptor |
|---|---|
| seq_parameter_set_rbsp( ) { | |
| ...... | |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| ... | |
| sps_st_enabled_flag | u(1) |
| ... | |
| } | |

7.3.7.11 Residual Coding Syntax

| | Descriptor |
|---|---|
| residual_coding( x0, y0, log2TbWidth, log2TbHeight, cIdx ) { | |
| ... | |
|   if( coded_sub_block_flag[ xS ][ yS ] && ( n > 0 \|\| !inferSbDcSigCoeffFlag ) && | |
|     ( xC != LastSignificantCoeffX \|\| yC != LastSignificantCoeffY ) ) { | |
|     sig_coeff_flag[ xC ][ yC ] | ae(v) |
|     remBinsPass1− − | |
|     if( sig_coeff_flag[ xC ][ yC ] ) | |
|       inferSbDcSigCoeffFlag = 0 | |
|   } | |
|   if( sig_coeff_flag[ xC ][ yC ] ) { | |
|     if( !transform_skip_flag[ x0 ][ y0 ] ) { | |
|       numSigCoeff++ | |
|       if( ( ( ( log2TbWidth == 2 && log2TbHeight == 2 ) \|\| ( log2TbWidth == 3 && log2TbHeight == 3 ) ) && n >= 8 && i == 0) \|\| ( ( log2TbWidth >= 3 && log2TbHeight >= 3 && ( i == 1 \|\| i == 2 ) ) ) ) { | |
|         numZeroOutSigCoeff++ | |
|       } | |
|     } | |
|     abs_level_gt1_flag[ n ] | ae(v) |
| ... | |

7.3.7.5 Coding Unit Syntax

|  | Descriptor |
|---|---|
| coding_unit( x0, y0, cbWidth, cbHeight, treeType ) { | |
| ... | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae(v) |
|     if( cu_cbf ) { | |
|       if( CuPredMode[ x0 ][ y0 ] = = MODE_INTER && sps_sbt_enabled_flag && | |
|         !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |
|           allowSbtHorQ = cbHeight >= 16 | |
|           if( allowSbtVerH \|\| allowSbtHorH \|\| allowSbtVerQ \|\| allowSbtHorQ ) | |
|             cu_sbt_flag | ae(v) |
|         } | |
|         if( cu_sbt_flag ) { | |
|           if( ( allowSbtVerH \|\| allowSbtHorH ) && ( allowSbtVerQ \|\| allowSbtHorQ) ) | |
|             cu_sbt_quad_flag | ae(v) |
|           if( ( cu_sbt_quad_flag && allowSbtVerQ && allowSbtHorQ ) \|\| | |
|             ( !cu_sbt_quad_flag && allowSbtVerH && allowSbtHorH ) ) | |
|             cu_sbt_horizontal_flag | ae(v) |
|           cu_sbt_pos_flag | ae(v) |
|         } | |
|       } | |
|       numZeroOutSigCoeff = 0 | |
|       transform_tree( x0, y0, cbWidth, cbHeight, treeType ) | |
|       if( Min( cbWidth, cbHeight ) >= 4 && sps_st_enabled_flag == 1 && CuPredMode[ x0 ][ y0 ] = = MODE_INTRA && IntraSubPartitionsSplitType == ISP_NO_SPLIT ) { | |
|         if( ( numSigCoeff > ( ( treeType == SINGLE_TREE ) ? 2 : 1 ) ) && numZeroOutSigCoeff == 0 ) { | |
|           st_idx[ x0 ][ y0 ] | ae(v) |
|         } | |
|       } | |
|     } | |
|   } | |
| } | | sps_st_enabled_flag equal to 1 specifies that st_idx may be present in the residual coding syntax for intra coding units. sps_st_enabled_flag equal to 0 specifies that st_idx is not present in the residual coding syntax for intra coding units.

st_idx[x0][y0] specifies which secondary transform kernel is applied between two candidate kernels in a selected transform set. st_idx[x0][y0] equal to 0 specifies that the secondary transform is not applied. The array indices x0, y0 specify the location (x0, y0) of the top-left sample of the considered transform block relative to the top-left sample of the picture.

When st_idx[x0][y0] is not present, st_idx[x0][y0] is inferred to be equal to 0.

Bins of st_idx are context-coded. More specifically, the following applies:

TABLE 9-9

Syntax elements and associated binarizations

| Syntax element | Binarization | |
|---|---|---|
| | Process | Input parameters |
| Syntax structure ... st_idx[ ][ ] | ... TR | ... cMax = 2, cRiceParam = 0 |

TABLE 9-15

Assignment of ctxInc to syntax elements with context coded bins

| Syntax element | binIdx | | | | | |
|---|---|---|---|---|---|---|
| | 0 | 1 | 2 | 3 | 4 | >=5 |
| ... | ... | ... | ... | ... | ... | ... |
| st_idx [ ][ ] | 0,1,4,5 (clause 9.5.4.2.8) | 2,3,6,7 (clause 9.5.4.2.8) | na | na | na | na |
| ... | ... | ... | ... | ... | ... | ... |

9.5.4.2.8 Derivation Process of ctxInc for the Syntax Element st_idx

Inputs to this process are the colour component index cIdx, the luma or chroma location (x0, y0) specifying the top-left sample of the current luma or chroma coding block relative to the top-left sample of the current picture depending on cIdx, the tree type treeType, the luma intra prediction mode IntraPredModeY[x0][y0] as specified in clause 8.4.2, the syntax element intra_chroma_pred_mode[x0][y0] specifying the intra prediction mode for chroma samples as specified in clause 7.4.7.5, and the multiple transform selection index tu_mts_idx[x0][y0].

Output of this process is the variable ctxInc.

The variable intraModeCtx is derived as follows:

If cIdx is equal to 0, intraModeCtx is derived as follows:

$$intraModeCtx = (IntraPredModeY[x0][y0] <= 1) ? 1 : 0$$

Otherwise (cIdx is greater than 0), intraModeCtx is derived as follows:

intraModeCtx=(intra_chroma_pred_mode[x0][y0]>=4)?1:0

The variable mtsCtx is derived as follows:

mtsCtx=(tu_mts_idx[x0][y0]==0 && treeType !=SINGLE_TREE)?1:0

The variable ctxInc is derived as follows:

ctxInc=(binIdx<<1)+intraModeCtx+(mtsCtx<<2)

2.4.2.2.8 Summary of RST Usage

RST may be enabled only when the number of non-zero coefficients in one block is greater than 2 and 1 for single and separate tree, respectively. In addition, the following restrictions of locations of non-zero coefficients for RST applied Coding Groups (CGs) is also required when RST is enabled.

TABLE 1

Usage of RST

Figure 16:
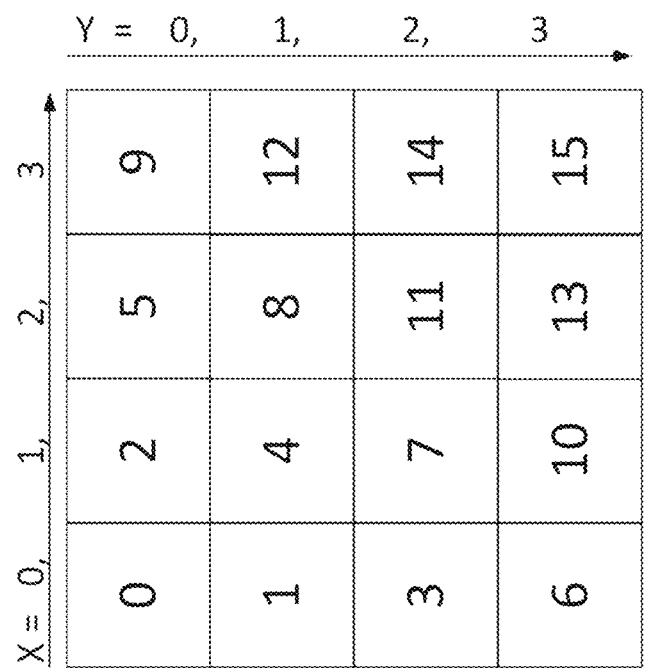
FIG. 16 shows an example of a diagonal up-right scan order for a 4×4 coding group.
Figure 16:
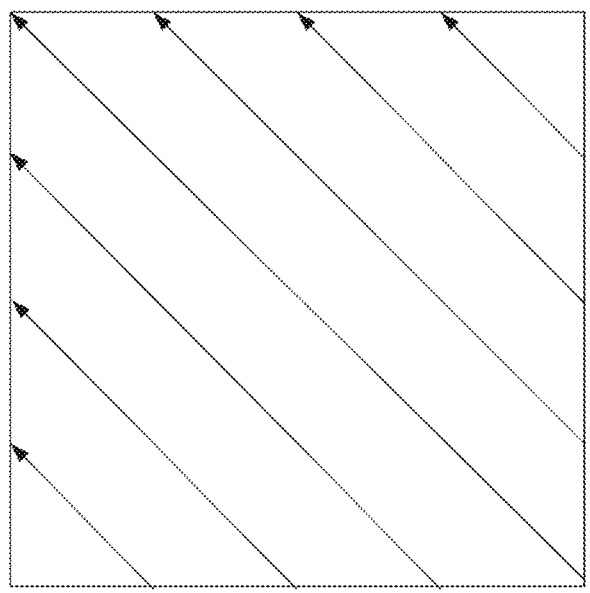

| Block size | RST type | # of CGs that RST applied to | Which CG that RST applied to may have non-zero coeffs | Potential locations of non-zero coeffs in the CGs RST applied to (nonZero Size relative to one CG) |
|---|---|---|---|---|
| 4 × 4 | RST4 × 4 (16 × 16) | 1 (Top-left 4 × 4) | Top-left 4 × 4 | First 8 in diagonal scan order (0 . . . 7 in FIG. 16, nonZeroSize = 8 |
| 4 × 8/8 × 4 | RST4 × 4 (16 × 16) | 1 (Top-left 4 × 4) | Top-left 4 × 4 | all, nonZeroSize = 16 |
| 4 × N and N × 4 (N > 8) | RST4 × 4 (16 × 16) | 2 (4 × N: up most 4 × 8; N × 4: left most 4 × 8) | 4 × N: up most 4 × 8; N × 4: left most 4 × 8 | all, nonZeroSize = 16 |
| 8 × 8 | RST8 × 8 (16 × 48) | 3 (with only 1 CG may have non-zero coeffs after forward RST) | Top-left 4 × 4 | First 8 in diagonal scan order (0 . . . 7 in FIG. 16, nonZeroSize = 8 |
| Others (W*H, W > 8, H > 8) | RST8 × 8 (16 × 48) | 3 (with only 1 CG may have non-zero coeffs after forward RST) | Top-left 4 × 4 | all, nonZeroSize = 16 |

2.4.3 Sub-Block Transform

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 3. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

2.4.3.1 Syntax Elements
7.3.7.5 Coding Unit Syntax

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|     if( ( ( slice_type = = I && cu_skip_flag[ x0 ][ y0 ] = =0 ) \|\| | |
|       ( slice_type != I && CuPredMode[ x0 ][ y0 ] != MODE_INTRA ) ) && | |
|       sps_ibc_enabled_flag ) | |

|  | Descriptor |
|---|---|
| ```
          pred_mode_ibc_flag
        }
  if( CuPredMode[ x0 ][ y0 ] = = MODE_INTRA ) {
  ...
  } else if( treeType != DUAL_TREE_CHROMA ) { /* MODE_INTER or MODE_IBC */
  ...
  }
  if( !pcm_flag[ x0 ][ y0 ] ) {
    if( CuPredMode[ x0 ][ y0 ] != MODE_INTRA && merge_flag[ x0 ][ y0 ] = = 0 )
      cu_cbf
    if( cu_cbf) {
      if( CuPredMode[ x0 ][ y0 ] = = MODE_INTER && sps_sbt_enabled_flag &&
          !ciip_flag[ x0 ][ y0 ] ) {
        if( cbWidth <= MaxSbtSize && cbHeight <= MaxSbtSize ) {
          allowSbtVerH = cbWidth >= 8
          allowSbtVerQ = cbWidth >= 16
          allowSbtHorH = cbHeight >= 8
          allowSbtHorQ = cbHeight >= 16
          if( allowSbtVerH || allowSbtHorH || allowSbtVerQ || allowSbtHorQ )
            cu_sbt_flag
        }
        if( cu_sbt_flag ) {
          if( ( allowSbtVerH || allowSbtHorH ) && ( allowSbtVerQ || allowSbtHorQ) )
            cu_sbt_quad_flag
          if( ( cu_sbt_quad_flag && allowSbtVerQ && allowSbtHorQ ) ||
              ( !cu_sbt_quad_flag && allowSbtVerH && allowSbtHorH ) )
            cu_sbt_horizontal_flag
          cu_sbt_pos_flag
        }
      }
      transform_tree( x0, y0, cbWidth, cbHeight, treeType )
    }
  }
}
``` | ae(v)<br><br><br><br><br>ae(v)<br><br><br><br><br><br><br><br><br><br>ae(v)<br><br><br>ae(v)<br><br><br>ae(v)<br>ae(v) | cu_sbt_flag equal to 1 specifies that for the current coding unit, subblock transform is used. cu_sbt_flag equal to 0 specifies that for the current coding unit, subblock transform is not used.

When cu_sbt_flag is not present, its value is inferred to be equal to 0.

NOTE—: When subblock transform is used, a coding unit is split into two transform units; one transform unit has residual data, the other does not have residual data.

cu_sbt_quad_flag equal to 1 specifies that for the current coding unit, the subblock transform includes a transform unit of ¼ size of the current coding unit. cu_sbt_quad_flag equal to 0 specifies that for the current coding unit the subblock transform includes a transform unit of ½ size of the current coding unit.

When cu_sbt_quad_flag is not present, its value is inferred to be equal to 0.

cu_sbt_horizontal_flag equal to 1 specifies that the current coding unit is split horizontally into 2 transform units. cu_sbt_horizontal_flag[x0][y0] equal to 0 specifies that the current coding unit is split vertically into 2 transform units.

When cu_sbt_horizontal_flag is not present, its value is derived as follows:

If cu_sbt_quad_flag is equal to 1, cu_sbt_horizontal_flag is set to be equal to allowSbtHorQ.

Otherwise (cu_sbt_quad_flag is equal to 0), cu_sbt_horizontal_flag is set to be equal to allowSbtHorH.

cu_sbt_pos_flag equal to 1 specifies that the tu_cbf_luma, tu_cbf_cb and tu_cbf_cr of the first transform unit in the current coding unit are not present in the bitstream. cu_sbt_pos_flag equal to 0 specifies that the tu_cbf_luma, tu_cbf_cb and tu_cbf_cr of the second transform unit in the current coding unit are not present in the bitstream.

The variable SbtNumFourthsTb0 is derived as follows:

$$\text{sbtMinNumFourths}=\text{cu\_sbt\_quad\_flag}?1:2 \quad (7\text{-}117)$$

$$\text{SbtNumFourthsTb0}=\text{cu\_sbt\_pos\_flag}?(4-\text{sbtMin-NumFourths}):\text{sbtMinNumFourths} \quad (7\text{-}118)$$

sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$\text{MaxSbtSize}=\text{sps\_sbt\_max\_size\_64\_flag}?64:32 \quad (7\text{-}33)$$

2.4.4 Quantized Residual Domain Block Differential Pulse-Code Modulation Coding (QR-BDPCM)

In JVET-N0413, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \leq i \leq M-1$, $0 \leq j \leq N-1$. be the prediction residual after performing intra prediction horizontally (copying left neighbor pixel value across the the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i = 0, \quad 0 \le j \le (N-1) \\ Q(r_{i,j}) - Q(r_{(i-1),j}), & 1 \le i \le (M-1), \; 0 \le j \le (N-1) \end{cases}$$

For horizontal prediction, similar rules apply, and the residual quantized samples are obtained by $$\tilde{r}_{i,j} = \begin{cases} Q(r_{i,j}), & 0 \le i \le (M-1), \quad j = 0 \\ Q(r_{i,j}) - Q(r_{i,(j-1)}), & 0 \le i \le (M-1), \; 1 \le j \le (N-1) \end{cases}$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$. For vertical prediction case, $Q(r_{i,j}) = \Sigma_{k=0}^{i} \tilde{r}_{k,j}, 0 \le i \le (M-1), 0 \le j \le (N-1)$ For horizontal case, $Q(r_{i,j}) = \Sigma_{k=0}^{j} \tilde{r}_{i,k}, 0 \le i \le (M-1), 0 \le j \le (N-1)$ The invert quantized residuals, $Q^{-1}(Q(r_{i,j}))$, are added to the intra block prediction values to produce the reconstructed sample values.

When QR-BDPCM is selected, there is no transform applied.

2.5 Entropy Coding of Coefficients 2.5.1 Coefficients Coding of Transform-Applied Blocks In HEVC, transform coefficients of a coding block are coded using non-overlapped coefficient groups (or subblocks), and each CG contains the coefficients of a 4×4 block of a coding block. The CGs inside a coding block, and the transform coefficients within a CG, are coded according to pre-defined scan orders.

Figure 17:
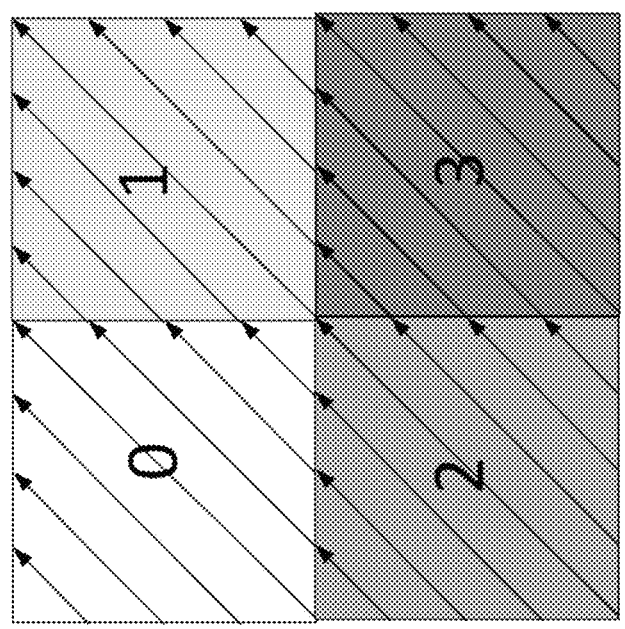
FIG. 17 shows an example of a diagonal up-right scan order for an 8×8 block with coding groups of size 4×4.

The CGs inside a coding block, and the transform coefficients within a CG, are coded according to pre-defined scan orders. Both CG and coefficients within a CG follows the diagonal up-right scan order. An example for 4×4 block and 8×8 scanning order is depicted in FIG. 16 and FIG. 17, respectively.

Note that the coding order is the reversed scanning order (i.e., decoding from CG3 to CG0 in FIG. 17), when decoding one block, the last non-zero coefficient's coordinate is firstly decoded.

The coding of transform coefficient levels of a CG with at least one non-zero transform coefficient may be separated into multiple scan passes. In the first pass, the first bin (denoted by bin0, also referred as significant_coeff_flag, which indicates the magnitude of the coefficient is larger than 0) is coded. Next, two scan passes for context coding the second/third bins (denoted by bin1 and bin2, respectively, also referred as coeff_abs_greater1_flag and coeff_abs_greater2_flag) may be applied. Finally, two more scan passes for coding the sign information and the remaining values (also referred as coeff_abs_level_remaining) of coefficient levels are invoked, if necessary. Note that only bins in the first three scan passes are coded in a regular mode and those bins are termed regular bins in the following descriptions.

In the VVC 3, for each CG, the regular coded bins and the bypass coded bins are separated in coding order; first all regular coded bins for a subblock are transmitted and, thereafter, the bypass coded bins are transmitted. The transform coefficient levels of a subblock are coded in five passes over the scan positions as follows:

Pass 1: coding of significance (sig_flag), greater 1 flag (gt1_flag), parity (par_level_flag) and greater 2 flags (gt2_flag) is processed in coding order. If sig_flag is equal to 1, first the gt1_flag is coded (which specifies whether the absolute level is greater than 1). If gt1_flag is equal to 1, the par_flag is additionally coded (it specifies the parity of the absolute level minus 2).

Pass 2: coding of remaining absolute level (remainder) is processed for all scan positions with gt2_flag equal to 1 or gt1_flag equal to 1. The non-binary syntax element is binarized with Golomb-Rice code and the resulting bins are coded in the bypass mode of the arithmetic coding engine.

Pass 3: absolute level (absLevel) of the coefficients for which no sig_flag is coded in the first pass (due to reaching the limit of regular-coded bins) are completely coded in the bypass mode of the arithmetic coding engine using a Golomb-Rice code.

Pass 4: coding of the signs (sign_flag) for all scan positions with sig_coeff_flag equal to 1

It is guaranteed that no more than 32 regular-coded bins (sig_flag, par_flag, gt1_flag and gt2_flag) are encoded or decoded for a 4×4 subblock. For 2×2 chroma subblocks, the number of regular-coded bins is limited to 8.

The Rice parameter (ricePar) for coding the non-binary syntax element remainder (in Pass 3) is derived similar to HEVC. At the start of each subblock, ricePar is set equal to 0. After coding a syntax element remainder, the Rice parameter is modified according to predefined equation. For coding the non-binary syntax element absLevel (in Pass 4), the sum of absolute values sumAbs in a local template is determined. The variables ricePar and posZero are determined based on dependent quantization and sumAbs by a table look-up. The intermediate variable codeValue is derived as follows:

If absLevel[k] is equal to 0, codeValue is set equal to posZero;

Otherwise, if absLevel[k] is less than or equal to posZero, codeValue is set equal to absLevel[k]−1;

Otherwise (absLevel[k] is greater than posZero), codeValue is set equal to absLevel[k].

The value of codeValue is coded using a Golomb-Rice code with Rice parameter ricePar.

2.5.1.1 Context Modeling for Coefficient Coding

Figure 18:
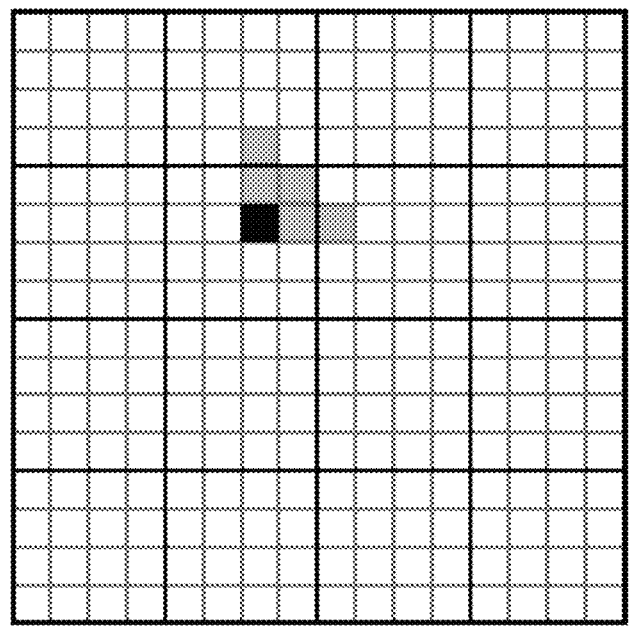
FIG. 18 shows an example of a template used to select probability models.

The selection of probability models for the syntax elements related to absolute values of transform coefficient levels depends on the values of the absolute levels or partially reconstructed absolute levels in a local neighbourhood. The template used is illustrated in FIG. 18.

The selected probability models depend on the sum of the absolute levels (or partially reconstructed absolute levels) in a local neighborhood and the number of absolute levels greater than 0 (given by the number of sig_coeff_flags equal to 1) in the local neighborhood. The context modelling and binarization depends on the following measures for the local neighborhood:

numSig: the number of non-zero levels in the local neighborhood;

sumAbs1: the sum of partially reconstructed absolute levels (absLevel1) after the first pass in the local neighborhood;

sumAbs: the sum of reconstructed absolute levels in the local neighborhood diagonal position (d): the sum of the horizontal and vertical coordinates of a current scan position inside the transform block Based on the values of numSig, sumAbs1, and d, the probability models for coding sig_flag, par_flag, gt1_flag, and gt2_flag are selected. The Rice parameter for binarizing abs_remainder is selected based on the values of sumAbs and numSig.

2.5.1.2 Dependent Quantization (DQ)

In addition, the same HEVC scalar quantization is used with a new concept called dependent scale quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 19:
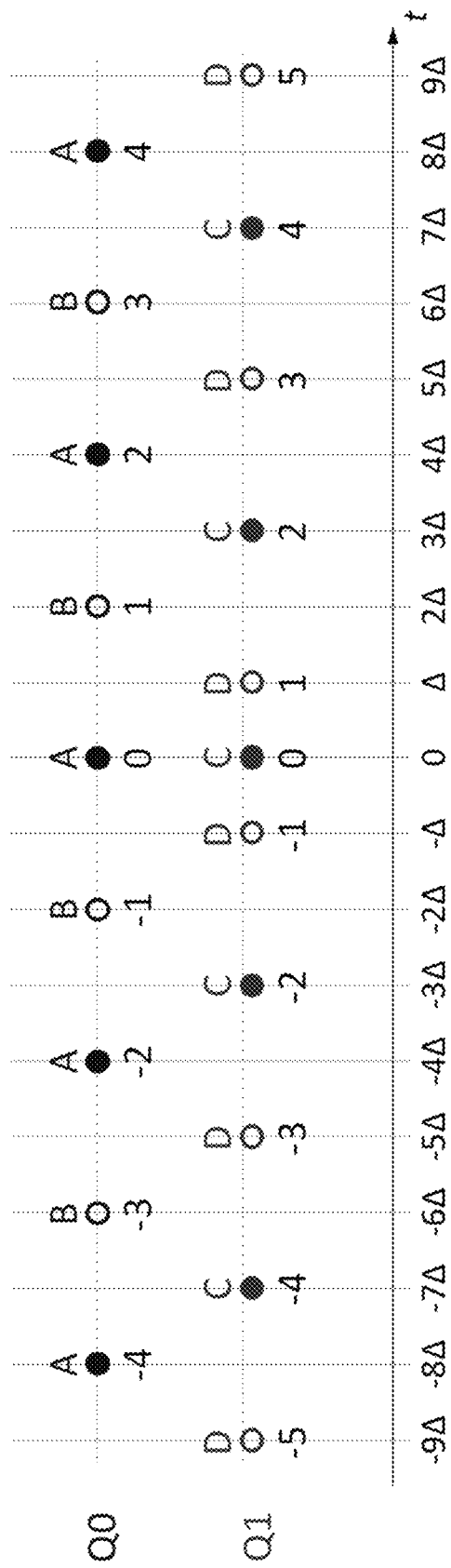
FIG. 19 shows an example of two scalar quantizers used for dependent quantization.

The two scalar quantizers used, denoted by Q0 and Q1, are illustrated in FIG. 19. The location of the available reconstruction levels is uniquely specified by a quantization step size $\Delta$. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

Figure 20:
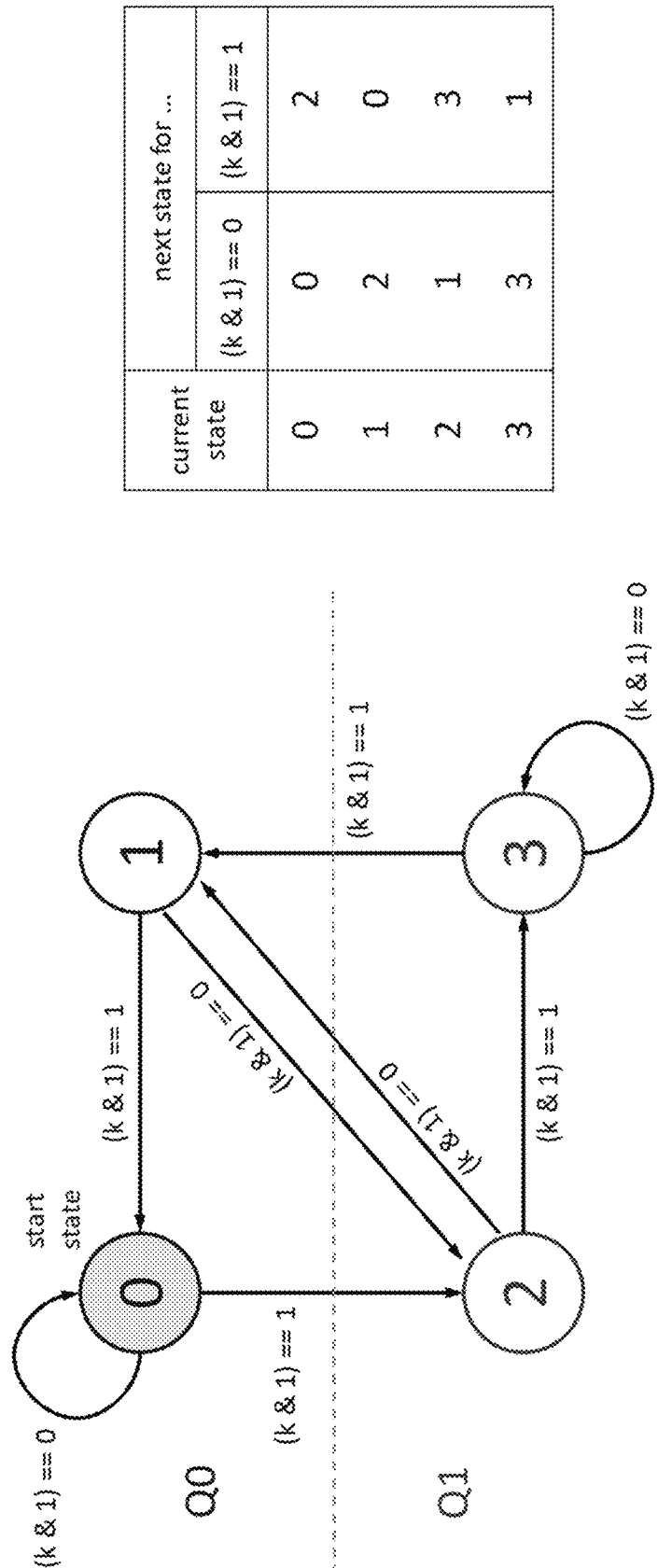
FIG. 20 shows an example of a state transition and quantizer selection for the proposed dependent quantization process.

As illustrated in FIG. 20, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 20, where k denotes the value of the transform coefficient level.

2.5.1.3 Syntax and Semantics

7.3.7.11 Residual Coding Syntax

| | Descriptor |
|---|---|
| residual_coding( x0, y0, log2TbWidth, log2TbHeight, cIdx ) { | |
|   if( ( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbWidth > 4 ) | |
|     log2TbWidth = 4 | |
|   else | |
|     log2TbWidth = Min( log2TbWidth, 5 ) | |
|   if( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbHeight > 4 ) | |
|     log2TbHeight = 4 | |
|   else | |
|     log2TbHeight = Min (log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbW = ( Min( log2TbWidth, log2TbHeight ) < 2 ? 1 : 2 ) | |
|   log2SbH = log2SbW | |
|   if ( log2TbWidth < 2 && cIdx = = 0 ) { | |
|     log2SbW = log2TbWidth | |
|     log2SbH = 4 − log2SbW | |
|   } else if ( log2TbHeight < 2 && cIdx = = 0 ) { | |
|     log2SbH = log2TbHeight | |
|     log2SbW = 4 − log2SbH | |
|   } | |
|   numSbCoeff = 1 << ( log2SbW + log2SbH ) | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder[ log2TbWidth − log2SbW ][ log2TbHeight − log2SbH ] | |
|       [ lastSubBlock ][ 0 ] | |
|     yS = DiagScanOrder[ log2TbWidth − log2SbW ][ log2TbHeight − log2SbH ] | |
|       [ lastSubBlock ][ 1 ] | |
|     xC = ( xS << log2SbW ) + DiagScanOrder[ log2SbW ][ log2SbH ][ lastScanPos ][ 0 ] | |
|     yC = ( yS << log2SbH ) + DiagScanOrder[ log2SbW ][ log2SbH ][ lastScanPos ][ 1 ] | |
|   } while( ( xC != LastSignificantCoeffX ) \|\| ( yC != LastSignificantCoeffY ) ) | |
|   QState = 0 | |
|   for( i = lastSubBlock; i >= 0; i− − ) { | |
|     startQStateSb = QState | |
|     xS = DiagScanOrder[ log2TbWidth − log2SbW ][ log2TbHeight − log2SbH ] | |

| | Descriptor |
|---|---|
| ```
                [ lastSubBlock ][ 0 ]
        yS = DiagScanOrder[ log2TbWidth − log2SbW ][ log2TbHeight − log2SbH ]
                [ lastSubBlock ][ 1 ]
        inferSbDcSigCoeffFlag = 0
        if( ( i < lastSubBlock ) && ( i > 0 ) ) {
                coded_sub_block_flag[ xS ][ yS ]
                inferSbDcSigCoeffFlag = 1
        }
        firstSigScanPosSb = numSbCoeff
        lastSigScanPosSb = −1
        remBinsPass1 = ( ( log2SbW + log2SbH ) < 4 ? 8 : 32 )
        firstPosMode0 = ( i = = lastSubBlock ? lastScanPos : numSbCoeff − 1 )
        firstPosMode1 = −1
        for( n = firstPosMode0; n >= 0 && remBinsPass1 >= 4; n− − ) {
                xC = ( xS << log2SbW ) + DiagScanOrder[ log2SbW ][ log2SbH ][ n ][ 0 ]
                yC = ( yS << log2SbH ) + DiagScanOrder[ log2SbW ][ log2SbH ][ n ][ 1 ]
                if( coded_sub_block_flag[ xS ][ yS ] && ( n > 0 | | !inferSbDcSigCoeffFlag ) &&
                        ( xC != LastSignificantCoeffX | | yC != Last SignificantCoeffY ) ) {
                        sig_coeff_flag[ xC ][ yC ]
                        remBinsPass1− −
                        if( sig_coeff_flag[ xC ][ yC ] )
                                inferSbDcSigCoeffFlag = 0
                }
                if( sig_coeff_flag[ xC ][ yC ] ) {
                    abs_level_gt1_flag[ n ]
                    remBinsPass1− −
                    if( abs_level_gt1_flag[ n ] ) {
                        par_level_flag[ n ]
                        remBinsPass1− −
                        abs_level_gt3_flag[ n ]
                        remBinsPass1− −
                    }
                    if( lastSigScanPosSb = = −1 )
                        lastSigScanPosSb = n
                    firstSigScanPosSb = n
                }
                AbsLevelPass1[ xC ][ yC ] = sig_coeff_flag[ xC ][ yC ] + par_level_flag[ n ] +
                        abs_level_gt1_flag[ n ] + 2 * abs_level_gt3_flag[ n ]
                if( dep_quant_enabled_flag )
                        QState = QStateTransTable[ QState ][ AbsLevelPass1[ xC ][ yC ] & 1 ]
                if( remBinsPass1 < 4 )
                        firstPosMode1 = n − 1
        }
        for( n = numSbCoeff − 1 ; n >= firstPosMode1; n− − ) {
                xC = ( xS << log2SbW ) + DiagScanOrder[ log2SbW ][ log2SbH ][ n ][ 0 ]
                yC = ( yS << log2SbH ) + DiagScanOrder[ log2SbW ][ log2SbH ][ n ][ 1 ]
                if( abs_level_gt3_flag[ n ] )
                        abs_remainder[ n ]
                AbsLevel[ xC ][ yC ] = AbsLevelPass1[ xC ][ yC ] +2 * abs_remainder[ n ]
        }
        for( n = firstPosMode1; n >= 0; n− − ) {
                xC = ( xS << log2SbW ) + DiagScanOrder[ log2SbW ][ log2SbH ][ n ][ 0 ]
                yC = ( yS << log2SbH ) + DiagScanOrder[ log2SbW ][ log2SbH ][ n ][ 1 ]
                dec_abs_level[ n ]
                if(AbsLevel[ xC ][ yC ] > 0 )
                        firstSigScanPosSb = n
                if( dep_quant_enabled_flag )
                        QState = QStateTransTable[ QState ][ AbsLevel[ xC ][ yC ] & 1 ]
        }
        if( dep_quant_enabled_flag | | !sign_data_hiding_enabled_flag )
                signHidden = 0
        else
                signHidden = ( lastSigScanPosSb − firstSigScanPosSb > 3 ? 1 : 0 )
        for( n = numSbCoeff − 1 ; n >= 0 ; n− − ) {
                xC = ( xS << log2SbW ) + DiagScanOrder[ log2SbW ][ log2SbH ][ n ][ 0 ]
                yC = ( yS << log2SbH ) + DiagScanOrder[ log2SbW ][ log2SbH ][ n ][ 1 ]
                if( ( AbsLevel[ xC ][ yC ] > 0 ) &&
                        ( !signHidden | | ( n != firstSigScanPosSb ) ) )
                        coeff_sign_flag[ n ]
        }
        if( dep_quant_enabled_flag ) {
                QState = startQStateSb
                for( n = numSbCoeff − 1 ; n >= 0; n− − ) {
                        xC = ( xS << log2SbW ) + DiagScanOrder[ log2SbW ][ log2SbH ][ n ][ 0 ]
                        yC = ( yS << log2SbH ) + DiagScanOrder[ log2SbW ][ log2SbH ][ n ][ 1 ]
                        if( AbsLevel[ xC ][ yC ] > 0 )
                                TransCoeffLevel[ x0 ][ y0 ][ cIdx ][ xC ][ yC ] =
``` | ae(v)<br><br><br><br><br><br><br><br><br><br><br><br><br>ae(v)<br><br><br><br><br><br>ae(v)<br><br><br>ae(v)<br><br>ae(v)<br><br><br><br><br><br><br><br><br><br><br><br><br><br>ae(v)<br><br><br><br><br><br>ae(v)<br><br><br><br><br><br><br><br><br><br><br><br><br>ae(v) |

-continued

| | Descriptor |
|---|---|
| ``` 
                            ( 2 * AbsLevel[ xC ][ yC ] − ( QState > 1 ? 1 : 0 ) ) *
                            ( 1 − 2 * coeff_sign_flag[ n ] )
            QState = QStateTransTable[ QState ][ par_level_flag[ n ] ]
    } else {
        sumAbsLevel = 0
        for( n = numSbCoeff − 1; n >= 0; n− − ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( AbsLevel[ xC ][ yC ] > 0 ) {
                TransCoeffLevel[ x0 ][ y0 ][ cIdx ][ xC ][ yC ] =
                    AbsLevel[ xC ][ yC ] * ( 1 − 2 * coeff_sign_flag[ n ] )
                if( signHidden ) {
                  sumAbsLevel += AbsLevel[ xC ][ yC ]
                  if( ( n = = firstSigScanPosSb ) && ( sumAbsLevel % 2 ) = = 1 ) )
                    TransCoeffLevel[ x0 ][ y0 ][ cIdx ][ xC ][ yC ] =
                        −TransCoeffLevel[ x0 ][ y0 ][ cIdx ][ xC ][ yC ]
                }
            }
        }
    }
  }
}
``` | |

2.5.2 Coefficients Coding of TS-Coded Blocks and QR-BDPCM Coded Blocks

QR-BDPCM follows the context modeling method for TS-coded blocks.

A modified transform coefficient level coding for the TS residual. Relative to the regular residual coding case, the residual coding for TS includes the following changes:

(1) no signalling of the last x/y position
(2) coded_sub_block_flag coded for every subblock except for the last subblock when all previous flags are equal to 0;
(3) sig_coeff_flag context modelling with reduced template,
(4) a single context model for abs_level_gt1_flag and par_level_flag,
(5) context modeling for the sign flag, additional greater than 5, 7, 9 flags,
(6) modified Rice parameter derivation for the remainder binarization
(7) a limit for the number of context coded bins per sample, 2 bins per sample within one block.

2.5.2.1 Syntax and Semantics
7.3.6.10 Transform Unit Syntax

| | Descriptor |
|---|---|
| ```
transform_unit( x0, y0, tbWidth, tbHeight, treeType, subTuIndex ) {
 ...
    if( tu_cbf_luma[ x0 ][ y0 ] && treeType != DUAL_TREE_CHROMA
        && ( tbWidth <= 32 ) && ( tbHeight <= 32 )
        && ( IntraSubPartitionsSplit[ x0 ][ y0 ] = = ISP_NO_SPLIT ) && ( !cu_sbt_flag ) ) {
        if( transform_skip_enabled_flag && tbWidth <= MaxTsSize && tbHeight <= MaxTsSize )
            transform_skip_flag[ x0 ][ y0 ]
        if( ( ( CuPredMode[ x0 ][ y0 ] != MODE_INTRA && sps_explicit_mts_inter_enabled_flag )
            | | ( CuPredMode[ x0 ][ y0 ] = = MODE_INTRA && sps_explicit_mts_intra_enabled_flag ))
            && ( tbWidth <= 32 ) && ( tbHeight <= 32 ) && ( !transform_skip_flag[ x0 ][ y0 ] ) )
            tu_mts_idx[ x0 ][ y0 ]
    }
    if( tu_cbf_luma[ x0 ][ y0 ] ) {
        if( !transform_skip_flag[ x0 ][ y0 ] )
            residual_coding( x0, y0, Log2( tbWidth ), Log2( tbHeight ), 0 )
        else
            residual_coding_ts( x0, y0, Log2( tbWidth ), Log2( tbHeight ), 0 )
    }
    if( tu_cbf_cb[ x0 ][ y0 ] )
        residual_coding( xC, yC, Log2( wC ), Log2( hC ), 1 )
    if ( tu_cbf_cr[ x0 ][ y0 ] )
        residual_coding( xC, yC, Log2( wC ), Log2( hC ), 2 )
}
residual_ts_coding( x0, y0, log2TbWidth, log2TbHeight, cIdx ) {
    log2SbSize = ( Min( log2TbWidth, log2TbHeight ) < 2 ? 1 : 2 )
    numSbCoeff = 1 << ( log2SbSize << 1 )
    lastSubBlock = ( 1 << ( log2TbWidth + log2TbHeight − 2 * log2SbSize ) ) − 1
    /* Loop over subblocks from top-left (DC) subblock to the last one */
    inferSbCbf = 1
    MaxCcbs = 2 * ( 1 << log2TbWidth ) * ( 1<< log2TbHeight )
    for( i =0; i <= lastSubBlock; i++ ) {
        xS = DiagScanOrder[ log2TbWidth − log2SbSize ][ log2TbHeight − log2SbSize ][ i ][ 0 ]
        yS = DiagScanOrder[ log2TbWidth − log2SbSize ][ log2TbHeight − log2SbSize ][ i ][ 1 ]
        if( ( i != lastSubBlock | | !inferSbCbf )
``` | ae(v)<br><br><br><br>ae(v) |

|  | Descriptor |
|---|---|
| ```
        coded_sub_block_flag[ xS ][ yS ]
        MaxCcbs- -
      if( coded_sub_block_flag[ xS ][ yS ] && i < lastSubBlock )
        inferSbCbf = 0
    }
    /* First scan pass */
    inferSbSigCoefiFlag = 1
    for( n = ( i == 0; n <= numSbCoeff − 1; n++ ) {
      xC = ( xS << log2SbSize ) + DiagScanOrder[ log2SbSize ][ log2SbSize ][ n ][ 0 ]
      yC = ( yS << log2SbSize ) + DiagScanOrder[ log2SbSize ][ log2SbSize ][ n ][ 1 ]
      if( coded_sub_block_flag[ xS ][ yS ] &&
          ( n == numSbCoeff − 1 | | !inferSbSigCoeffFlag ) ) {
        sig_coeff_flag[ xC ][ yC ]
        MaxCcbs- -
        if( sig_coeff_flag[ xC ][ yC ] )
          inferSbSigCoeffFlag = 0
      }
      if( sig_coeff_flag[ xC ][ yC ] ) {
        coeff_sign_flag[ n ]
        abs_level_gtx_flag[ n ][ 0 ]
        MaxCcbs = MaxCcbs − 2
        if( abs_level_gtx_flag[ n ][ 0 ] ) {
          par_level_flag[ n ]
          MaxCcbs- -
        }
      }
      AbsLevelPassX[ xC ][ yC ] =
        sig_coeff_flag[ xC ][ yC ] + par_level_flag[ n ] + abs_level_gtx_flag[ n ][ 0 ]
    }
    /* Greater than X scan passes (numGtXFlags=5) */
    for( i = 1; i <= 5 − 1 && abs_level_gtx_flag[ n ][ i − 1 ] ; i++ ) {
      for( n = 0; n <= numSbCoeff − 1; n++ ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        abs_level_gtx _flag[ n ][ i ]
        MaxCcbs- -
        AbsLevelPassX[ xC ][ yC ] + = 2 * abs_level_gtx_flag[ n ][ i ]
      }
    }
    /* remainder scan pass */
    for( n = 0; n <= numSbCoeff − 1; n++ ) {
      xC = ( xS << log2SbSize ) + DiagScanOrder[ log2SbSize ][ log2SbSize ][ n ][ 0 ]
      yC = ( yS << log2SbSize ) + DiagScanOrder[ log2SbSize ][ log2SbSize ][ n ][ 1 ]
      if( abs_level_gtx_flag[ n ][ numGtXFlags − 1 ] )
        abs_remainder[ n ]
      TransCoeffLevel[ x0 ][ y0 ][ cIdx ][ xC ][ yC ] = ( 1 − 2 * coeff_sign_flag[ n ] ) *
        ( AbsLevelPassX[ xC ][ yC ] + abs_remainder[ n ] )
    }
  }
}
``` | ae(v)<br><br><br><br><br><br><br><br><br><br><br>ae(v)<br><br><br><br>ae(v)<br>ae(v)<br><br><br>ae(v)<br><br><br><br><br><br><br><br><br><br><br><br>ae(v)<br><br><br><br><br><br><br><br><br>ae(v) |

The number of context coded bins is restricted to be no larger than 2 bins per sample for each CG.

TABLE 9-15

Assignment of ctxInc to syntax elements with context coded bins

| Syntax element | binIdx | | | | | |
|---|---|---|---|---|---|---|
| | 0 | 1 | 2 | 3 | 4 | >=5 |
| last_sig_coeff_x_prefix | 0 . . . 23 (clause 9.5.4.2.4) | | | | | |
| last_sig_coeff_y_prefix | 0 . . . 23 (clause 9.5.4.2.4) | | | | | |
| last_sig_coeff_x_suffix | bypass | bypass | bypass | bypass | bypass | bypass |
| last_sig_coeff_y_suffix | bypass | bypass | bypass | bypass | bypass | bypass |
| coded_sub_block_flag[ ][ ] | (MaxCcbs > 0) ? (0 . . . 7 (clause 9.5.4.2.6)):bypass | na | na | na | na | na |
| sig_coeff_flag[ ][ ] | (MaxCcbs > 0) ? (0 . . . 93 (clause 9.5.4.2.8)):bypass | na | na | na | na | na |
| par_level_flag[ ] | (MaxCcbs > 0) ? (0 . . . 33 (clause 9.5.4.2.9)):bypass | na | na | na | na | na |
| abs_level_gtx_flag[ ][i] | 0 . . . 70 (clause 9.5.4.2.9) | na | na | na | na | na |

TABLE 9-15-continued

Assignment of ctxInc to syntax elements with context coded bins

| Syntax element | binIdx | | | | | |
|---|---|---|---|---|---|---|
| | 0 | 1 | 2 | 3 | 4 | >=5 |
| abs_remainder[ ] | bypass | bypass | bypass | bypass | bypass | bypass |
| dec_abs_level[ ] | bypass | bypass | bypass | bypass | bypass | bypass |
| coeff_sign_flag[ ] transform_skip_flag[x0][y0] == 0 | bypass | na | na | na | na | na |
| coeff_sign_flag[ ] transform_skip_flag[x0][y0] == 1 | 0 | na | na | na | na | na |

3 Drawbacks of Existing Implementations

The current design has the following problems:

(1) The four pre-defined transform sets for chroma components is the same as that for luma component. In addition, luma and chroma blocks with the same intra prediction mode use the same transform set. However, the chroma signal is typically smoother compared to the luma component. Using the same set may be sub-optimal.

(2) RST is only applied to certain CGs instead of all CGs. However, the decision on signaling RST index is dependent on the number of non-zero coefficients in the whole block. When all coefficients in the RST-applied CGs are zeros, there is no need to signal the RST index. However, the current design may still signal the index which wastes unnecessary bits.

(3) RST index is signaled after residual coding since it requires to record how many non-zero coefficients, whether there exists non-zero coefficient in certain locations (e.g., numZeroOutSigCoeff, numSigCoeff in section 2.3.2.2.7). Such design makes the parsing process more complex.

(4) RST index is context coded and context modeling is dependent on the coded luma/chroma intra prediction mode, and MTS index. Such design introduces parsing delay in terms of reconstruction of intra prediction modes. And 8 contexts are introduced which may be a burden for hardware implementation.

(a) DM and CCLM share the same context index offset which doesn't make sense since they are two different chroma intra prediction methods.

(5) The current design of non-TS residual coding firstly codes the coefficients information, followed by the indices of RST (i.e., use RST or not, if used, which matrix is selected). With such design, the information of RST on/off couldn't be taken into consideration in the entropy coding of residuals.

(6) RST is always applied to the top-left region of a transform block with primary transform applied. However, for different primary transform basis, it is not always true that the energy is concentrated in the top-left region of a transform block.

4 Example Methods for Context Modeling for Residual Coding

Embodiments of the presently disclosed technology overcome the drawbacks of existing implementations, thereby providing video coding with higher coding efficiencies. The methods for context modeling for residual coding, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In these examples, the RST may be any variation of the design in JVET-N0193. RST could be any technology that may apply a secondary transform to one block or apply a transform to the transform skip (TS)-coded block (e.g., the RST proposed in JVET-N0193 applied to the TS-coded block).

In addition, the 'zero-out region' or 'zero-out CG' may indicate those regions/CGs which always have zero coefficients due the reduced transform size used in the secondary transform process. For example, if the secondary transform size is 16×32, and CG size is 4×4, it will be applied to the first two CGs, but only the first CG may have non-zero coefficients, the second 4×4 CG is also called zero-out CG.

Selection of Transform Matrices in RST

1. The sub-region that RST is applied to may be a sub-region which is not the top-left part of a block.
    a. In one example, RST may be applied to the top-right or bottom-right or bottom-left or center sub-region of a block.
    b. Which sub-region that RST is applied to may depend on the intra prediction mode and/or primary transform matrix (e.g., DCT-II, DST-VII, Identity transform).
2. Selection of transform set and/or transform matrix used in RST may depend on the color component.
    a. In one example, one set of transform matrix may be used for luma (or G) component, and one set for chroma components (or B/R).
    b. In one example, each color component may correspond to one set.
    c. In one example, at least one matrix is different in any of the two or multiple sets for different color components.
3. Selection of transform set and/or transform matrix used in RST may depend on intra prediction method (e.g., CCLM, multiple reference line based intra prediction method, matrix-based intra prediction method).
    a. In one example, one set of transform matrix may be used for CCLM coded blocks, and the other for non-CCLM coded blocks.
    b. In one example, one set of transform matrix may be used for normal intra prediction coded blocks, and the other for multiple reference line enabled blocks (i.e., which doesn't use the adjacent line for intra prediction).
    c. In one example, one set of transform matrix may be used for blocks with joint chroma residual coding, and the other for blocks which joint chroma residual coding is not applied.

d. In one example, at least one matrix is different in any of the two or multiple sets for different intra prediction methods.

e. Alternatively, RST may be disabled for blocks coded with certain intra prediction directions and/or certain coding tools, e.g., CCLM, and/or joint chroma residual coding, and/or certain color component (e.g., chroma).

4. Selection of transform set and/or transform matrices used in RST may depend on the primary transform.

a. In one example, if the primary transform applied to one block is the identity transform (e.g., TS mode is applied to one block), the transform set and/or transform matrices used in RST may be different from other kinds of primary transform.

b. In one example, if the horizontal and vertical 1-D primary transform applied to one block is the same basis (e.g., both DCT-II), the transform set and/or transform matrices used in RST may be different from that primary transforms from different basis for different directions (vertical or horizontal).

Signaling of RST Side Information and Residual Coding

5. Whether to and/how to signal the side information of RST (e.g., st_idx) may depend on the last non-zero coefficient (in scanning order) in the block.

a. In one example, only if the last non-zero coefficient is located in the CGs that RST applied to, RST may be enabled, and the index of RST may be signaled.

b. In one example, if the last non-zero coefficient is not located in the CGs that RST applied to, RST is disabled and signaling of RST is skipped.

6. Whether to and/how to signal the side information of RST (e.g., st_idx) may depend on coefficients within a partial region of one block instead of the whole block.

a. In one example, partial region may be defined as the CGs that RST is applied to.

b. In one example, partial region may be defined as the first or last M (e.g., M=1, or 2) CGs in scanning order or reverse scanning order of the block.

i. In one example, M may depend on block dimension.

ii. In one example, M is set to 2 if block size is 4×N and/or N×4 (N>8).

iii. In one example, M is set to 1 if block size is 4×8 and/or 8×4 and/or W×H (W>=8, H>=8).

c. In one example, it may depend on the position of non-zero coefficients within a partial region.

d. In one example, it may depend on the energy (such as sum of squares or sum of absolute values) of non-zero coefficients within a partial region.

e. In one example, it may depend on the number of non-zero coefficients within a partial region of one block instead of the whole block.

i. When the number of non-zero coefficients within partial region of one block is less than a threshold, signaling of the side information of RST may be skipped.

ii. In one example, the threshold may depend on the slice type/picture type/partition tree type (dual or single)/video content (screen content or camera captured content).

iii. In one example, the threshold may depend on color formats such as 4:2:0 or 4:4:4, and/or color components such as Y or Cb/Cr.

7. When there are no non-zero coefficients in the CGs that RST may be applied to, RST shall be disabled.

a. In one example, when RST is applied to one block, at least one CG that RST is applied to must contain at least one non-zero coefficient.

b. In one example, for 4×N and/or N×4 (N>8), if RST is applied, the first two 4×4 CGs must contain at least one non-zero coefficient.

c. In one example, for 4×8 and/or 8×4, if RST is applied, the top-left 4×4 must contain at least one non-zero coefficient.

d. In one example, for W×H (W>=8 and H>=8), if RST is applied, the top-left 4×4 must contain at least one non-zero coefficient.

e. A conformance bitstream must satisfy one or multiple of above conditions.

8. RST related syntax elements may be signaled before coding residuals (e.g., transform coefficients/directly quantized).

a. In one example, the counting of number of non-zero coefficients in the Zero-out region (e.g., numZeroOutSigCoeff) and number of non-zero coefficients in the whole block (e.g., numSigCoeff) is removed in the parsing process of coefficients.

b. In one example, the RST related syntax elements (e.g, st_idx) may be coded before residual_coding.

c. RST related syntax elements may be conditionally signaled (e.g., according to coded block flags, TS mode usage).

iv. In one example, the RST related syntax elements (e.g, st_idx) may be coded after the signaling of coded block flags or after the signaling of TS/MTS related syntax elements.

v. In one example, when TS mode is enabled (e.g., the decoded transform_skip_flag is equal to 1), the signaling of RST related syntax elements is skipped.

d. Residual related syntax may not be signaled for zero-out CGs.

e. How to code residuals (e.g., scanning order, binarization, syntax to be decoded, context modeling) may depend on the RST.

i. In one example, raster scanning order instead of diagonal up-right scanning order may be applied.

1) The raster scanning order is from left to right and top to below, or in the reverse order.

2) Alternatively, vertical scanning order (from top to below and from left to right, or in the reverse order) instead of diagonal up-right scanning order may be applied.

3) Alternatively, furthermore, context modeling may be modified.

a. In one example, the context modeling may depend on the previously coded information in a template which are the most recent N neighbors in the scan order, instead of using right, bottom, bottom-right neighbors.

b. In one example, the context modeling may depend on the previously coded information in a template according to the scanned index (e.g., −1, −2, . . . assuming current index equal to 0).

ii. In one example, different binarization methods (e.g., rice parameter derivation) may be applied to code the residuals associated with RST-coded and non-RST-coded blocks.

iii. In one example, signaling of certain syntax elements may be skipped for RST coded blocks.

Figure 21:
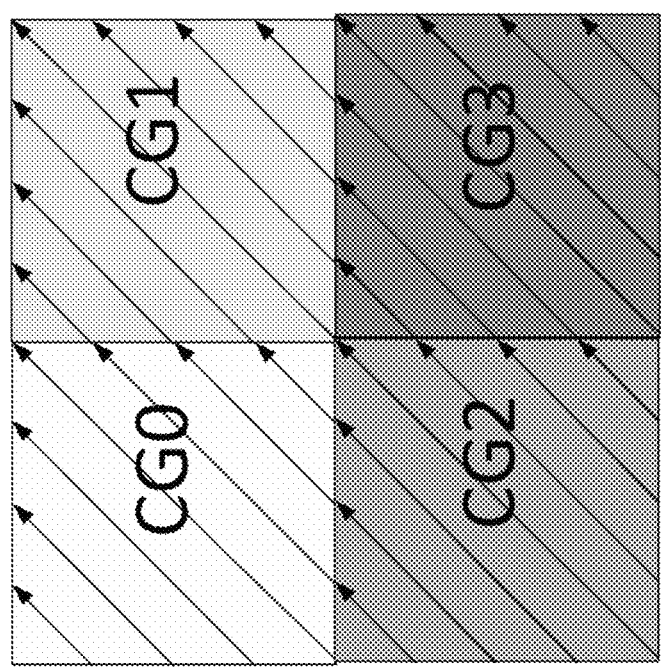
FIG. 21 an example of an 8×8 block with 4 coding groups.

1) Signaling of the CG coded block flags (coded_sub_block_flag) for the CGs that RST is applied to may be skipped.
   a. In one example, when RST8×8 applied to the first three CGs in diagonal scan order, signaling of CG coded block flags is skipped for the second and third CGs, e.g., the top-right 4×4 CG and left-below 4×4 CG in the top-left 8×8 region of the block.
      i. Alternatively, furthermore, the corresponding CG coded block flag is inferred to be 0, i.e., all coefficients are zero.
   b. In one example, when RST is applied to one block, signaling of CG coded block flag is skipped for the first CG in the scanning order (or the last CG in the reverse scanning order).
      ii. Alternatively, furthermore, the CG coded block flag for the top-left CG in the block is inferred to be 1, i.e., it contains at least one non-zero coefficient.
   c. An example of 8×8 block is depicted in FIG. 21. When RST8×8 or RST4×4 is applied to the 8×8 block, coded_sub_block_flag of CG0 is inferred to be 1, coded_sub_block_flag of CG1 and CG2 are inferred to be 0.
2) Signaling of the magnitudes of coefficients and/or the sign flags for certain coordinates may be skipped.
   a. In one example, if the index relative to one CG in a scan order is no less than the maximum allowed index that non-zero coefficient may exist (e.g., nonZeroSize in section 0), the signaling of coefficients may be skipped.
   b. In one example, signaling of the syntax elements, such as sig_coeff_flag, abs_level_gtX_flag, par_level_flag, abs_remainder, coeff_sign_flag, dec_abs_level may be skipped.
3) Alternatively, signaling of residuals (e.g., CG coded block flags, the magnitudes of coefficients and/or the sign flags for certain coordinates) may be kept, however, the context modeling may be modified to be different from other CGs.
   iv. In one example, the coding of residuals in RST-applied CGs and other CGs may be different.
      1) For above sub-bullets, they may be applied only to the CGs which RST are applied.
9. RST related syntax elements may be signaled before other transform indications, such as transform skip and/or MTS index.
   a. In one example, the signaling of transform skip may depend on RST information.
      i. In one example, transform skip indication is not signaled and inferred to be 0 for a block if RST is applied in the block.
   b. In one example, the signaling of MTS index may depend on RST information.
      i. In one example, one or multiple MTS transform indication is not signaled and inferred to be not used for a block if RST is applied in the block.
10. It is proposed to use different context modeling methods in arithmetic coding for different parts within one block.
   a. In one example, the block is treated to be two parts, the first M CGs in the scanning order, and remaining CGs.
      i. In one example, M is set to 1.
      ii. In one example, M is set to 2 for 4×N and N×4 (N>8) blocks; and set to 1 for all the other cases.
   b. In one example, the block is treated to be two parts, sub-regions where RST is applied, and sub-regions where RST is not applied.
      i. If RST4×4 is applied, the RST applied sub-region is the first one or two CGs of the current block.
      ii. If RST4×4 is applied, the RST applied sub-region is the first three CGs of the current block.
   c. In one example, it is proposed to disable the usage of previously coded information in the context modeling process for the first part within one block but enable it for the second part.
   d. In one example, when decoding the first CG, the information of the remaining one or multiple CGs may be disallowed to be used.
      i. In one example, when coding the CG coded block flag for the first CG, the value of the second CG (e.g., right or below) is not taken into consideration.
      ii. In one example, when coding the CG coded block flag for the first CG, the value of the second and third CG (e.g., right and below CGs for W×H (W>=8 and H>=8)) is not taken into consideration.
      iii. In one example, when coding the current coefficient, if its neighbor in the context template is in a different CG, the information from this neighbor is disallowed to be used.
   e. In one example, when decoding coefficients in the RST applied region, the information of the rest region that RST is not applied to may be disallowed to be used.
   f. Alternatively, furthermore, the above methods may be applied under certain conditions.
      i. The condition may include whether RST is enabled or not.
      ii. The condition may include the block dimension.

Context Modeling in Arithmetic Coding of RST Side Information

11. When coding the RST index, the context modeling may depend on whether explicit or implicit multiple transform selection (MTS) is enabled.
   a. In one example, when implicit MTS is enabled, different contexts may be selected for blocks coded with same intra prediction modes.
      i. In one example, the block dimensions such as shape (square or non-square) is used to select the context.
   b. In one example, instead of checking the transform index (e.g, tu_mts_idx) coded for the explicit MTS, the transform matrix basis may be used instead.
      i. In one example, for transform matrix basis with DCT-II for both horizontal and vertical 1-D transforms, the corresponding context may be different from other kinds of transform matrices.
12. When coding the RST index, the context modeling may depend on whether CCLM is enabled or not (e.g., sps_cclm_enabled_flag).
   a. Alternatively, whether to enable or how to select the context for RST index coding may depend on whether CCLM is applied to one block.
   b. In one example, the context modeling may depend on whether CCLM is enabled for current block.

i. In one example, the intraModeCtx=sps_cclm_enabled_flag? (intra_chroma_pred_mode[x0][y0] is CCLM: intra_chroma_pred_mode[x0][y0] is DM)? 1:0.
  c. Alternatively, whether to enable or how to select the context for RST index coding may depend on whether the current chroma block is coded with the DM mode.
    i. In one example, the intraModeCtx=(intra_chroma_pred_mode[x0][y0]==(sps_cclm_enabled_flag? 7:4))? 1:0.
13. When coding the RST index, the context modeling may depend on the block dimension/splitting depth (e.g., quadtree depth and/or BT/TT depth).
14. When coding the RST index, the context modeling may depend on the color formats and/or color components.
15. When coding the RST index, the context modeling may be independent from the intra prediction modes, and/or the MTS index.
16. When coding the RST index, the first and/or second bin may be context coded with only one context; or bypass coded.

Invoking RST Process Under Conditions
17. Whether to invoke the inverse RST process may depend on the CG coded block flags.
  a. In one example, if the top-left CG coded block flag is zero, there is no need invoke the process.
    i. In one example, if the top-left CG coded block flag is zero and the block size is unequal to 4×N/N×4 (N>8), there is no need invoke the process.
  b. In one example, if the first two CG coded block flags in the scanning order are both equal to zero, there is no need invoke the process.
    i. In one example, if the first two CG coded block flags in the scanning order are both equal to zero and the block size is equal to 4×N/N×4 (N>8), there is no need invoke the process.
18. Whether to invoke the inverse RST process may depend on block dimension.
  a. In one example, for certain block dimensions, such as 4×8/8×4, RST may be disabled. Alternatively, furthermore, signaling of RST related syntax elements may be skipped.

5 Example Implementations of the Disclosed Technology

In the following exemplary embodiments, the changes on top of JVET-N0193 are highlighted in bold and italic. Deleted texts are marked with double brackets (e.g., [[a]] denotes the deletion of the character "a").

5.1 Embodiment #1

Signaling of RST index is dependent on number of non-zero coefficients within a sub-region of the block, instead of the whole block.

7.3.6.11 Residual Coding Syntax

| | Descriptor |
|---|---|
| residual_coding( x0, y0, log2TbWidth, log2TbHeight, cIdx ) { | |
|   if( ( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbWidth > 4 ) | |
|     log2TbWidth = 4 | |
|   else | |
|     log2TbWidth = Min( log2TbWidth, 5 ) | |
|   if( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbHeight > 4 ) | |
|     log2TbHeight = 4 | |
|   else | |
|     log2TbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbW = ( Min( log2TbWidth, log2TbHeight ) < 2 ? 1 : 2 ) | |
|   log2SbH = log2SbW | |
|   if ( log2TbWidth < 2 && cIdx = = 0 ) { | |
|     log2SbW = log2TbWidth | |
|     log2SbH = 4 − log2SbW | |
|   } else if ( log2TbHeight < 2 && cIdx = = 0 ) { | |
|     log2SbH = log2TbHeight | |
|     log2SbW = 4 − log2SbH | |
|   } | |
|   numSbCoeff = 1 << ( log2SbW + log2SbH ) | |
|   lastScanPos = numSbCoeff | |
|   lastSubBlock = ( 1 << ( log2TbWidth + log2Tb Height − ( log2SbW + log2SbH ) ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder[ log2TbWidth − log2SbW ][ log2TbHeight − log2SbH ] | |
|       [ lastSubBlock ][ 0 ] | |
|     yS = DiagScanOrder[ log2TbWidth − log2SbW ][ log2TbHeight − log2SbH ] | |
|       [ lastSubBlock ][ 1 ] | |
|     xC = ( xS << log2SbW ) + DiagScanOrder[ log2SbW ][ log2SbH ][ lastScanPos ][ 0 ] | |

|  | Descriptor |
|---|---|
| ```
    yC = ( yS << log2SbH ) + DiagScanOrder[ log2SbW ][ log2SbH ][ lastScanPos ][ 1 ]
  } while( ( xC != LastSignificantCoeffX ) | | ( yC != LastSignificantCoeffY ) )
  QState = 0
  for( i = lastSubBlock; i >= 0; i- - ) {
    startQStateSb = QState
    xS = DiagScanOrder[ log2TbWidth - log2SbW ][ log2TbHeight - log2SbH ]
              [ lastSubBlock ][ 0 ]
    yS = DiagScanOrder[ log2TbWidth - log2SbW ][ log2TbHeight - log2SbH ]
              [ lastSubBlock ][ 1 ]
    inferSbDcSigCoeffFlag = 0
    if( ( i < lastSubBlock ) && ( i > 0 ) ) {
        coded_sub_block_flag[ xS ][ yS ]
        inferSbDcSigCoeffFlag = 1
    }
    firstSigScanPosSb = numSbCoeff
    lastSigScanPosSb = -1
    remBinsPass1 = ( ( log2SbW + log2SbH ) < 4 ? 8 : 32 )
    firstPosMode0 = ( i = = lastSubBlock ? lastScanPos : numSbCoeff - 1 )
    firstPosMode1 = -1
    for( n = firstPosMode0; n >= 0 && remBinsPass1 >= 4; n- - ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( coded_sub_block_flag[ xS ][ yS ] && ( n > 0 | | !inferSbDcSigCoeffFlag ) &&
        ( xC != LastSignificantCoeffX | | yC != LastSignificantCoeffY ) ) {
        sig_coeff_flag[ xC ][ yC ]
        remBinsPass1- -
        if( sig_coeff_flag[ xC ][ yC ] )
          inferSbDcSigCoeffFlag = 0
      }
      if( sig_coeff_flag[ xC ][ yC ] ) {
        if( !transform_skip_flag[ x0 ][ y0 ] ) {
          if ( i = 0 || (i == 1 && (log2TbWidth+ log2TbHeight ==5)) )
            numSigCoeff++
          if( ( ( ( log2TbWidth == 2 && log2TbHeight == 2 ) | | ( log2TbWidth == 3 &&
            log2TbHeight == 3 ) ) && n >= 8 && i == 0 ) | | ( ( log2TbWidth >= 3 &&
            log2TbHeight >= 3 && ( i == 1 | | i == 2 ) ) ) ) {
            numZeroOutSigCoeff++
          }
        }
        abs_level_gt1_flag[ n ]
        remBinsPass1- -
        if( abs_level_gt1_flag[ n ] ) {
          par_level_flag[ n ]
          remBinsPass1- -
          abs_level_gt3_flag[ n ]
          remBinsPass1- -
        }
        if( lastSigScanPosSb = = -1 )
          lastSigScanPosSb = n
        firstSigScanPosSb = n
      }
...
  }
}
``` | ae(v)<br><br><br><br><br><br><br><br><br><br><br><br><br><br><br><br>ae(v)<br><br><br><br><br><br><br><br><br>ae(v)<br><br><br>ae(v)<br><br>ae(v) |

Alternatively, the condition may be replaced by:

if (i=0 [[||(i==1 && (log 2TbWidth+log 2TbHeight==5))]])

5.2 Embodiment #2

RST may not be invoked according to coded block flags of certain CGs.

8.7.4. Transformation Process for Scaled Transform Coefficients

8.7.4.1 General

Inputs to this process are:
- a luma location (xTbY, yTbY) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

A variable bInvokeST is set to 0, and further modified to be 1 if one of the following conditions is true:
- if coded_sub_block_flag[0][0] is equal to 1 and nTbW×nTbH !=32
- if coded_sub_block_flag[0][0] and coded_sub_block_flag[0][1] is equal to 1 and nTbW is equal to 4 and nTbH is greater than 8
- if coded_sub_block_flag[0][0] and coded_sub_block_flag[1][0] is equal to 1 and nTbW is greater than 8 and nTbH is equal to 4

If bInvokeST is equal to 1 and st_idx[xTbY][yTbY] is not equal to 0, the following applies:
1. The variables nStSize, log 2StSize, numStX, numStY, and nonZeroSize are derived as follows:
    If both nTbW and nTbH are greater than or equal to 8, log 2StSize is set to 3 and nStOutSize is set to 48.
    Otherwise, log 2StSize is set to 2 and nStOutSize is set to 16.
    nStSize is set to (1<<log 2StSize).
    If nTbH is equal to 4 and nTbW is greater than 8, numStX set equal to 2.
    Otherwise, numStX set equal to 1.
    If nTbW is equal to 4 and nTbH is greater than 8, numStY set equal to 2.
    Otherwise, numStY set equal to 1.
    If both nTbW and nTbH are equal to 4 or both nTbW and nTbH are equal to 8, nonZeroSize is set equal to 8.
    Otherwise, nonZeroSize set equal to 16.
2. For xSbIdx=0 ... numStX−1 and ySbIdx=0 ... numStY−1, the following applies:
    The variable array u[x] with x=0 ... nonZeroSize−1 are derived as follows:

$$xC=(xSbIdx<<\log 2StSize)+DiagScanOrder[\log 2StSize][\log 2StSize][x][0]$$

$$yC=(ySbIdx<<\log 2StSize)+DiagScanOrder[\log 2StSize][\log 2StSize][x][1]$$

$$u[x]=d[xC][yC]$$

u[x] with x=0 ... nonZeroSize−1 is transformed to the variable array v[x] with x=0 ... nStOutSize−1 by invoking the one-dimensional transformation process as specified in clause 8.7.4.4 with the transform input length of the scaled transform coefficients nonZeroSize, the transform output length nStOutSize the list u[x] with x=0 ... nonZeroSize−1, the index for transform set selection stPredModeIntra, and the index for transform selection in a transform set st_idx[xTbY][yTbY] as inputs, and the output is the list v[x] with x=0 ... nStOutSize−1. The variable stPredModeIntra is set to the predModeIntra specified in clause 8.4.4.2.1.
The array d[(xSbIdx<<log 2StSize)+x][(ySbIdx<<log 2StSize)+y] with x=0 ... nStSize−1, y=0 ... nStSize−1 are derived as follows:
    If stPredModeIntra is less than or equal to 34, or equal to INTRA_LT_CCLM, INTRA_T_CCLM, or INTRA_L_CCLM, the following applies:

$$d[(xSbIdx<<\log 2StSize)+x][(ySbIdx<<\log 2StSize)+y]=(y<4)?v[x+(y<<\log 2StSize)]:\\((x<4)?\ v[32+x+((y-4)<<2)]:$$

$$d[(xSbIdx<<\log 2StSize)+x][(ySbIdx<<\log 2StSize)+y])$$

Otherwise, the following applies:

$$d[(xSbIdx<<\log 2StSize)+x][(ySbIdx<<\log 2StSize)+y]=(y<4)?v[y+(x<<\log 2StSize)]:\\((x<4)?\ v[32+(y-4)+(x<<2)]:$$

$$d[(xSbIdx<<\log 2StSize)+x][(ySbIdx<<\log 2StSize)+y])$$

The variable implicitMtsEnabled is derived as follows:
If sps_mts_enabled_flag is equal to 1 and one of the following conditions is true, implicitMtsEnabled is set equal to 1:

IntraSubPartitionsSplitType is not equal to ISP_NO_SPLIT
cu_sbt_flag is equal to 1 and Max(nTbW, nTbH) is less than or equal to 32
sps_explicit_mts_intra_enabled_flag and sps_explicit_mts_inter_enabled_flag are both equal to 0 and CuPredMode[xTbY][yTbY] is equal to MODE_INTRA Otherwise, implicitMtsEnabled is set equal to 0.
The variable trTypeHor specifying the horizontal transform kernel and the variable trTypeVer specifying the vertical transform kernel are derived as follows:
    If cIdx is greater than 0, trTypeHor and trTypeVer are set equal to 0.
    Otherwise, if implicitMtsEnabled is equal to 1, the following applies:
        If IntraSubPartitionsSplitType is not equal to ISP_NO_SPLIT, trTypeHor and trTypeVer are specified in Table 8-15 depending on intraPredMode.
        Otherwise, if cu_sbt_flag is equal to 1, trTypeHor and trTypeVer are specified in Table 8-14 depending on cu_sbt_horizontal_flag and cu_sbt_pos_flag.
        Otherwise (sps_explicit_mts_intra_enabled_flag and sps_explicit_mts_inter_enabled_flag are equal to 0), trTypeHor and trTypeVer are derived as follows:

$$trTypeHor=(nTbW>=4\ \&\&\ nTbW<=16\ \&\&\\ nTbW<=nTbH)?1:0 \quad (8\text{-}1029)$$

$$trTypeVer=(nTbH>=4\ \&\&\ nTbH<=16\ \&\&\\ nTbH<=nTbW)?1:0 \quad (8\text{-}1030)$$

Otherwise, trTypeHor and trTypeVer are specified in Table 8-13 depending on tu_mts_idx[xTbY][yTbY].
The variables nonZeroW and nonZeroH are derived as follows:

$$nonZeroW=Min(nTbW,(trTypeHor>0)?16:32) \quad (8\text{-}1031)$$

$$nonZeroH=Min(nTbH,(trTypeVer>0)?16:32) \quad (8\text{-}1032)$$

The (nTbW)×(nTbH) array r of residual samples is derived as follows:
1. When nTbH is greater than 1, each (vertical) column of scaled transform coefficients d[x][y] with x=0 ... nonZeroW−1, y=0 ... nonZeroH−1 is transformed to e[x][y] with x=0 ... nonZeroW−1, y=0 ... nTbH−1 by invoking the one-dimensional transformation process as specified in clause 8.7.4.2 for each column x=0 ... nonZeroW−1 with the height of the transform block nTbH, the non-zero height of the scaled transform coefficients nonZeroH, the list d[x][y] with y=0 ... nonZeroH−1 and the transform type variable trType set equal to trTypeVer as inputs, and the output is the list e[x][y] with y=0 ... nTbH−1.
2. When nTbH and nTbW are both greater than 1, the intermediate sample values g[x][y] with x=0 ... nonZeroW−1, y=0 ... nTbH−1 are derived as follows:

$$g[x][y]=Clip3(CoeffMin,CoeffMax,(e[x][y]+64)>>7) \quad (8\text{-}1033)$$

When nTbW is greater than 1, each (horizontal) row of the resulting array g[x][y] with x=0 ... nonZeroW−1, y=0 ... nTbH−1 is transformed to r[x][y] with x=0 ... nTbW−1, y=0 ... nTbH−1 by invoking the one-dimensional transformation process as specified in clause 8.7.4.2 for each row y=0 ... nTbH−1 with the width of the transform block nTbW, the non-zero width of the resulting array g[x][y] nonZeroW, the list g[x][y] with x=0 ... nonZeroW−1 and the transform type variable trType set equal to trTypeHor as inputs, and the output is the list r[x][y] with x=0 . . . nTbW−1.

5.3 Embodiment #3

Context modeling of RST index is revised.

5.3.1 Alternative #1

9.5.4.2.8 Derivation Process of ctxInc for the Syntax Element st_idx

Inputs to this process are the colour component index cIdx, the luma or chroma location (x0, y0) specifying the top-left sample of the current luma or chroma coding block relative to the top-left sample of the current picture depending on cIdx, the tree type treeType, the luma intra prediction mode IntraPredModeY[x0][y0] as specified in clause 8.4.2, the syntax element intra_chroma_pred_mode[x0][y0] specifying the intra prediction mode for chroma samples as specified in clause 7.4.7.5, the block width nTbW and height nTbH, and the multiple transform selection index tu_mts_idx[x0][y0].

Output of this process is the variable ctxInc.

The variable intraModeCtx is derived as follows:

If cIdx is equal to 0, intraModeCtx is derived as follows:

intraModeCtx=(IntraPredModeY[x0][y0]<=1)?1:0

Otherwise (cIdx is greater than 0), intraModeCtx is derived as follows:

intraModeCtx=(intra_chroma_pred_mode[x0][y0]>=4)?1:0

The variable mtsCtx is derived as follows:

mtsCtx=((sps_explicit_mts_intra_enabled_flag?tu_mts_idx[x0][y0]==0:nTbW==nTbH) && treeType !=SINGLE_TREE)? 1:0

The variable ctxInc is derived as follows:

ctxInc=(binIdx<<1)+intraModeCtx+(mtsCtx<<2)

5.3.2 Alternative #2

TABLE 9-15

Assignment of ctxInc to syntax elements with context coded bins

| Syntax element | Binarization | |
|---|---|---|
| | Process | Input parameters |
| Syntax structure st_idx[ ][ ] | . . . TR | . . . cMax = 2, cRiceParam = 0 |

| Syntax element | binIdx | | | | | |
|---|---|---|---|---|---|---|
| | 0 | 1 | 2 | 3 | 4 | >=5 |
| . . . | . . . | . . . | . . . | . . . | . . . | . . . |
| st_idx [ ][ ] | 0[[,1,4,5]] (clause 9.5.4.2.8) | 2[[,3,6,7]] (clause 9.5.4.2.8) | na | na | na | na |
| . . . | . . . | . . . | . . . | . . . | . . . | . . . |

[[9.5.4.2.8 Derivation Process of ctxInc for the Syntax Element st_idx

Inputs to this process are the colour component index cIdx, the luma or chroma location (x0, y0) specifying the top-left sample of the current luma or chroma coding block relative to the top-left sample of the current picture depending on cIdx, the tree type treeType, the luma intra prediction mode IntraPredModeY[x0][y0] as specified in clause 8.4.2, the syntax element intra_chroma_pred_mode[x0][y0] specifying the intra prediction mode for chroma samples as specified in clause 7.4.7.5, and the multiple transform selection index tu_mts_idx[x0][y0].

Output of this process is the variable ctxInc.

The variable intraModeCtx is derived as follows:

If cIdx is equal to 0, intraModeCtx is derived as follows:

intraModeCtx=(IntraPredModeY[x0][y0]<=1)?1:0

Otherwise (cIdx is greater than 0), intraModeCtx is derived as follows:

intraModeCtx=(intra_chroma_pred_mode[x0][y0]>=4)?1:0

The variable mtsCtx is derived as follows:

mtsCtx=(tu_mts_idx[x0][y0]==0 && treeType !=SINGLE_TREE)?1:0

The variable ctxInc is derived as follows:

ctxInc=(binIdx<<1)+intraModeCtx+(mtsCtx<<2)]]

Figure 22A:
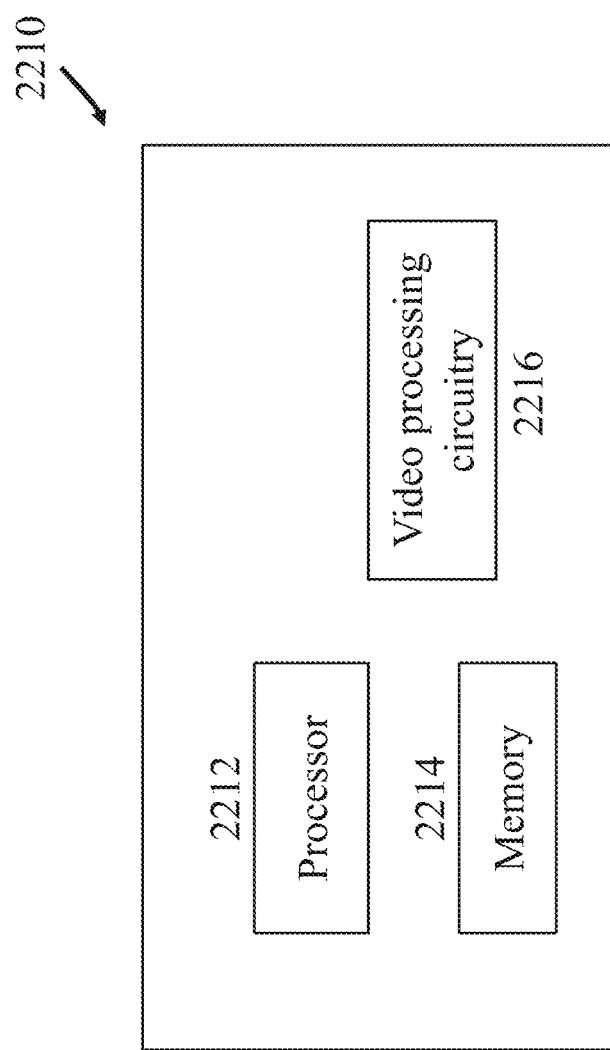
FIGS. 22A and 22B are block diagrams of examples of a hardware platform for implementing a visual media decoding or a visual media encoding technique described in the present document.

FIG. 22A is a block diagram of a video processing apparatus 2210. The apparatus 2210 may be used to implement one or more of the methods described herein. The apparatus 2210 may be embodied in a smartphone, tablet, computer, Internet of Things (IoT) receiver, and so on. The apparatus 2210 may include one or more processors 2212, one or more memories 2214 and video processing hardware 2216. The processor(s) 2212 may be configured to implement one or more methods described in the present document. The memory (memories) 2214 may be used for storing data and code used for implementing the methods and techniques described herein. The video processing hardware 2216 may be used to implement, in hardware circuitry, some techniques described in the present document.

Figure 22B:
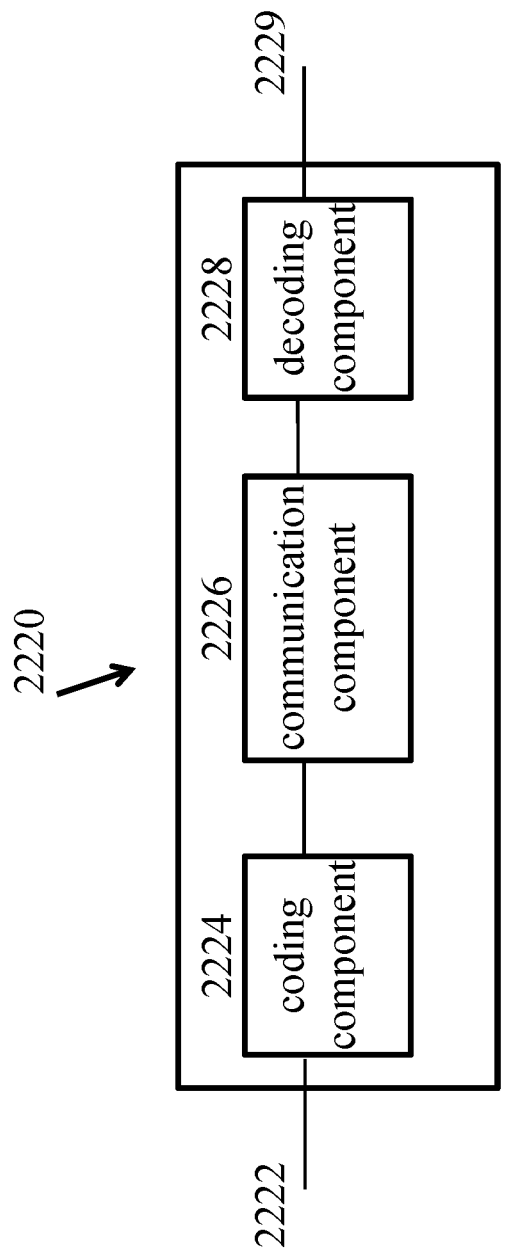

FIG. 22B is another example of a block diagram of a video processing system in which disclosed techniques may be implemented. FIG. 22B is a block diagram showing an example video processing system 2220 in which various techniques disclosed herein may be implemented. Various implementations may include some or all of the components of the system 2220. The system 2220 may include input 2222 for receiving video content. The video content may be received in a raw or uncompressed format, e.g., 8 or 10 bit multi-component pixel values, or may be in a compressed or encoded format. The input 2222 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2220 may include a coding component 2224 that may implement the various coding or encoding methods described in the present document. The coding component 2224 may reduce the average bitrate of video from the input 2222 to the output of the coding component 2224 to produce a coded representation of the video. The coding techniques are therefore sometimes called video compression or video transcoding techniques. The output of the coding component 2224 may be either stored, or transmitted via a communication connected, as represented by the component 2226. The stored or communicated bitstream (or coded) representation of the video received at the input 2222 may be used by the component 2228 for generating pixel values or displayable video that is sent to a display interface 2229. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

The examples described above may be incorporated in the context of the methods described below, e.g., methods 2310 and 2320, which may be implemented at a video decoder or a video encoder.

Figure 23A:
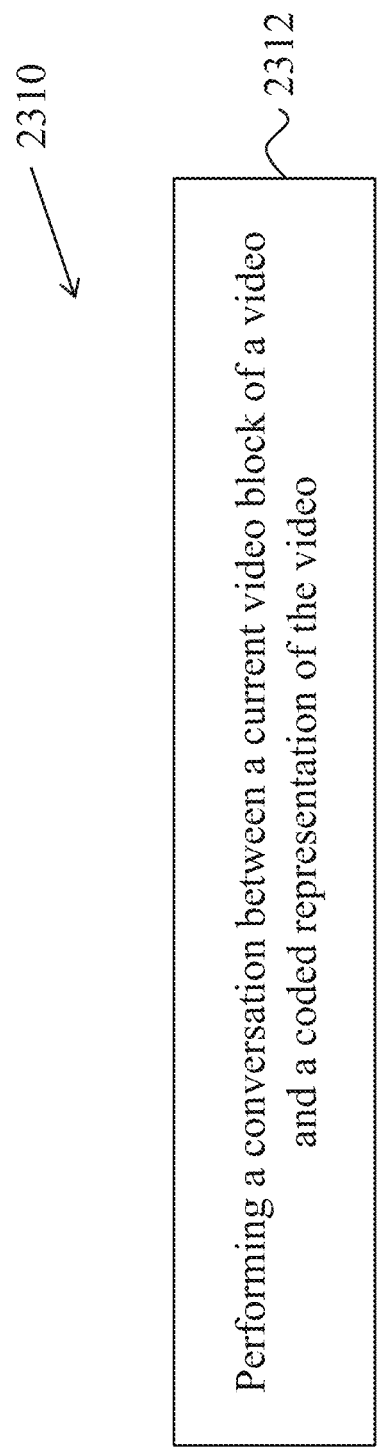
FIGS. 23A and 23B show flowcharts of example methods for video processing.

FIG. 23A shows a flowchart of an exemplary method for video processing. The method 2310 includes, at step 2312, performing a conversation between a current video block of a video and a coded representation of the video. In some implementations, the secondary transform tool includes, applying during encoding, a forward secondary transform to an output of a forward primary transform applied to a residual of the current video block prior to quantization, or applying, during decoding, an inverse secondary transform to an output of dequantization of the current video block before applying an inverse primary transform.

In some implementations, the conversion comprises: selecting, for the current video block of a video, a transform set or a transform matrix to be used in an application of a secondary transform tool to the current video block based on a characteristic of the current video block; and applying the selected transform set or transform matrix to the current video block. In some implementations, the conversion comprises applying a secondary transform tool to a sub-region of the current video block that is not a top-left part of the current video block.

In some implementations, the coded representation conforms to a format rule that specifies a last non-zero coefficient in a residual of the current video block and controls whether or how side information about a secondary transform tool is included in the coded representation. In some implementations, the coded representation conforms to a format rule that specifies one or more coefficients in a residual of a portion of the current video block and controls whether or how side information about a secondary transform tool is included in the coded representation. In some implementations, the performing of the conversion includes determining an applicability of a secondary transform tool to the current video block based on a presence of a non-zero coefficient in one or more coding groups of the current video block.

In some implementations, the coded representation conforms to a format rule specifying that a syntax element corresponding to side information of a secondary transform tool for the current video block is signaled in the coded representation before transform related information. In some implementations, the coded representation conforms to a format rule specifying that a syntax element corresponding to side information of a secondary transform tool for the current video block is signaled in the coded representation before residual coding information. In some implementations, the performing of the conversion includes coding a residual of the current video block according to a rule based on information related to the secondary transform tool. In some implementations, the performing of the conversion includes applying, to one or more portions of the current video block, an arithmetic coding using different context modeling methods according to a rule.

In some implementations, the performing of the conversion includes configuring, based on a characteristic of the current video block of a video, a context model for coding a bin or bypass coding the bin of a bin string corresponding to an index of a secondary transform tool, and the index indicates an applicability of the secondary transform tool and/or a kernel information of the secondary transform tool. In some implementations, the performing of the conversion includes determining, based on a dimension of the current video block, whether a syntax element is included in the coded representation. In some implementations, the syntax element corresponds to side information of a secondary transform tool which comprises at least one of indication of applying the secondary transform and an index of the transform kernels used in a secondary transform process.

Figure 23B:
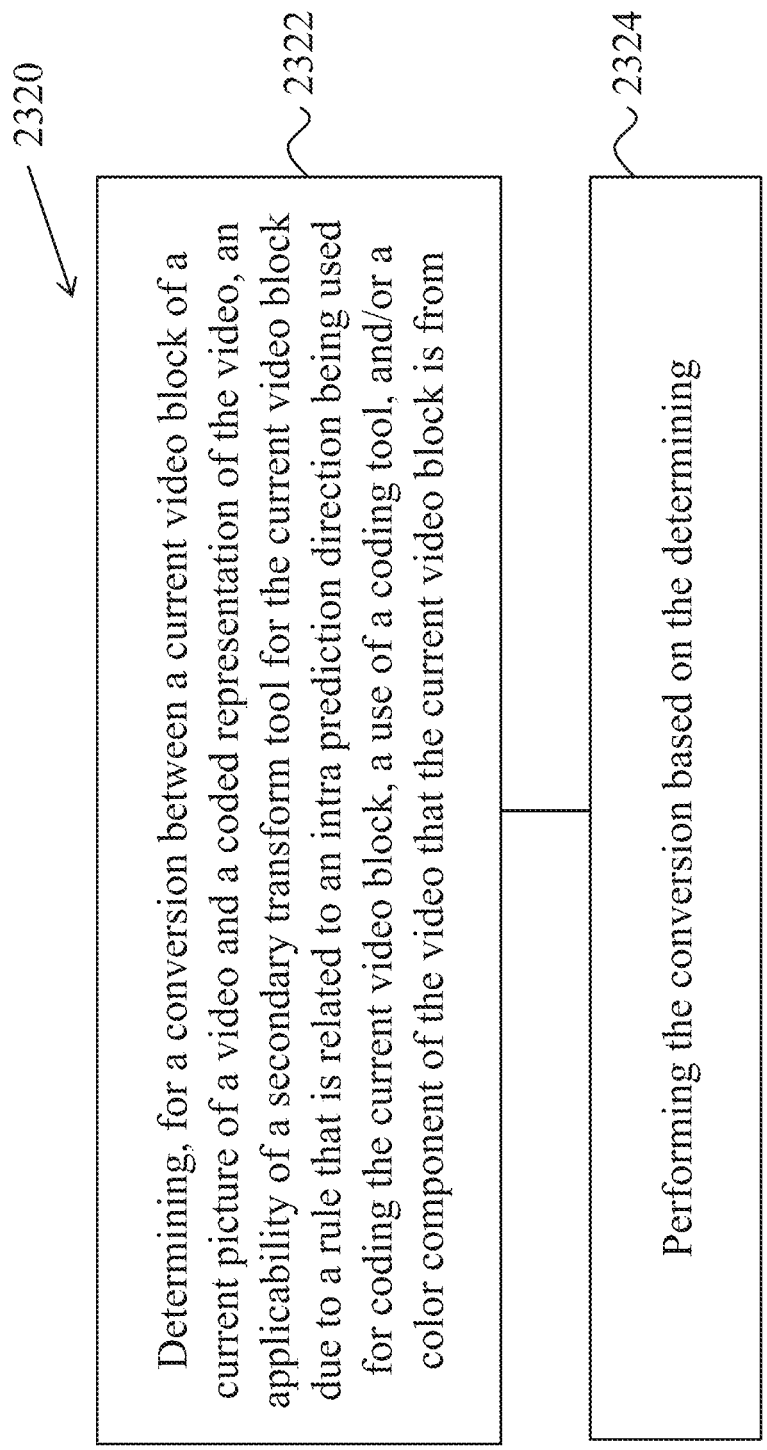

FIG. 23B shows a flowchart of an exemplary method for video processing. The method 2320 includes, at step 2322, determining, for a conversion between a current video block of a current picture of a video and a coded representation of the video, an applicability of a secondary transform tool for the current video block due to a rule that is related to an intra prediction direction being used for coding the current video block, a use of a coding tool, and/or a color component of the video that the current video block is from. The method 2320 further includes, at step 2324, performing the conversion based on the determining.

In some embodiments, the video coding methods may be implemented using an apparatus that is implemented on a hardware platform as described with respect to FIG. 23A or 23B.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a block may be encoded in terms of transformed and coded error residual values and also using bits in headers and other fields in the bitstream. Herein, a block may correspond to a grouping of samples or pixels for an operation, e.g., a coding unit or a transform unit or a prediction unit, and so on.

Various techniques and embodiments may be described using the following clause-based format. In the followings, the secondary transform tool can be used that, during encoding, a forward secondary transform is applied to an output of a forward primary transform applied to a residual of the current video block prior to quantization, or, during decoding, an inverse secondary transform is applied to an output of dequantization of the current video block before applying an inverse primary transform. The secondary transform tool is applicable to the block between a forward primary transform and a quantization step or between a de-quantization step and an inverse primary transform, and wherein the reduced dimension corresponding to the sub-block that is reduced from a dimension of the block. In some implementations, the secondary transform tool corresponds to a low frequency non-separable transform (LFNST) tool.

The first set of clauses describe certain features and aspects of the disclosed techniques in the previous section.

1. A method for video processing, comprising: selecting, based on a characteristic of a current video block, a transform set or a transform matrix for an application of a reduced secondary transform to the current video block; and applying, as part of a conversion between the current video block and a bitstream representation of a video comprising the current video block, the selected transform set or transform matrix to a portion of the current video block.

2. The method of clause 1, wherein the portion of the current video block is a top-right sub-region, bottom-right sub-region, bottom-left sub-region or center sub-region of the current video block.

3. The method of clause 1 or 2, wherein the characteristic of the current video block is an intra prediction mode or a primary transform matrix of the current video block.

4. The method of clause 1, wherein the characteristic is a color component of the current video block.

5. The method of clause 4, wherein a first transform set is selected for a luma component of the current video block, and wherein a second transform set different from the first transform set is selected for one or more chroma components of the current video block.

6. The method of clause 1, wherein the characteristic is an intra prediction mode or an intra coding method of the current video block.

7. The method of clause 6, wherein the intra prediction method comprises a multiple reference line (MRL)-based prediction method or a matrix-based intra prediction method.

8. The method of clause 6, wherein a first transform set is selected when the current video block is a cross-component linear model (CCLM) coded block, and wherein a second transform set different from the first transform set is selected when the current video block is a non-CCLM coded block.

9. The method of clause 6, wherein a first transform set is selected when the current video block is coded with a joint chroma residual coding method, and wherein a second transform set different from the first transform set is selected when the current video block is not coded with the joint chroma residual coding method.

10. The method of clause 1, wherein the characteristic is a primary transform of the current video block.

11. A method for video processing, comprising: making a decision, based on one or more coefficients associated with a current video block, regarding a selective inclusion of signaling of side information for an application of a reduced secondary transform (RST) in a bitstream representation of the current video block; and performing, based on the decision, a conversion between the current video block and a video comprising the bitstream representation of the current video block.

12. The method of clause 11, wherein the one or more coefficients comprises a last non-zero coefficient in a scanning order of the current video block.

13. The method of clause 11, wherein the one or more coefficients comprises a plurality of coefficients within a partial region of the current video block.

14. The method of clause 13, wherein the partial region comprises one or more coding groups that the RST could be applied to.

15. The method of clause 13, wherein the partial region comprises a first M coding groups or a last M coding groups in a scanning order of the current video block.

16. The method of clause 13, wherein the partial region comprises a first M coding groups or a last M coding groups in a reverse scanning order of the current video block.

17. The method of clause 13, wherein making the decision is further based on an energy of one or more non-zero coefficients of the plurality of coefficients.

18. A method for video processing, comprising: configuring, for an application of a reduced secondary transform (RST) to a current video block, a bitstream representation of the current video block, wherein a syntax element related to the RST is signaled in the bitstream representation before coding residual information; and performing, based on the configuring, a conversion between the current video block and the bitstream representation of the current video block.

19. The method of clause 18, wherein signaling the syntax element related to the RST is based on at least one coded block flag or a usage of a transform selection mode.

20. The method of clause 18, wherein the bitstream representation excludes the coding residual information corresponding to coding groups with all zero coefficients.

21. The method of clause 18, wherein the coding residual information is based on the application of the RST.

22. A method for video processing, comprising: configuring, for an application of a reduced secondary transform (RST) to a current video block, a bitstream representation of the current video block, wherein a syntax element related to the RST is signaled in the bitstream representation before either a transform skip indication or a multiple transform set (MTS) index; and performing, based on the configuring, a conversion between the current video block and the bitstream representation of the current video block.

23. The method of clause 22, wherein the transform skip indication or the MTS index is based on the syntax element related to the RST.

24. A method for video processing, comprising: configuring, based on a characteristic of a current video block, a context model for coding an index of a reduced secondary transform (RST); and performing, based on the configuring, a conversion between the current video block and a bitstream representation of a video comprising the current video block.

25. The method of clause 24, wherein the characteristic is an explicit or implicit enablement of a multiple transform selection (MTS) process.

26. The method of clause 24, wherein the characteristic is an enablement of a cross-component linear model (CCLM) coding mode in the current video block.

27. The method of clause 24, wherein the characteristic is a size of the current video block.

28. The method of clause 24, wherein the characteristic is a splitting depth of a partitioning process applied to the current video block.

29. The method of clause 28, wherein the partitioning process is a quadtree (QT) partitioning process, a binary tree (BT) partitioning process or a ternary tree (TT) partitioning process.

30. The method of clause 24, wherein the characteristic is a color format or a color component of the current video block.

31. The method of clause 24, wherein the characteristic excludes an intra prediction mode of the current video block and an index of a multiple transform selection (MTS) process.

32. A method for video processing, comprising: making a decision, based on a characteristic of a current video block, regarding a selective application of an inverse reduced secondary transform (RST) process on the current video block; and performing, based on the decision, a conversion between the current video block and a bitstream representation of a video comprising the current video block.

33. The method of clause 32, wherein the characteristic is a coded block flag of a coding group of the current video block.

34. The method of clause 33, wherein the inverse RST process is not applied, and wherein the coded block flag of a top-left coding group is zero.

35. The method of clause 33, wherein the inverse RST process is not applied, and wherein coded block flags for a first and a second coding group in a scanning order of the current video block are zero.

36. The method of clause 32, wherein the characteristic is a height (M) or a width (N) of the current video block.

37. The method of clause 36, wherein the inverse RST process is not applied, and wherein (i) M=8 and N=4, or (ii) M=4 and N=8.

38. An apparatus in a video system comprising a processor and a non-transitory memory with instructions thereon, wherein the instructions upon execution by the processor, cause the processor to implement the method in any one of clauses 1 to 37.

39. A computer program product stored on a non-transitory computer readable media, the computer program product including program code for carrying out the method in any one of clauses 1 to 37.

The second set of clauses describe certain features and aspects of the disclosed techniques in the previous section, for examples, Example Implementations 1-4.

1. A video processing method, comprising: performing a conversation between a current video block of a video and a coded representation of the video, wherein the conversion comprises:

selecting, for the current video block of a video, a transform set or a transform matrix to be used in an application of a secondary transform tool to the current video block based on a characteristic of the current video block; and applying the selected transform set or transform matrix to the current video block, and wherein, using the secondary transform tool: during encoding, a forward secondary transform is applied to an output of a forward primary transform applied to a residual of the current video block prior to quantization, or during decoding, an inverse secondary transform is applied to an output of dequantization of the current video block before applying an inverse primary transform.

2. The method of clause 1, wherein the secondary transform tool corresponds to a low frequency non-separable transform (LFNST) tool.

3. The method of clause 1 or 2, wherein the characteristic is a color component of the current video block.

4. The method of clause 3, wherein a first transform set is selected for a luma component of the current video block, and a second transform set different from the first transform set is selected for one or more chroma components of the current video block.

5. The method of clause 3, wherein each color component of the current video block corresponds to one transform set.

6. The method of clause 3, wherein, for different color components of the current video block, multiple sets of transform matrix are selected such that one of the multiple sets includes at least one transform matrix that is different from matrices of remaining sets.

7. The method of clause 1, wherein the characteristic is an intra prediction method of the current video block.

8. The method of clause 7, wherein the intra prediction method of the current video block includes a cross-component linear model (CCLM) or a matrix-based intra prediction method (MIP) mode, wherein the CCLM uses a linear mode to derive prediction values of a chroma component of the current video block, and wherein the MIP mode includes determining prediction values of the current video block by performing, on previously coded samples of the video, a boundary downsampling operation, followed by a matrix vector multiplication operation, and selectively followed by an upsampling operation.

9. The method of clause 7, wherein the selecting of the transform set or the transform matrix is according to a rule based on use of cross-component linear model (CCLM) that uses a linear mode to derive prediction values of a chroma component of the current video block.

10. The method of clause 7, wherein the selecting of the transform set or the transform matrix is according to a rule based on use of a single or multiple reference lines in a prediction mode of the current video block.

11. The method of clause 7, wherein the selecting of the transform set or the transform matrix is according to a rule based on use of a joint chroma residual coding of the current video block.

12. The method of clause 1, wherein the characteristic is a type of the forward primary transform or a type of the inverses primary transform of the current video block.

13. The method of clause 12, wherein the forward primary transform or the inverse primary transform is an identity transform and wherein the transform set and/or the transform matrix used in the application of the secondary transform tool is different from metrices used in the forward primary transform or the inverse primary transform.

14. The method of clause 12, wherein the forward primary transform or the inverse primary transform is performed with a horizontal 1D transform and a vertical 1-D transform that are with a same basis function and wherein the transform set and/or the transform matrix used in the application of the secondary transform tool is different basis functions of a vertical and horizontal transforms used in the forward primary transform or the inverse primary transform.

15. The method of any of clauses 1 to 14, wherein the performing of the conversion includes generating the coded representation from the current video block or generating the current video block from the coded representation.

16. A video processing method, comprising: performing a conversion between a current video block of a video and a coded representation of the video, wherein the conversion comprises applying a secondary transform tool to a sub-region of the current video block that is not a top-left part of the current video block, and wherein, using the secondary transform tool: during encoding, a forward secondary transform is applied to an output of a forward primary transform applied to a residual of the sub-region of the current video block prior to quantization, or during decoding, an inverse secondary transform is applied to an output of dequantization of the sub-region of the current video block before applying an inverse primary transform.

17. The method of clause 16, wherein the secondary transform tool corresponds to a low frequency non-separable transform (LFNST) tool.

18. The method of clause 16, wherein the sub-region of the current video block corresponds to a top right, a bottom right, a bottom left, or a center of the current video block.

19. The method of clause 16, wherein the sub-region is determined based on an intra prediction mode or a primary transform matrix of the current video block.

20. The method of any of clauses 16 to 19, wherein the performing of the conversion includes generating the coded representation from the current video block or generating the current video block from the coded representation.

21. A video processing method, comprising: determining, for a conversion between a current video block of a current picture of a video and a coded representation of the video, an applicability of a secondary transform tool for the current video block due to a rule that is related to an intra prediction direction being used for coding the current video block, a use of a coding tool, and/or a color component of the video that the current video block is from; and performing the conversion based on the determining.

22. The method of clause 21, wherein the secondary transform tool corresponds to a low frequency non-separable transform (LFNST) tool.

23. The method of clause 21, wherein the determining determines that the secondary transform tool is applied to the current video block, and wherein, using the secondary transform tool: during encoding, a forward secondary transform is applied to an output of a forward primary transform applied to a residual of the current video block prior to quantization; or during decoding, an inverse secondary transform is applied to an output of dequantization of the current video block before applying an inverse primary transform.

24. The method of clause 21, wherein the determining determines that the secondary transform tool is not applied to the current video block, and wherein, during encoding, none of forward secondary transforms is applied to an output of a forward primary transform applied to a residual of the current video block prior to quantization; or wherein, during decoding, an inverse secondary transform to an output of dequantization of the current video block before applying an inverse primary transform is omitted.

25. The method of clause 21, wherein the coding tool corresponds to a cross-component linear model (CCLM) or a joint chroma residual coding.

26. The method of clause 21, wherein the color component corresponds to a chroma component of the current video block.

27. The method of clause 21, wherein the determining determines that the secondary transform tool is not applied to the current video block in a case that the color component corresponds to a chroma component.

28. The method of clause 21, wherein the coding tool corresponds to an intra prediction method.

29. The method of any of clauses 21 to 28, wherein the performing of the conversion includes generating the coded representation from the current video block or generating the current video block from the coded representation.

30. An apparatus in a video system comprising a processor and a non-transitory memory with instructions thereon, wherein the instructions upon execution by the processor, cause the processor to implement the method in any one of clauses 1 to 29.

31. A computer program product stored on a non-transitory computer readable media, the computer program product including program code for carrying out the method in any one of clauses 1 to 29.

The third set of clauses describe certain features and aspects of the disclosed techniques in the previous section, for examples, Example Implementations 5-7.

1. A video processing method, comprising: performing a conversion between a current video block of a video and a coded representation of the video, wherein the coded representation conforms to a format rule that specifies a last non-zero coefficient in a residual of the current video block and controls whether or how side information about a secondary transform tool is included in the coded representation, and wherein the secondary transform tool includes applying, during encoding, a forward secondary transform to an output of a forward primary transform applied to a residual of a video block prior to quantization, or applying, during decoding, an inverse secondary transform to an output of dequantization of the video block before applying an inverse primary transform.

2. The method of clause 1, wherein the secondary transform tool corresponds to a low frequency non-separable transform (LFNST) tool.

3. The method of clause 1, wherein the format rule specifies the last non-zero coefficient in a scanning order of the current video block.

4. The method of clause 1, wherein the format rule controls to perform signaling the side information of the LFNST tool in a case that the last non-zero coefficient is located in a coding group of the current video block to which the secondary transform tool is applied.

5. The method of clause 1, wherein the format rule controls to skip the signaling of the side information in a case that the last non-zero coefficient is not located in a coding group of the current video block to which that the secondary transform tool is applied to.

6. The method of clause 1, wherein the side information comprises at least one of indication of applying the secondary transform tool, index of the transform kernels used in the secondary transform tool.

7. The method of clause 1, wherein the secondary transform tool is disabled for the current video block in a case the side information of the transform is not included in the coded representation.

8. The method of any of clauses 1 to 7, wherein the performing of the conversion includes generating the coded representation from the video or generating the video from the coded representation.

9. A video processing method, comprising: performing a conversion between a current video block of a video and a coded representation of the video, wherein the coded representation conforms to a format rule that specifies one or more coefficients in a residual of a portion of the current video block and controls whether or how side information about a secondary transform tool is included in the coded representation, and wherein the secondary transform tool includes applying, during encoding, a forward secondary transform to an output of a forward primary transform applied to a residual of a video block prior to quantization, or applying, during decoding, an inverse secondary transform to an output of dequantization to the video block before applying an inverse primary transform.

10. The method of clause 9, wherein the secondary transform tool corresponds to a low frequency non-separable transform (LFNST) tool.

11. The method of clause 9, wherein the format rule defines the portion as one or more coding groups to which the secondary transform tool is applied to.

12. The method of clause 9, wherein the format rule defines the portion as first M coding groups or last M coding groups of the current video block in a scanning order or reverse scanning order.

13. The method of clause 12, wherein M depends on a dimension of the current video block.

14. The method of clause 12, wherein M is 2 in a case that a size of the current video block is 4×N and/or N×4, whereby N is an integer greater than 8.

15. The method of clause 12, wherein M is 1 in a case that a size of the current video block is 4×8 and/or 8×4 and/or W×H, whereby W and H are integers equal to or greater than 8.

16. The method of clause 9, wherein the format rule is based on a position of the one or more coefficients within the portion.

17. The method of clause 9, wherein the format rule is based on an energy of one or more non-zero coefficients within the portion.

18. The method of clause 9, wherein the format rule is based on a number of the one or more coefficients within the portion.

19. The method of clause 18, wherein the format rule controls to skip the signaling of the side information in a case that a number of the one or more coefficients within the portion is less than a threshold.

20. The method of clause 19, wherein the threshold is based on slice type, a picture type, a partition tree type, or video content.

21. The method of clause 19, wherein the threshold is based on a color format and/or a color component of the current video block.

22. The method of clause 9, wherein the side information comprises at least one of indication of applying the secondary transform tool, index of the transform kernels used in the secondary transform tool.

23. The method of clause 9, wherein the secondary transform tool is disabled for the current video block in a case the side information of the transform is not included in the coded representation.

24. The method of any of clauses 9 to 23, wherein the performing of the conversion includes generating the coded representation from the video or generating the video from the coded representation.

25. A video processing method, comprising: performing a conversion between a current video block of a video and a coded representation of the video, wherein the performing of the conversion includes determining an applicability of a secondary transform tool to the current video block based on a presence of a non-zero coefficient in one or more coding groups of the current video block, and wherein the secondary transform tool includes applying, during encoding, a forward secondary transform to an output of a forward primary transform applied to a residual of a video block prior to quantization, or applying, during decoding, an inverse secondary transform to an output of dequantization of the video block before applying an inverse primary transform.

26. The method of clause 25, wherein the secondary transform tool corresponds to a low frequency non-separable transform (LFNST) tool.

27. The method of clause 25, wherein the determining determines to apply the secondary transform tool in a case that at least one of the coding groups contains at least one non-zero coefficient.

28. The method of clause 25, wherein, for the current video block having a size of 4×N and/or N×4, the determining determines to enable the secondary transform tool in a case that first two 4×4 coding groups contain at least one non-zero coefficient, whereby N is an integer greater than 8.

29. The method of clause 25, wherein, for the current video block having a size of 4×8 and/or 8×4, the determining determines to enable the secondary transform tool in a case that top-left 4×4 coding groups contain at least one non-zero coefficient.

30. The method of clause 25, wherein, for the current video block having a size of W×H, the determining determines to enable the secondary transform tool in a case that top-left 4×4 coding groups contain at least one non-zero coefficient, whereby W and H are integers equal to or greater than 8.

31. The method of clause 25, wherein the determining determines to disallow the LFNST tool in a case that there is no non-zero coefficient in the coding groups.

32. The method of clause 31, wherein, for the current video block having a size of 4×N and/or N×4, the determining determines to disable the secondary transform tool in a case that there is no non-zero coefficient in first two 4×4 coding groups, whereby N is an integer greater than 8.

33. The method of clause 31, wherein, for the current video block having a size of 4×8 and/or 8×4, the determining determines to disable the secondary transform tool in a case that there is no non-zero coefficient in a top-left 4×4 coding group.

34. The method of clause 31, wherein, for the current video block having a size of W×H, the determining determines to disable the secondary transform tool in a case that there is no non-zero coefficient in a top-left 4×4 coding group, whereby W and H are integers equal to or greater than 8.

35. The method of clause 31, wherein, for the current video block having a size of W×H, the determining determines to disable the secondary transform tool in a case that there is no non-zero coefficient in a top-left 4×4 coding group, whereby W and H are integers equal to or greater than 8.

36. The method of any of clauses 25 to 35, wherein side information of the secondary transform tool is not included in the coded representation in a case that the secondary transform tool is disabled for the current video block.

37. The method of clause 36, wherein the side information comprises at least one of indication of applying the secondary transform tool, index of the transform kernels used in a secondary transform process.

38. The method of any of clauses 25 to 37, wherein the performing of the conversion includes generating the coded representation from the video or generating the video from the coded representation.

39. The method of any of clauses 1 to 38, wherein at least some blocks of the video are coded in the coded representation using the secondary transform tool.

40. An apparatus in a video system comprising a processor and a non-transitory memory with instructions thereon, wherein the instructions upon execution by the processor, cause the processor to implement the method in any one of clauses 1 to 39.

41. A computer program product stored on a non-transitory computer readable media, the computer program product including program code for carrying out the method in any one of clauses 1 to 39.

The fourth set of clauses describe certain features and aspects of the disclosed techniques in the previous section, for examples, Example Implementations 8-10.

1. A video processing method, comprising: performing a conversion between a current video block of a video and a coded representation of the current video block, wherein the coded representation conforms to a format rule specifying that a syntax element corresponding to side information of a secondary transform tool for the current video block is signaled in the coded representation before transform related information, wherein the secondary transform tool includes applying, during encoding, a forward secondary transform to an output of a forward primary transform applied to a residual of a video block prior to quantization, or applying, during decoding, an inverse secondary transform to an output of dequantization of the video block before applying an inverse primary transform.

2. The method of clause 1, wherein the secondary transform tool corresponds to a low frequency non-separable transform (LFNST) tool.

3. The method of clause 1, wherein the side information comprises at least one of indication of applying the secondary transform tool, index of the transform kernels used in the secondary transform process.

4. The method of clause 1, wherein the transform related information includes at least one of a transform skip indication indicating to skip forward/inverse transform; side information of a multiple transform set (MTS) tool.

5. The method of clause 4, further comprising that the side information of the MTS tool includes an index indicating one or more transform types in a transform set used for the current video block.

6. The method of clause 4, wherein the format rule controls signaling of the transform skip indication based on the syntax element.

7. The method of clause 4, wherein the format rule controls signaling of the multiple transform set (MTS) index based on the syntax element.

8. The method of clause 7, wherein the multiple transform set (MTS) index is not signaled and inferred to be zero for the current video block to which the secondary transform tool is enabled.

9. The method of any of clauses 1 to 8, wherein the syntax element is a LFNST (low frequency non-separable transform) index.

10. The method of any of clauses 1 to 9, wherein the performing of the conversion includes generating the coded representation from the video or generating the video from the coded representation.

11. A video processing method, comprising: performing a conversion between a current video block of a video and a coded representation of the video, wherein the coded representation conforms to a format rule specifying that a syntax element corresponding to side information of a secondary transform tool for the current video block is signaled in the coded representation before residual coding information, wherein the secondary transform tool includes applying, during encoding, a forward secondary transform to an output of a forward primary transform applied to a residual of a video block prior to quantization, or applying, during decoding, an inverse secondary transform to an output of dequantization to the video block before applying an inverse primary transform.

12. The method of clause 11, wherein the secondary transform tool corresponds to a low frequency non-separable transform (LFNST) tool.

13. The method of clause 11, wherein the side information comprises at least one of indication of applying the secondary transform tool, index of the transform kernels used in the secondary transform process.

14. The method of clause 11, wherein counting of a number of non-zero coefficients in a partial region and an entire region of the current video block is omitted.

15. The method of clause 11, wherein the syntax element is coded before a syntax element related to the coding of the residual coding information.

16. The method of clause 11, wherein the format rule specifies that the syntax element is signaled based on signaling of a coded block flag or a usage of a transform selection mode.

17. The method of clause 16, wherein the format rule specifies that the syntax element is coded after the signaling of the coded block flag or the usage of the transform selection mode.

18. The method of clause 16, wherein the format rule specifies that the syntax element is skipped due to the usage of the transform selection mode that is a transform skip (TS) mode.

19. The method of clause 11, wherein the coded representation excludes the residual coding information corresponding to coding groups that always have zero coefficients.

20. The method of any of clauses 11 to 16, wherein the performing of the conversion includes generating the coded representation from the video or generating the video from the coded representation.

21. A video processing method, comprising: performing a conversion between a current video block of a video and a coded representation of the video, wherein the performing of the conversion includes coding a residual of the current video block according to a rule based on information related to the secondary transform tool, and wherein the secondary transform tool includes applying, during encoding, a forward secondary transform to an output of a forward primary transform applied to a residual of a video block prior to quantization, or applying, during decoding, an inverse secondary transform to an output of dequantization to the video block before applying an inverse primary transform.

22. The method of clause 21, wherein the rule specifies to apply a raster scanning order or a vertical scanning order instead of a diagonal up-right scanning order.

23. The method of clause 21, wherein the rule specifies to apply a context modeling based on previously coded information in a template which are the most recent N neighbors in a scanning order.

24. The method of clause 21, wherein the rule specifies to apply a context modeling based on previously coded information in a template according to a scanned index.

25. The method of clause 21, wherein the rule specifies to apply different binarization methods depending on whether the secondary transform tool is applied to the current video block.

26. The method of clause 21, wherein the rule specifies to skip signaling of a syntax element due to the application of the secondary transform tool.

27. The method of clause 26, wherein the rule specifies to skip, for a coding group of the current video block, the signaling of a flag indicating the application of the secondary transform tool.

28. The method of clause 27, wherein the flag is inferred to be 0 or 1.

29. The method of clause 21, wherein the rule specifies to skip signaling of coefficients and/or sign flags for coordinates due to the application of the secondary transform tool.

30. The method of clause 21, wherein the rule specifies to apply, to a coding group of the current video block to which the LFNST tool is applied, a modified context modeling different from that applied to other coding groups.

31. The method of any of clauses 21 to 30, wherein the performing of the conversion includes generating the coded representation from the video or generating the video from the coded representation.

32. A video processing method, comprising: performing a conversion between a current video block of a video and a coded representation of the video, wherein the performing of the conversion includes applying, to one or more portions of the current video block, an arithmetic coding using different context modeling methods according to a rule.

33. The method of clause 32, wherein the one or more portions include a first portion including first M coding groups of the current video block according to a scanning order and a second portion including remaining coding groups of the current video block, whereby M is an integer.

34. The method of clause 33, wherein M is 1 or 2.

35. The method of clause 32, wherein the one or more portions include a sub-region of the current video block including one or more coding blocks to which a low frequency non-separable transform (LFNST) tool is applied and another sub-region of the current video block including one or more coding blocks to which the LFNST is not applied.

36. The method of clause 32, wherein the rule specifies to disable usage of previously coded information in a context modeling method for a first portion of the current video block but enable the usage for a second portion of the current video block.

37. The method of clause 32, wherein the rule specifies, for decoding of a first coding group of the current video block, to disallow information of remaining one or more coding groups of the current video block.

38. The method of clause 37, wherein the rule specifies, for coding a flag corresponding to a first coding group, not to consider a value of a second coding group and/or a third coding group is not considered.

39. The method of clause 37, wherein the rule specifies, for coding a current transform coefficient, not to consider information from a neighbor in a context template that is in a different coding group.

40. The method of clause 32, wherein the rule specifies, for decoding of coefficients used in a portion to which a low frequency non-separable transform (LFNST) tool is applied, to disallow information used in another portion to which the LFNST tool is not applied.

41. The method of clause 32, wherein the rule specifies that the applying is performed based on whether a low frequency non-separable transform (LFNST) tool is applied or not and/or a block dimension of the current video block.

42. The method of any of clauses 35, 40 and 41, wherein, using the LFNST tool, during encoding, a forward secondary transform is applied to an output of a forward primary transform applied to the residual of the current video block prior to quantization, or wherein, using the LFNST tool, during decoding, an inverse secondary transform is applied to an output of dequantization to the current video block before applying an inverse primary transform.

43. The method of any of clauses 32 to 42, wherein the performing of the conversion includes generating the coded representation from the video or generating the video from the coded representation.

44. The method of any of clauses 1 to 43, wherein at least some blocks of the video are coded in the coded representation using the secondary transform tool.

45. An apparatus in a video system comprising a processor and a non-transitory memory with instructions thereon, wherein the instructions upon execution by the processor, cause the processor to implement the method in any one of clauses 1 to 44.

46. A computer program product stored on a non-transitory computer readable media, the computer program product including program code for carrying out the method in any one of clauses 1 to 44.

The fifth set of clauses describe certain features and aspects of the disclosed techniques in the previous section, for examples, Example Implementations 11-16.

1. A video processing method, comprising: performing a conversion between a current video block of a video and a coded representation of the video, wherein the performing of the conversion includes configuring, based on a characteristic of the current video block of a video, a context model for coding a bin or bypass coding the bin of a bin string corresponding to an index of a secondary transform tool, wherein the index indicates an applicability of the secondary transform tool and/or a kernel information of the secondary transform tool, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

2. The method of clause 1, wherein the secondary transform tool corresponds to a low frequency non-separable transform (LFNST) tool.

3. The method of clause 1, wherein the context model allows a first bin and/or second bin to be coded with only one context or bypass coded.

4. The method of clause 1, wherein the characteristic is an enablement of explicit or implicit multiple transform selection (MTS).

5. The method of clause 4, wherein, in a case that the explicit multiple transform selection is enabled, a context is selected based on a type of an intra prediction mode applied to the current video block, the context being selected for another block using the type of the intra prediction mode.

6. The method of clause 5, wherein the context is selected based on a dimension of the current video block.

7. The method of clause 4, wherein transform matrix basis is used instead of checking a transform index coded for the explicit multiple transform selection (MTS).

8. The method of clause 1, wherein the characteristic is an enablement of a cross-component linear model (CCLM) coding mode that uses a linear mode to derive prediction values of a chroma component of the current video block.

9. The method of clause 1, wherein an enablement of a cross-component linear model (CCLM) coding mode that uses a linear mode to derive prediction values of a chroma component of the current video block determines an enablement or a selection of the context model for coding the index of the secondary transform tool.

10. The method of clause 1, wherein an enablement or a selection of the context model for coding the index of the secondary transform tool depends on whether a chroma block of the current video block is coded with a DM mode in which the chroma block inherits a same intra prediction coding mode of a corresponding luma block.

11. The method of clause 1, wherein the characteristic is a size of the current video block.

12. The method of clause 1, wherein the characteristic is a splitting depth of a partitioning process applied to the current video block.

13. The method of clause 12, wherein the partitioning process is a quadtree (QT) partitioning process, a binary tree (BT) partitioning process or a ternary tree (TT) partitioning process.

14. The method of clause 1, wherein the characteristic is a color format or a color component of the current video block.

15. The method of clause 1, wherein the characteristic excludes an intra prediction mode of the current video block and/or an index of a multiple transform selection (MTS) process.

16. The method of any of clauses 1 to 15, wherein the performing of the conversion includes generating the coded representation from the video or generating the video from the coded representation.

17. An apparatus in a video system comprising a processor and a non-transitory memory with instructions thereon, wherein the instructions upon execution by the processor, cause the processor to implement the method in any one of clauses 1 to 16.

18. A computer program product stored on a non-transitory computer readable media, the computer program product including program code for carrying out the method in any one of clauses 1 to 16.

The sixth set of clauses describe certain features and aspects of the disclosed techniques in the previous section, for examples, Example Implementations 17 and 18.

1. A video processing method, comprising: performing a conversion between a current video block of a video and a coded representation of the current video block, wherein the performing of the conversion includes determining, based on a dimension of the current video block, whether a syntax element is included in the coded representation, wherein the syntax element corresponds to side information of a secondary transform tool which comprises at least one of indication of applying the secondary transform and an index of the transform kernels used in a secondary transform process, and wherein, using the secondary transform, an inverse secondary transform is used for decoding the coded representation and applied to an output of dequantization of the current video block before applying an inverse primary transform.

2. A video processing method, comprising: performing a conversion between a current video block of a video and a coded representation of the current video block, wherein the performing of the conversion includes determining, based on a dimension of the current video block, whether a syntax element is included in the coded representation of the current video block, wherein the syntax element corresponds to side information of a secondary transform which comprises at least one of indication of applying the secondary transform and an index of the transform kernels used in a secondary transform process, and wherein, using the secondary transform, a forward secondary transform that is used for encoding the current video block and applied to an output of a primary transform of the current video block before applying quantization process.

3. The method of clause 1 or 2, wherein the secondary transform corresponds to a low frequency non-separable transform (LFNST) tool.

4. The method of any of clauses 1 to 3, wherein the dimension of the current video block is a height (M) or a width (N) of the current video block.

5. The method of any of clauses 1, 3, and 4, wherein the syntax element is not included in the coded representation and the inverse secondary transform is not applied in a case that (i) M=8 and N=4 or (ii) M=4 and N=8.

6. The method of any clause 1, 3, and 4, wherein the syntax element related to the inverse secondary transform is skipped in a case that the inverse secondary transform is not applied.

7. The method of any of clauses 1 to 3, wherein the syntax element includes one or more coded flags of one or more coding groups of the current video block.

8. The method of clause 7, wherein the inverse secondary transform is not applied in a case that a coded flag of a top-left coding group is zero.

9. The method of clause 8, wherein the current video block has a size that is unequal to 4×N or N×4, whereby N is an integer greater than 8.

10. The method of clause 7, wherein the inverse secondary transform is not applied in a case that coded flags of a first and a second coding groups according to a scanning order of the current video block are zero.

11. The method of clause 10, wherein the current video block has a size that is equal to 4×N or N×4, whereby N is an integer greater than 8.

12. The method of any of clauses 1 to 11, wherein the performing of the conversion includes generating the video from the coded representation or generating the coded representation from the video.

13. The method of any of clauses 1 to 12, wherein at least some blocks of the video are coded in the coded representation using the secondary transform tool.

14. An apparatus in a video system comprising a processor and a non-transitory memory with instructions thereon, wherein the instructions upon execution by the processor, cause the processor to implement the method in any one of clauses 1 to 13.

15. A computer program product stored on a non-transitory computer readable media, the computer program product including program code for carrying out the method in any one of clauses 1 to 13.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    performing a conversion between a current video block of a video and a bitstream of the video,
    wherein the performing of the conversion includes configuring, based on characteristics of the current video block of the video, one or more context models for coding one or more bins of a bin string corresponding to an index of a secondary transform tool, wherein the characteristics exclude an index of a multiple transform selection process (tu_mts_idx) for the current video block and wherein a context increasement set corresponding to a second bin of the bin string includes only one context increasement used to derive the context model for the second bin, wherein the one context increasement is 2,
    wherein the index indicates an applicability of the secondary transform tool and/or a kernel information of the secondary transform tool, and
    wherein the secondary transform tool includes applying, during encoding, a forward secondary transform to an output of a forward primary transform applied to a residual of a video block prior to quantization, or
    wherein the secondary transform tool includes applying, during decoding, an inverse secondary transform to an output of dequantization to the video block before applying an inverse primary transform.

2. The method of claim 1, wherein the characteristics include a splitting scheme of a partitioning process for the current video block.

3. The method of claim 2, wherein the characteristics further include a color component of the current video block.

4. The method of claim 1, wherein the characteristics further exclude an intra prediction mode of the current video block.

5. The method of claim 1, wherein the bin string corresponding to the index of the secondary transform tool is present in the bitstream based on whether a transform skip mode is applied to the current video block.

6. The method of claim 1, wherein, in response to a transform skip mode is applied, the bin string is not present in the bitstream.

7. The method of claim 5, wherein the bin string is present in the bitstream further based on at least one coded block flag, wherein the at least one coded block flag indicates whether one or more transform coefficient levels are not equal to 0.

8. The method of claim 7, wherein the at least one coded block flag is present in the bitstream before the bin string.

9. The method of claim 1, wherein the secondary transform tool corresponds to a low frequency non-separable transform (LFNST) tool.

10. The method of claim 1, wherein the conversion includes encoding the current video block into the bitstream.

11. The method of claim 1, wherein the conversion includes decoding the current video block from the bitstream.

12. An apparatus for processing video data comprising a processor and a non-transitory memory with instructions thereon, wherein the instructions upon execution by the processor, cause the processor to:
perform a conversion between a current video block of a video and a bitstream of the video,
wherein the performing of the conversion includes configuring, based on characteristics of the current video block of the video, one or more context models for coding one or more bins of a bin string corresponding to an index of a secondary transform tool, wherein the characteristics exclude an index of a multiple transform selection process (tu_mts_idx) for the current video block and wherein a context increasement set corresponding to a second bin of the bin string includes only one context increasement used to derive the context model for the second, wherein the one context increasement is 2,
wherein the index indicates an applicability of the secondary transform tool and/or a kernel information of the secondary transform tool, and
wherein the secondary transform tool includes applying, during encoding, a forward secondary transform to an output of a forward primary transform applied to a residual of a video block prior to quantization, or
wherein the secondary transform tool includes applying, during decoding, an inverse secondary transform to an output of dequantization to the video block before applying an inverse primary transform.

13. The apparatus of claim 12, wherein the bin string corresponding to the index of a secondary transform tool index of a secondary transform tool is present in the bitstream based on whether a transform skip mode is applied to the current video block.

14. The apparatus of claim 12, wherein, in response to the transform skip mode is applied, the bin string is not present in the bitstream.

15. The apparatus of claim 12, wherein the bin string corresponding to the index of the secondary transform tool is present in the bitstream based on whether a transform skip mode is applied to the current video block.

16. The apparatus of claim 15, wherein the bin string is present in the bitstream further based on at least one coded block flag, wherein the at least one coded block flag indicates whether one or more transform coefficient levels are not equal to 0.

17. A non-transitory computer-readable storage medium storing instructions that cause a processor to:
perform a conversion between a current video block of a video and a bitstream of the video,
wherein the performing of the conversion includes configuring, based on characteristics of the current video block of the video, one or more context models for coding one or more bins of a bin string corresponding to an index of a secondary transform tool, wherein the characteristics exclude an index of a multiple transform selection process (tu_mts_idx) for the current video block and wherein a context increasement set corresponding to a second bin of the bin string includes only one context increasement used to derive the context model for the second bin, wherein the one context increasement is 2,
wherein the index indicates an applicability of the secondary transform tool and/or a kernel information of the secondary transform tool, and
wherein the secondary transform tool includes applying, during encoding, a forward secondary transform to an output of a forward primary transform applied to a residual of a video block prior to quantization, or
wherein the secondary transform tool includes applying, during decoding, an inverse secondary transform to an output of dequantization to the video block before applying an inverse primary transform.

18. The non-transitory computer-readable storage medium of claim 17, wherein the bin string corresponding to the index of the secondary transform tool is present in the bitstream based on whether a transform skip mode is applied to the current video block.

19. A non-transitory computer-readable recording medium storing a bitstream of a video which is generated by a method performed by a video processing apparatus, wherein the method comprises:
generating the bitstream for a current video block of the video,
wherein the generating the bitstream includes configuring, based on characteristics of the current video block of the video, one or more context models for coding one or more bins of a bin string corresponding to an index of a secondary transform tool, wherein the characteristics exclude an index of a multiple transform selection process (tu_mts_idx) for the current video block and wherein a context increasement set corresponding to a second bin of the bin string includes only one context increasement used to derive the context model for the second bin, wherein the one context increasement is 2,
wherein the index indicates an applicability of the secondary transform tool and/or a kernel information of the secondary transform tool, and
wherein the secondary transform tool includes applying, during encoding, a forward secondary transform to an output of a forward primary transform applied to a residual of a video block prior to quantization, or
wherein the secondary transform tool includes applying, during decoding, an inverse secondary transform to an output of dequantization to the video block before applying an inverse primary transform.

20. The non-transitory computer-readable recording medium of claim 19, wherein the bin string corresponding to the index of the secondary transform tool is present in the bitstream based on whether a transform skip mode is applied to the current video block.

* * * * *